(12) United States Patent
Horimai et al.

(10) Patent No.: US 7,327,389 B2
(45) Date of Patent: Feb. 5, 2008

(54) APPARATUS AND METHOD FOR PHOTOGRAPHING THREE-DIMENSIONAL IMAGE, APPARATUS AND METHOD FOR DISPLAYING THREE-DIMENSIONAL IMAGE, AND APPARATUS AND METHOD FOR CONVERTING THREE-DIMENSIONAL IMAGE DISPLAY POSITION

(75) Inventors: Hideyoshi Horimai, Room 301, 2032-2, Ooka, Numazu-shi, Shizuoka, 410-0022 (JP); Masaharu Kinoshita, Room 205, 10, Aza Minamishinkiri, Matsuicho, Toyohashi-shi, Aichi, 441-8143 (JP)

(73) Assignees: Hideyoshi Horimai, Numazu (JP); Masaharu Kinoshita, Yokohama (JP)

( * ) Notice: Subject to any disclaimer, the term of this patent is extended or adjusted under 35 U.S.C. 154(b) by 0 days.

(21) Appl. No.: 11/183,810

(22) Filed: Jul. 19, 2005

(65) Prior Publication Data

US 2005/0259159 A1 Nov. 24, 2005

Related U.S. Application Data

(62) Division of application No. 09/868,598, filed as application No. PCT/JP99/07147 on Dec. 20, 1999, now Pat. No. 6,970,187.

(30) Foreign Application Priority Data

Jun. 1, 1999 (JP) .................... 11-001419
Jun. 1, 1999 (JP) .................... 11-001420
Jun. 1, 1999 (JP) .................... 11-001421

(51) Int. Cl.
*H05N 5/228* (2006.01)

(52) U.S. Cl. ................... 348/222.1; 348/333.01; 348/51; 345/698

(58) Field of Classification Search ........... 348/207.99, 348/222, 51–60, 333.01, 333.08, 333.1; 349/112; 359/23; 345/6, 698
See application file for complete search history.

(56) References Cited

U.S. PATENT DOCUMENTS 4,677,468 A 6/1987 Morishita (Continued)

FOREIGN PATENT DOCUMENTS

JP A 61-48288 3/1986

(Continued)

*Primary Examiner*—Lin Ye
*Assistant Examiner*—Gevell Selby
(74) *Attorney, Agent, or Firm*—Oliff & Berridge, PLC

(57) ABSTRACT

The present invention makes it possible to acquire image information required for displaying a three-dimensional image of an object in a space with a simple configuration and to achieve display of a stereoscopic dynamic image in a true sense with a simple configuration.

Light from an object (10) impinges upon a deflecting plate (11). Among the incident beams of light, the deflecting plate (11) allows beams of light at a predetermined angle to the plane of the deflecting plate (11) to pass, the beams exiting as parallel beams of light perpendicular to the plane of the deflecting plate (11). The light passes through a converging lens (12), a pinhole member (13), and a converging lens (14) to impinge upon a CCD (15). An angle of incident light selected by the deflecting plate (11) is sequentially changed as time passes. Therefore, image information output by the CCD (15) becomes plural pieces of two-dimensional image information for which the photographing direction changes as time passes and which serve as image information required for displaying a three-dimensional image of the object in a space.

7 Claims, 36 Drawing Sheets

U.S. PATENT DOCUMENTS

| | | | |
|---|---|---|---|
| 5,014,126 A | | 5/1991 | Pritchard et al. |
| 5,486,948 A | | 1/1996 | Imai et al. |
| 5,493,427 A | * | 2/1996 | Nomura et al. ............... 348/59 |
| 5,561,537 A | * | 10/1996 | Aritake et al. ................ 359/23 |
| 5,825,456 A | | 10/1998 | Tabata et al. |
| 5,880,704 A | * | 3/1999 | Takezaki ..................... 348/56 |
| 6,339,445 B1 | | 1/2002 | Matsuda et al. |
| 6,552,744 B2 | | 4/2003 | Chen |

FOREIGN PATENT DOCUMENTS

| | | |
|---|---|---|
| JP | A 6-311535 | 11/1994 |
| JP | A 8-30243 | 2/1996 |
| WO | WO 91-06185 | 5/1991 |

* cited by examiner

APPARATUS AND METHOD FOR PHOTOGRAPHING THREE-DIMENSIONAL IMAGE, APPARATUS AND METHOD FOR DISPLAYING THREE-DIMENSIONAL IMAGE, AND APPARATUS AND METHOD FOR CONVERTING THREE-DIMENSIONAL IMAGE DISPLAY POSITION

This is a Division of application Ser. No. 09/868,598 filed Jul. 6, 2001 now U.S. Pat. No. 6,970,187, which in turn is a National Stage of PCT/JP99/07147 filed Dec. 20, 1999. The entire disclosure of the prior applications is hereby incorporated by reference herein in its entirety.

TECHNICAL FIELD

The present invention relates to an apparatus and method for photographing a three-dimensional image for acquiring image information required for displaying a three-dimensional image (stereoscopic image) of an object in a space, and an apparatus and method for displaying a three-dimensional image to display a three-dimensional image of an object in a space by projecting a plurality of pieces of two-dimensional image information of an object obtained by viewing the object in different viewing directions, in directions associated with the respective viewing directions. The present invention also relates to an apparatus and method for converting a display position of a three-dimensional image which is used in a system for displaying a three-dimensional image of an object in a space by projecting a plurality of pieces of two-dimensional image information on the object obtained by viewing the object in different viewing directions, in directions associated with the respective viewing directions, and which convert the position of the three-dimensional image of the object displayed in the space.

BACKGROUND ART

Various proposals have recently been made on techniques for displaying a stereoscopic image as a result of the progress of optical technologies. One of such techniques is two-glass type three-dimensional viewers such as IMAX THEATER (trademark) capable of presenting stereoscopic display to a user who wears dedicated eyeglasses to see an image formed by an image for the left eye and an image for the right eye in an overlapping relationship. This apparatus enables to present stereoscopic display in the form of a stereogram utilizing parallax between left and right eyes.

Stereoscopic display is also performed with holography utilizing coherent light from a laser or the like. This technique is to display a stereoscopic image by forming a hologram on a dry plate or the like using object light and reference light in advance and by irradiating the hologram with the original reference light to obtain reproduction light.

Techniques for displaying a stereoscopic image without any need for dedicated eyeglasses include the so-called IP (integral photography) method, and the parallax method.

The IP method was proposed by Lippmann. A photographic dry plate is provided on a focal surface of a lens plate called "fly-eye lens" constituted by a multiplicity of small convex lenses; the photographic dry plate is exposed to object light through the lens plate to record a multiplicity of small object images thereon; and the photographic dry plate is thereafter developed, placed in exactly the same position as its initial position and irradiated with light on the back surface thereof.

The parallax method is a method in which strip-shaped images respectively associated with left and right eyes are separately viewed through apertures in the form of vertical grills placed in front of the strip-shaped images.

Among the above techniques, the above-described stereoscopic viewers are inconvenient for a viewer because he or she must wear dedicated eyeglasses and are not suitable for observation for a long time because they present unnatural images which are likely to give fatigue.

The above-described technique for presenting stereoscopic display utilizing holography involves a large scale apparatus at a high manufacturing cost because of the requirement for coherent light from a laser or the like and also results in a reduction of image quality attributable to speckle interference patterns which are characteristic of lasers. Further, holography is suitable for still images but unsuitable for three-dimensional display of dynamic images because it presents stereoscopic display of an object utilizing a hologram formed on a photographic dry plate in advance. This equally applies to the above-described IP method in that it is unsuitable for dynamic images because it involves a step of recording a multiplicity of small object images on a photographic dry plate in advance.

The parallax method that requires no dedicated eyeglasses only presents pseudo-stereoscopic display utilizing parallax between left and right eyes and does not allow three-dimensional display in a true sense. Therefore, although an image can be represented with a stereoscopic sense in the horizontal direction of a screen, it cannot be represented with a stereoscopic sense in the vertical direction and, for example, cannot be viewed by a person who is lying down. Further, since it is a technique utilizing parallax, a change of a view point only results in a view of the same image with a stereographic sense (a sense of depth), and a side of an object will not appear even if the viewer moves the head to look at the object from left and right sides thereof.

Further, in order to implement the parallax method, an object must be photographed in different directions with a plurality of cameras; the films photographed by the cameras must be developed; and the films must be printed on photographic paper through apertures with a plurality of image projectors to form strip-shaped images. Therefore, a large scale apparatus is required to implement the parallax method.

As thus described, according to conventional techniques it is difficult to achieve display of a stereoscopic dynamic image in a true sense with a simple configuration.

Any of the conventional techniques for stereoscopic display only allows a three-dimensional image to be displayed in a predetermined position. Therefore, the conventional techniques for stereoscopic display have low rendering capability in that it is difficult to achieve a representation in which a three-dimensional image is moved toward or away from the viewer, for example.

DISCLOSURE OF THE INVENTION

The present invention has been made taking such problems into consideration, and it is a first object of the invention to provide an apparatus and method for photographing a three-dimensional image and an apparatus and method for displaying a three-dimensional image which make it possible to acquire image information required for displaying a three-dimensional image of an object in a space with a simple configuration and to achieve display of a stereoscopic dynamic image in a true sense with a simple configuration.

It is a second object of the invention to provide an apparatus and method for converting the display position of a three-dimensional image which make it possible to convert the position of a three-dimensional image of an object displayed in a space in a system for displaying a three-dimensional image of an object in a space.

A first three-dimensional image photographing apparatus of the invention is to acquire image information required for displaying a three-dimensional image of an object in a space. The apparatus has: a single photographing means for photographing an object to generate two-dimensional image information of the object; and photographing direction control means for sequentially changing the photographing direction of the photographing means.

According to the three-dimensional image photographing apparatus, two-dimensional image information of the object is generated by photographing the object with the single photographing means, and the photographing direction is sequentially changed by the photographing direction control means.

In the first three-dimensional image photographing apparatus of the invention, the photographing direction control means may have deflecting means which is provided between the object and the photographing means and which deflects light by selecting a direction for incident light. Alternatively, the photographic direction control means may have driving means for moving the photographing means; or may have driving means for moving a part of an optical system provided between the object and the photographing means.

In the first three-dimensional image photographing apparatus of the invention, the photographing direction control means may set the same photographing direction for all pixels of the two-dimensional image information and may sequentially change the photographing direction. Alternatively, the photographing direction control means may set a different photographing direction for each pixel of the two-dimensional image information and may sequentially change the photographing direction for each pixel.

A first method for photographing a three-dimensional image of the invention is a method for photographing a three-dimensional image for acquiring image information required for displaying a three-dimensional image of an object in a space. The method includes: a photographing step for photographing the object with a single photographing means to generate two-dimensional image information of the object; and a photographing direction controlling step for sequentially changing a photographing direction at the photographing step.

According to the method, the object is photographed with the single photographing means to generate two-dimensional image information of the object at the photographing step, and the photographing direction at the photographing step is sequentially changed at the photographing direction controlling step.

In the first method of the invention, for example, the photographing direction controlling step may deflect light by selecting a direction for incident light between the object and the photographing means to thereby change the photographing direction. Alternatively, the step may move the photographing means to thereby change the photographing direction, or may move a part of an optical system provided between the object and the photographing means to thereby change the photographing direction.

In the first method of the invention, for example, the photographing direction control means may set the same photographing direction for all pixels of the two-dimensional image information and sequentially change the photographing direction. Alternatively, the photographing direction control means may set a different photographing direction for each pixel of the two-dimensional image information and sequentially change the photographing direction for each pixel.

A second three-dimensional image photographing apparatus of the invention is an apparatus for acquiring image information required for displaying a three-dimensional image of an object in a space, and it has: photographing means for photographing the object to generate two-dimensional image information of the object; photographing direction setting means for setting a photographing direction for the photographing means, capable of setting a different photographing direction for each pixel of the two-dimensional image information; and photographing control means for controlling the photographing direction setting means to acquire two-dimensional image information with a low resolution that is lower than the resolution of the photographing means in every photographing direction that can be set, and for repeatedly performing a process of generating the two-dimensional image with the low resolution while changing pixels to which a specific photographing direction is assigned, to acquire two-dimensional information with the same resolution as the resolution of the photographing means in every photographing direction that can be set.

According to the second three-dimensional image photographing apparatus of the invention, the photographing means generates two-dimensional image information of an object. The photographing direction setting means is controlled by the photographing control means so as to acquire, in every photographing direction that can be set, two-dimensional image information with a low resolution that is lower than the resolution of the photographing means, and a process of generating the two-dimensional image information with the low resolution is repeatedly performed while changing pixels to which a specific photographing directions is assigned, to thereby acquire, in each of all the photographing directions that can be set, two-dimensional image information with a resolution that is the same as the resolution of the photographing means.

In the second three-dimensional image photographing apparatus of the invention, for example, the photographing means divides a two-dimensional image region into a plurality of sub-regions each having A pixels (A is an integer equal to or greater than 2) and sets each of all the photographing directions that can be set for one pixel in each of the sub-regions to acquire the two-dimensional image information with the low resolution that is 1/A of the resolution of the photographing means. The photographing means then repeats a process of generating the two-dimensional image information with the low resolution A times while changing pixels to which a specific photographing direction is assigned in the sub-regions, to acquire the two-dimensional image information with the same resolution as the resolution of the photographing means. In this case, for example, the photographing control means divides all the photographing directions that can be set into groups each consisting of A photographing directions and repeatedly performs a process of acquiring the two-dimensional image information with the low resolution in the A photographing directions, thereby acquiring the two-dimensional image information with the low resolution in all of the photographing directions that can be set.

In the second three-dimensional image photographing apparatus of the invention, for example, the photographing directing setting means may have defecting means provided between an object and the photographing means for deflecting incident light by selecting a direction.

A second method for photographing a three-dimensional image according to the invention is a method for acquiring image information required for displaying a three-dimensional image of an object in a space using: photographing means for photographing an object to generate two-dimensional image information of the object; and photographing direction setting means for setting a photographing direction for the photographing means, capable of setting a different photographing direction for each pixel of the two-dimensional image information. The method includes: a first step for controlling the photographing direction setting means to acquire, in each of all the photographing directions that can be set, two-dimensional image information with a low resolution that is lower than the resolution of the photographing means; and a second step for repeatedly performing the first step while changing pixels to which a specific photographing direction is assigned, to acquire two-dimensional image information with a resolution that is the same as the resolution of the photographing means in each of all the photographing directions that can be set.

According to the method, the photographing direction setting means is controlled at the first step so as to acquire two-dimensional image information with a low resolution that is lower than the resolution of the photographing means in each of all the photographing directions that can be set. At the second step, the first step is repeatedly performed while changing the pixels to which a specific photographing direction is assigned, to acquire two-dimensional image information with the same resolution as the resolution of the photographing means in each of all the photographing directions that can be set.

In the method, for example, the first step divides a two-dimensional image region into a plurality of sub-regions each having A pixels (A is an integer equal to or greater than 2) and sets each of all the photographing directions that can be set for one pixel in each of the sub-regions, thereby acquiring the two-dimensional image information with the low resolution, the low resolution being 1/A of the resolution of the photographing means. The second step repeatedly performs the first step A times while changing pixels to which a specific photographing direction is assigned in the sub-regions, thereby acquiring the two-dimensional image information with the same resolution as the resolution of the photographing means. In this case, for example, the first step divides all of the photographing directions that can be set into groups each consisting of A photographing directions, and repeatedly performs a process of acquiring the two-dimensional image information with the low resolution in the A photographing directions, thereby acquiring two-dimensional image information with the low resolution in all of the photographing directions that can be set.

A three-dimensional image display apparatus according to the invention is an apparatus for displaying a three-dimensional image of an object in a space by projecting a plurality of pieces of two-dimensional image information of the object obtained by viewing the object in different viewing directions, in projecting directions associated with the respective viewing directions. The apparatus has: projecting means for projecting the two-dimensional image information of the object; projecting direction setting means for setting a projecting direction for the projecting means, capable of setting a different projecting direction for each pixel of the two-dimensional image information; and display control means for displaying a three-dimensional image with a low resolution by controlling the projecting direction setting means to project two-dimensional image information with a low resolution that is lower than the resolution of the projecting means in every projecting direction that can be set, and for repeatedly performing a process of projecting the two-dimensional image information with the low resolution while changing pixels to which a specific projecting direction is assigned, to display a three-dimensional image with the same resolution as the resolution of the projecting means.

According to the three-dimensional image display apparatus of the invention, the two-dimensional image information of the object is projected by the projecting means. The projecting direction setting means is controlled by the display control means, so as to project two-dimensional image information with a low resolution that is lower than the resolution of the projecting means in every projecting direction that can be set, thereby displaying a three-dimensional image with a low resolution. A process of projecting the two-dimensional image information with the low resolution is repeatedly performed while changing pixels to which a specific projecting direction is assigned, to thereby display a three-dimensional image with a resolution that is the same as the resolution of the projecting means.

In the three-dimensional image display apparatus of the invention, for example, the display control means divides a two-dimensional image region into a plurality of sub-regions each having A pixels (A is an integer equal to or greater than 2) and sets each of all the projecting directions that can be set for one pixel in each of the sub-regions, to project the two-dimensional image information with the low resolution, the low resolution being 1/A of the resolution of the projecting means, thereby displaying a three-dimensional image with a low resolution, and repeatedly performs a process of projecting the two-dimensional image information with the low resolution A times while changing pixels to which a specific projecting direction is assigned in the sub-regions, to display a three-dimensional image with the same resolution as the resolution of the projecting means. In this case, for example, the display control means divides all of the projecting directions that can be set into groups each consisting of A projecting directions, and repeatedly performs a process of projecting the two-dimensional image information with the low resolution in the A photographing directions, thereby projecting the two-dimensional image information with the low resolution in all of the photographing directions that can be set.

In the three-dimensional image display apparatus of the invention, for example, the projecting direction setting means may have defecting means for deflecting light by selecting a direction for exiting light.

A method for displaying a three-dimensional image according to the invention is a method for displaying a three-dimensional image of an object in a space by projecting a plurality of pieces of two-dimensional image information of the object obtained by viewing the object in different viewing directions, in projecting directions associated with the respective viewing directions, using projecting means for projecting the two-dimensional image information of the object and projecting direction setting means for setting a projecting direction for the projecting means, capable of setting a different photographing direction for each pixel of the two-dimensional image information. The method includes: a first step for controlling the projecting direction setting means, so as to acquire, in every projecting direction that can be set, two-dimensional image information with a low resolution that is lower than the resolution of the projecting means, to thereby display a three-dimensional image with a low resolution; and a second step for repeatedly performing the first step while changing pixels to which a specific projecting direction is assigned, to thereby display a three-dimensional image with a resolution that is the same as the resolution of the projecting means.

In the method for displaying a three-dimensional image, at the first step, the projecting direction setting means is controlled so that the two-dimensional image information with a low resolution that is lower than the resolution of the projecting means is projected in every projecting direction that can be set, and a three-dimensional image with a low resolution is displayed. At the second step, the first step is repeatedly performed while changing pixels to which a specific projecting direction is assigned, and a three-dimensional image with a resolution that is the same as the resolution of the projecting means is thereby displayed.

In the method for displaying a three-dimensional image of the invention, for example, the first step divides a two-dimensional image region into a plurality of sub-regions each having A pixels (A is an integer equal to or greater than 2) and sets each of all the projecting directions that can be set for one pixel in each of the sub-regions, to project the two-dimensional image information with the low resolution, the low resolution being 1/A of the resolution of the projecting means, thereby displaying a three-dimensional image with the low resolution, and the second step repeatedly performs the first step A times while changing pixels to which a specific projecting direction is assigned in the sub-regions, to display a three-dimensional image with the same resolution as the resolution of the projecting means. In this case, for example, the first step divides all of the projecting directions that can be set into groups each consisting of A photographing directions, and repeatedly performs a process of projecting two-dimensional image information with the low resolution in the A projecting directions, to project two-dimensional image information with the low resolution in all of the projecting directions that can be set.

A three-dimensional image display position converting apparatus of the present invention is used in a system for displaying a three-dimensional image of an object in a space by projecting a plurality of pieces of two-dimensional image information of the object obtained by viewing the object in different viewing directions, in projecting directions associated with the respective viewing directions. The apparatus converts the position of the three-dimensional image of the object displayed in the space, and the apparatus has: quantity-of-movement calculating means for identifying a quantity of a movement of a position of the two-dimensional image information in a direction in the plane thereof that is required for moving a position of the three-dimensional image by a specific quantity of movement, based on information on the quantity of movement of the position of the three-dimensional image and the viewing directions or projecting directions; and position changing means for changing the position of the two-dimensional information by the quantity of movement identified by the quantity-of-movement calculating means.

According to the three-dimensional image display position converting apparatus of the invention, the quantity-of-movement calculating means identifies a quantity of movement of the two-dimensional image information in a direction in the plane thereof that is required for moving a position of the three-dimensional image by a specific quantity of movement, based on information on the quantity of movement of the position of the three-dimensional image and the viewing directions or projecting directions, and the position changing means changes the position of the two-dimensional image information by the quantity of movement identified by the quantity-of-movement calculating means.

In the three-dimensional image display position converting apparatus of the invention, for example, the quantity-of-movement calculating means identifies the quantity of movement of the position of the two-dimensional image information as a value proportionate to "b" which is expressed by b=a×tan θi where "a" represents the quantity of movement of the three-dimensional image and θi represents the viewing directions or projecting directions.

In the three-dimensional image display position converting apparatus of the invention, for example, the position changing means has: storage means for storing the two-dimensional image information; and address control means for changing the position of the two-dimensional image information by controlling write addresses for writing the information in the storage means and read addresses for reading the information from the storage means.

The three-dimensional image display position converting apparatus of the invention may be provided in a three-dimensional image photographing apparatus for photographing an object in a plurality of viewing directions to generate a plurality of pieces of two-dimensional image information of the object in different viewing directions. Alternatively, the three-dimensional image display position converting apparatus may be provided in a three-dimensional image display apparatus for displaying a three-dimensional image of an object in a space by projecting a plurality of pieces of two-dimensional image information of the object obtained by viewing the object in different viewing directions, in projecting directions associated with the respective viewing directions.

A method for converting a display position of a three-dimensional image of the present invention is a method for converting a position of a three-dimensional image of an object in a space, and is used in a system for displaying a three-dimensional image of an object in a space by projecting a plurality of pieces of two-dimensional image information of the object by viewing the object in different viewing directions, in projecting directions associated with the respective viewing directions. The method includes: a quantity-of-movement calculating step for identifying a quantity of a movement of a position of the two-dimensional image information in a direction in the plane thereof that is required for moving a position of the three-dimensional image by a specific quantity of movement, based on information on the quantity of movement of the position of the three-dimensional image and the viewing directions or projecting directions; and a position changing step for changing the position of the two-dimensional information by the quantity of movement identified by the quantity-of-movement calculating step.

According to the method for converting the display position of a three-dimensional image of the invention, the quantity-of-movement calculating step identifies the quantity of movement of the position of the two-dimensional image information in a direction in the plane thereof that is required for moving the position of the three-dimensional image by a specific quantity of movement, based on information on the quantity of movement of the position of the three-dimensional image and the viewing directions or projecting directions, and the position changing step changes the position of the two-dimensional image information by the quantity of movement identified by the quantity-of-movement calculating step.

In the method for converting the display position of a three-dimensional image of the invention, for example, the quantity-of-movement calculating step identifies the quantity of movement of the position of the two-dimensional image information as a value proportionate to "b" which is expressed by b=a×tan θi where "a" represents the quantity of movement of the three-dimensional image and θi represents the viewing directions or projecting directions.

In the method for converting the display position of a three-dimensional image of the invention, for example, the position changing step changes the position of the two-dimensional image information by controlling write address for storing information in storage means for storing the two-dimensional image information and read address for reading the information from the storage means.

The above and other objects, features and advantages of the invention will become sufficiently apparent from the following description.

BEST MODES FOR CARRYING OUT THE INVENTION

A detailed description will now be made with reference to the drawings on apparatuses and methods for photographing a three-dimensional image, apparatuses and methods for displaying a three-dimensional image, and apparatuses and methods for converting the display position of a three-dimensional image according to embodiments of the invention.

FIRST EMBODIMENT

First, a description will be made with reference to FIGS. 1 and 2 on principles behind photographing and display of a three-dimensional image in a first embodiment of the invention.

Figure 1:
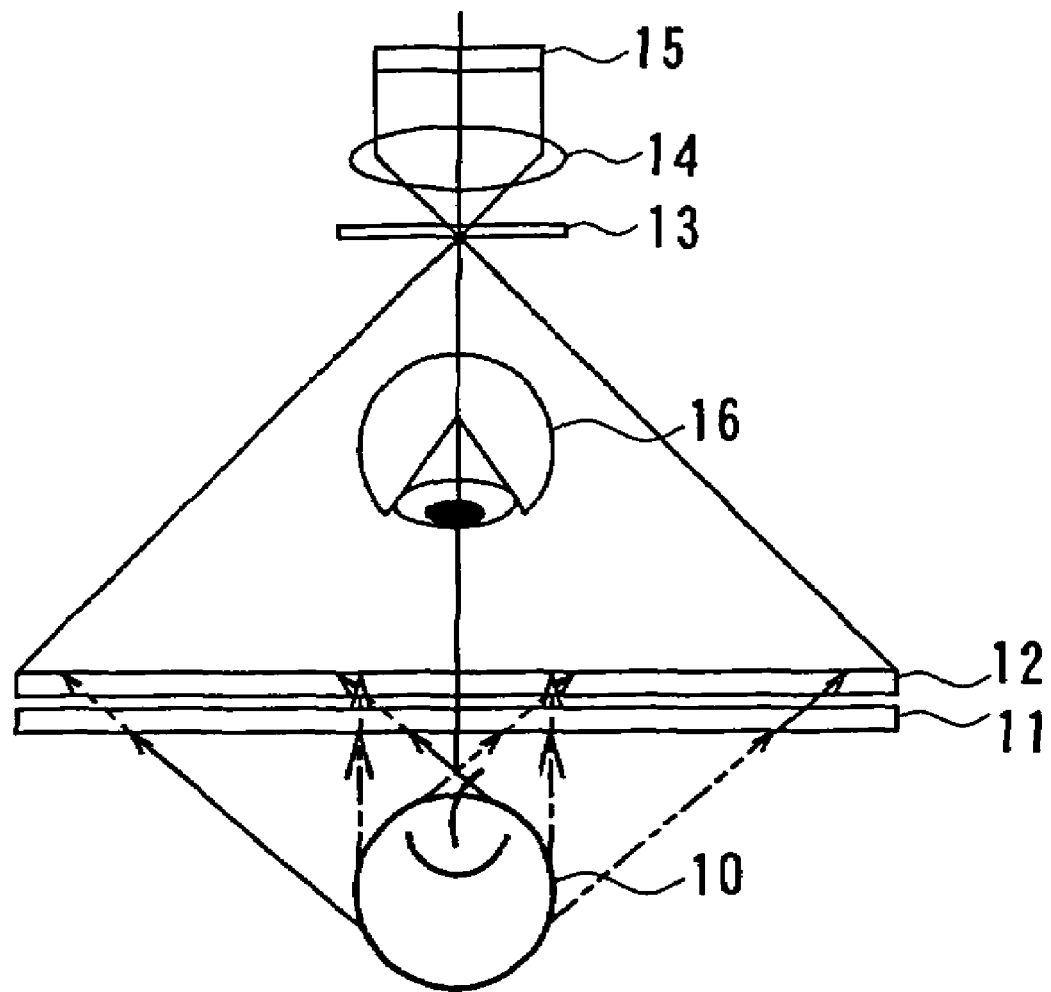
FIG. 1 is an illustration showing a schematic configuration of a three-dimensional image photographing apparatus of a first embodiment of the invention.

FIG. 1 is an illustration showing a schematic configuration of a three-dimensional image photographing apparatus of the present embodiment. The three-dimensional image photographing apparatus of the present embodiment has: a deflecting plate 11 capable of selecting a direction for incident light and a direction for exiting light in a predetermined range of angles; a converging lens 12 provided in a face-to-face relationship with one surface of the deflecting plate 11; and a pinhole member 13, a converging lens 14 and a CCD (charge coupled device) 15 provided in that order on the side of the converging lens 12 opposite to the deflecting plate 11. The pinhole member 13 has a pinhole that allows light to pass through.

In the three-dimensional image photographing apparatus, the surface of the deflecting plate 11 opposite to the converging lens 12 is directed at an object 10 to be photographed. The deflecting plate 11 corresponds to the photographing direction control means of the invention. When parallel beams of light perpendicularly enter the converging lens 12 from the deflecting plate 11, it converges the light such that the exiting light will have a smallest diameter in the position of the pinhole of the pinhole member 13. For example, a Fresnel lens is used as the converging lens 12. The converging lens 14 forms an image of the object 10 on a photographic surface of the CCD 15 by converging light that has diffused after passing through the pinhole. The converging lens 12, pinhole member 13, converging lens 14, and CCD 15 correspond to the photographing means of the invention.

An operation of the three-dimensional image photographing apparatus shown in FIG. 1 will now be described. Light from the object 10 enters the deflecting plate 11. The deflecting plate 11 selectively allows only beams of light at a predetermined angle to the plane of the deflecting plate 11 to pass through among the incident beams of light to cause them to exit as parallel beams of light perpendicular to the plane of the deflecting plate 11. The converging lens 12 converges the parallel beams of light from the deflecting plate 11. The beams of light pass through the pinhole of the pinhole member 13 and are converged by the converging lens 14 to enter the CCD 15. A two-dimensional image of the object 10 in a predetermined viewing direction is formed on the photographic surface of the CCD 15. In the three-dimensional image photographing apparatus, a photographic operation is performed based on an assumption that a view point 16 is in a position that is opposite to the object 10 with respect to the deflecting plate 11 and converging lens 12 located between them. The angle of incident beams of light selected at the deflecting plate 11 is changed sequentially as time passes.

Thus, in the three-dimensional image photographing apparatus shown in FIG. 1, the object 10 is photographed with the single photographing means (CCD 15 or the like) to generate two-dimensional image information of the object 10, and the photographing direction is sequentially changed. Therefore, image information output by the CCD 15 is a plurality of pieces of two-dimensional image information for which the photographing direction changes as time passes and which serve as image information required for displaying a three-dimensional image of the object in a space.

Figure 2:
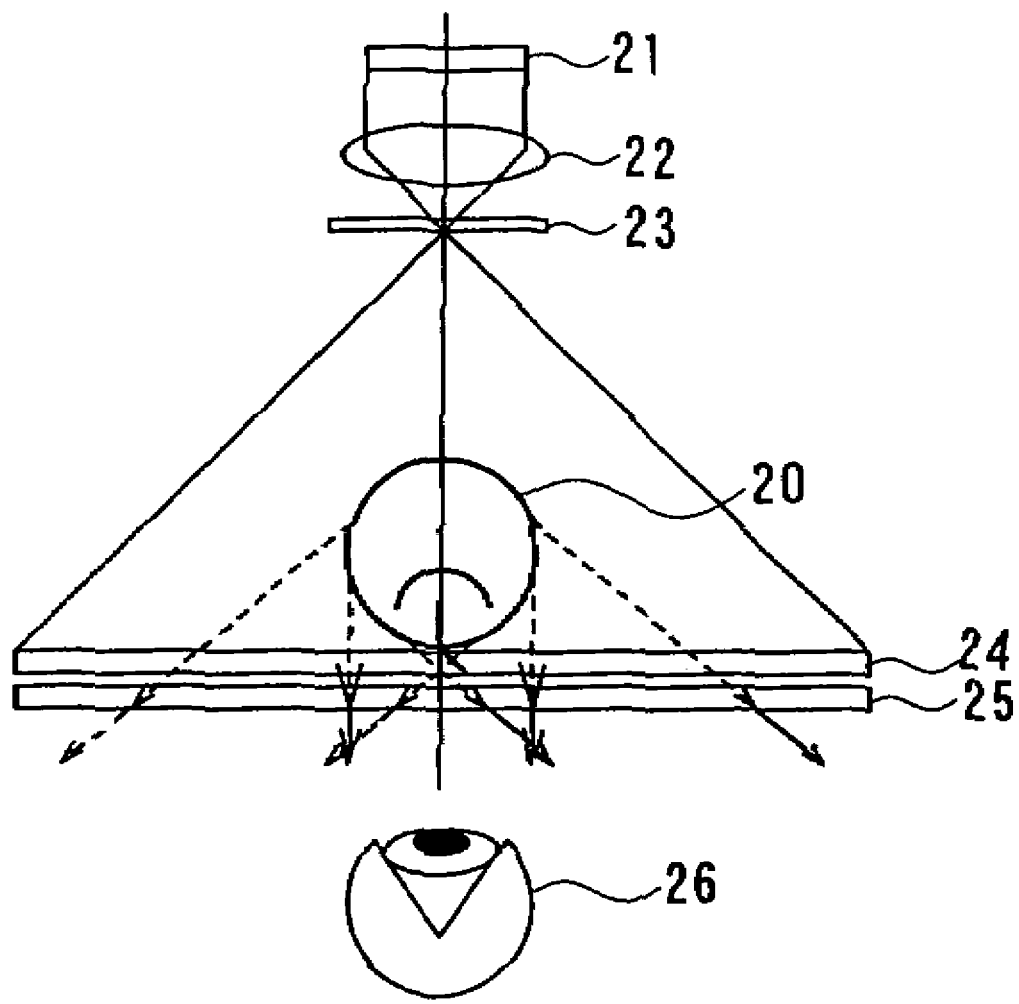
FIG. 2 is an illustration showing a schematic configuration of a three-dimensional image display apparatus of the first embodiment of the invention.

FIG. 2 is an illustration showing a schematic configuration of a three-dimensional image display apparatus of the present embodiment. The three-dimensional image display apparatus of the present embodiment has a transmission type liquid crystal display (hereinafter referred to as "LCD") 21 as a spatial light modulator that spatially modulates light passing therethrough based on two-dimensional image information, and a converging lens 22, a pinhole member 23, a converging lens 24 and a deflecting plate 25 provided in that order on the light exit side of the LCD 21. The pinhole member 23 has a pinhole that allows light to pass. The converging lens 22 converges light exiting the LCD 21 to a minimum diameter in the position of the pinhole of the pinhole member 23. The converging lens 24 collimates light that has passed through the pinhole. For example, a Fresnel lens is used as the converging lens 24. The deflecting plate 25 causes light from the converging lens 24 to exit as parallel beams of light at a predetermined angle to the plane of the deflecting plate 25. The LCD 21, converging lens 22, pinhole member 23, converging lens 24, and deflecting plate 25 correspond to the projecting means of the invention. The deflecting plate 25 corresponds to the projecting direction setting means of the invention.

An operation of the three-dimensional image display apparatus shown in FIG. 2 will now be described. The LCD 21 spatially modulates light based on two-dimensional image information acquired by the three-dimensional image photographing apparatus shown in FIG. 1. The light modulated by the LCD 21 is converged by the converging lens 22, passes through the pinhole of the pinhole member 23, and is collimated by the converging lens 24 to enter the deflecting plate 25. The deflecting plate 25 causes the light from the converging lens 24 to exit as parallel beams of light at a predetermined angle to the plane of the deflecting plate 25. The angle of the beams of light exiting the deflecting plate 25 sequentially changes as time passes such that they coincide with the angle of the beams of light incident upon the deflecting plate 11 at the time of photographing.

Thus, according to the three-dimensional image display apparatus shown in FIG. 2, light is modulated by the LCD 21 to reproduce two-dimensional images based on the two-dimensional image information acquired by the three-dimensional image photographing apparatus shown in FIG. 1 for which the photographing direction changes. The two-dimensional images exit the deflecting plate 25 at an angle that coincides with the angle of the beams of light incident upon the deflecting plate 11 at the time of photographing. As a result, a three-dimensional image (stereoscopic image) 20 of the object 10 is formed in a space. A viewer 26 located on the light exit side of the deflecting plate 25 can view the three-dimensional image 20.

The two-dimensional image information supplied to the LCD 21 is two-dimensional image information that is a result of inversion of the two-dimensional image information acquired by the three-dimensional image photographing apparatus shown in FIG. 1 in the vertical and horizontal directions. To display a stereoscopic three-dimensional image only in the horizontal direction, it is only required to supply two-dimensional image information that is an inversion of the two-dimensional image information acquired by the three-dimensional image photographing apparatus shown in FIG. 1 in the horizontal direction. In this case, it is required to provide a diffusing plate for diffusing light in the vertical direction on the light exit side of the deflecting plate 25. For example, the diffusing plate is constituted by a vertical array of a multiplicity of very small semicylindrical lenses extending in the horizontal direction.

Figure 3:
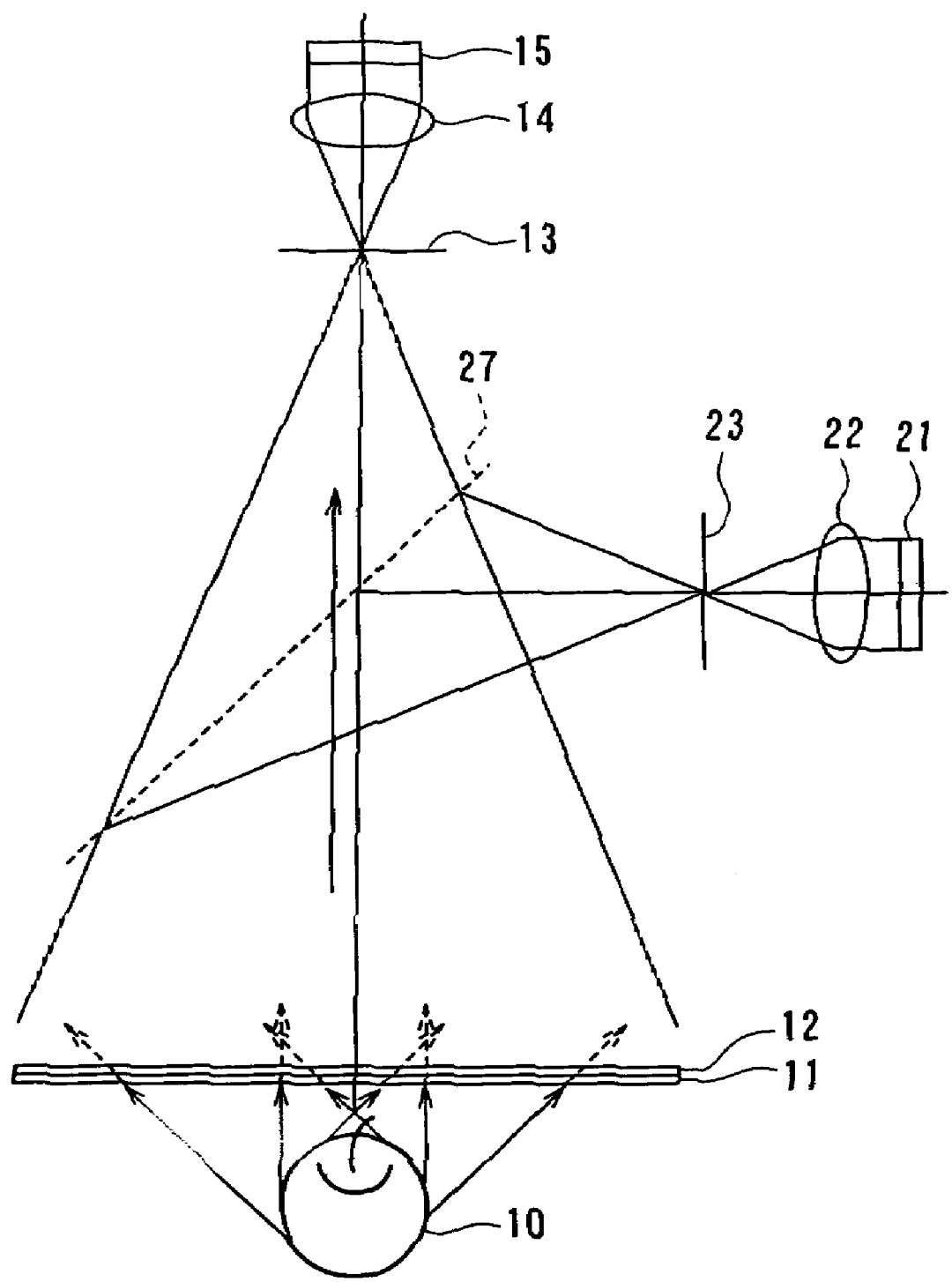
FIG. 3 is an illustration for explaining a positional relationship between the three-dimensional image photographing apparatus and three-dimensional image display apparatus of the first embodiment of the invention.
Figure 4:
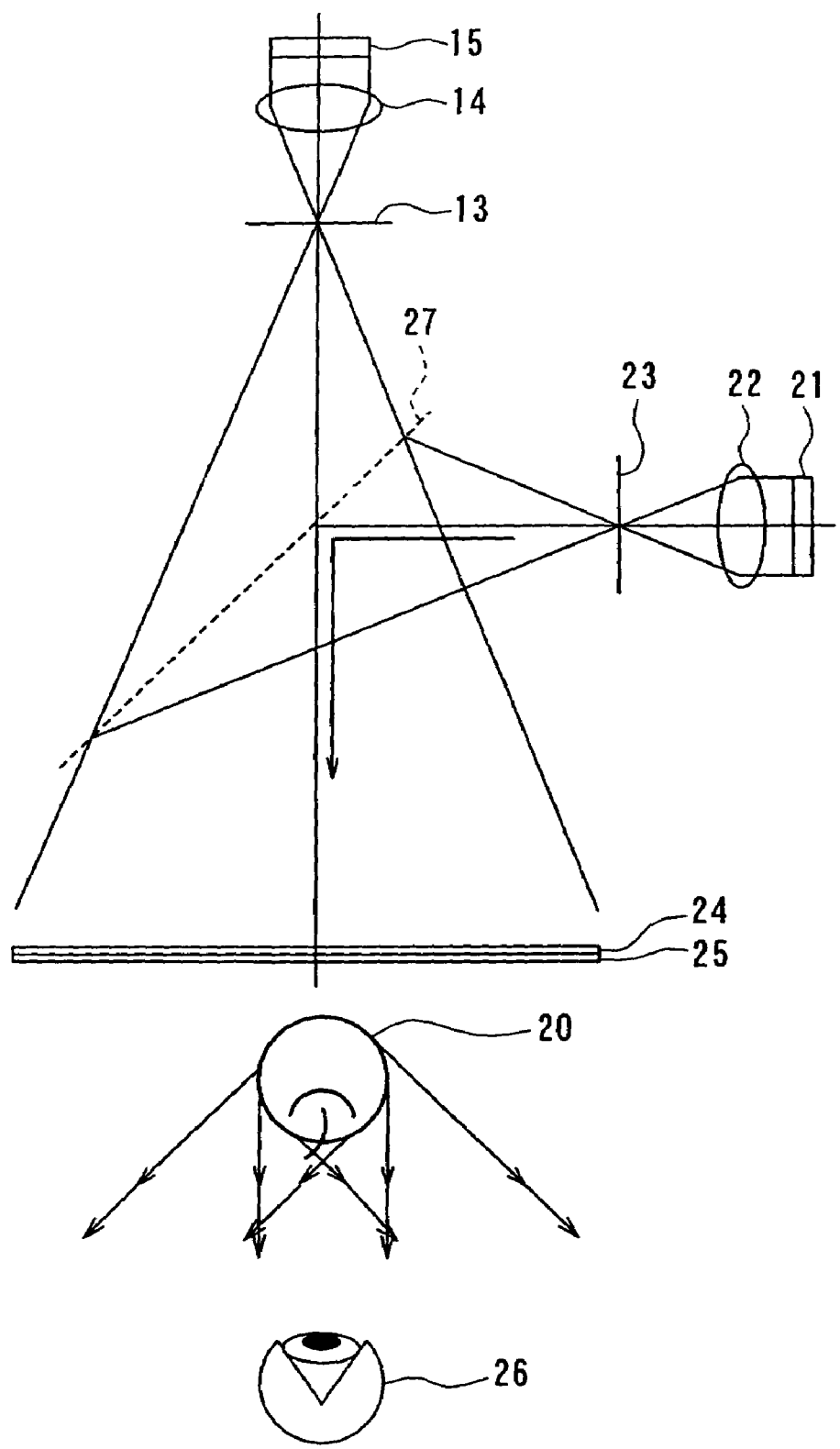
FIG. 4 is an illustration for explaining another positional relationship between the three-dimensional image photographing apparatus and three-dimensional image display apparatus of the first embodiment of the invention.

A conceptual description will be made with reference to FIGS. 3 and 4 on the positional relationship between the three-dimensional image photographing apparatus and three-dimensional image display apparatus of the present embodiment by presenting an example in which a stereoscopic three-dimensional image is displayed only in the horizontal direction. FIG. 3 is an illustration showing an optical system in which the optical system of the three-dimensional image display apparatus shown in FIG. 2 overlaps the optical system of the three-dimensional image photographing apparatus shown in FIG. 1. FIG. 4 is an illustration showing an optical system in which the optical system of the three-dimensional image photographing apparatus shown in FIG. 1 overlaps the optical system of the three-dimensional image display apparatus shown in FIG. 2. In the optical system shown in those figures, an imaginary half mirror 27 is provided between the converging lens 12 and the pinhole member 13. The half mirror 27 is provided such that the normal of a reflecting surface thereof is at 45 degrees to the optical axis of the optical system of the three-dimensional image photographing apparatus. The pinhole member 23, converging lens 22 and LCD 21 of the three-dimensional image display apparatus are located in a direction in which light from the converging lens 12 travels after being reflected by the half mirror 27.

At the time of photographing, an image of the object 10 is formed on the CCD 15. At this time, if the light from the converging lens 12 is reflected by the half mirror 27 to form an image on the LCD 21, the image formed on the LCD 21 is an image that is an inversion of the image formed on the CCD 15 in the horizontal direction. For display, the LCD 21 is driven to form the inverted image.

Figure 5:
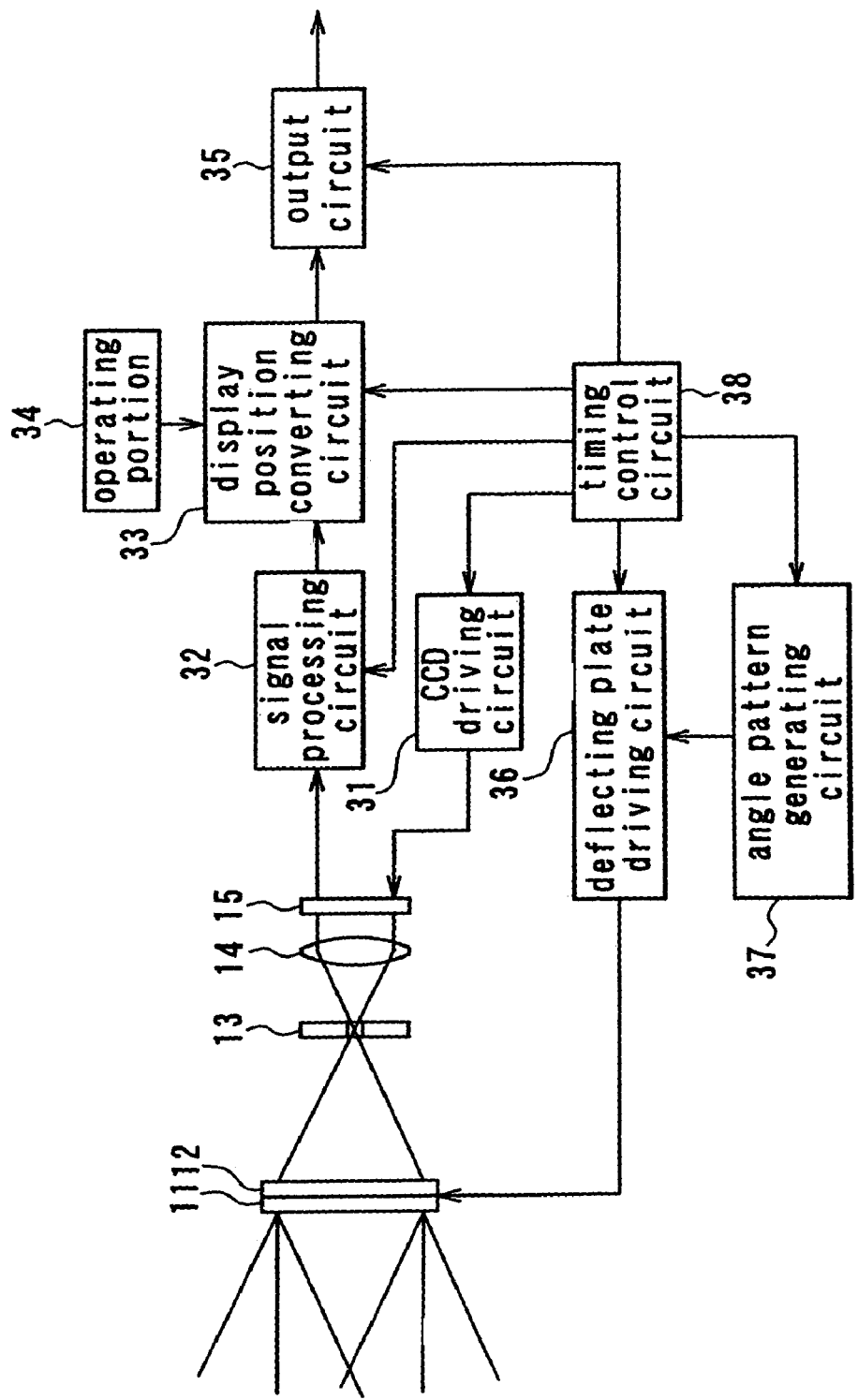
FIG. 5 is a block diagram of the three-dimensional image photographing apparatus of the first embodiment of the invention showing a configuration thereof.

The configuration of the three-dimensional image photographing apparatus of the present embodiment will now be described in detail with reference to FIG. 5. FIG. 5 is a block diagram of the three-dimensional image photographing apparatus of the present embodiment showing the configuration thereof. In addition to the configuration shown in FIG. 1, the three-dimensional image photographing apparatus has: a CCD driving circuit 31 for driving the CCD 15; a signal processing circuit 32 for processing signals output by the CCD 15 to output image signals; a display position converting circuit 33 to which the signals output by the signal processing circuit 32 are input and which performs a display position converting process to be described later as needed; an operating portion 34 for supplying information on the quantity of a movement of a display position to the display position converting circuit 33; and an output circuit 35 for superimposing synchronization signals to the output of the display position converting circuit 33 to output video signals. Further, the three-dimensional image photographing apparatus has: a deflecting plate driving circuit 36 for driving the deflecting plate 11; an angle pattern generating circuit 37 for supplying the deflecting plate driving circuit 36 with information on spatial and temporal patterns of selected angles for incident light; and a timing control circuit 38 for controlling the timing of the operation of each of the above-described circuits.

The CCD 15 may be intended for either of monochrome and color images. For example, when a CCD 15 for color images is used, it may be a single plate/color filter type having filters in colors R, G, and B and, alternatively, it may be a three plate type including color separating means for separating incident light into the colors R, G, and B and three monochrome CCDs for receiving the separated light.

An operation of the three-dimensional image photographing apparatus shown in FIG. 5 will now be described. The deflecting plate driving circuit 36 drives the deflecting plate 11 such that the angle of incident light selected by the deflecting plate 11 sequentially changes in a predetermined period. The following description is based on an assumption that the angle of incident light selected by the deflecting plate 11 changes from θ1 to θ60 with increments of Δθ. For example, Δθ is one degree.

The CCD driving circuit 31 drives the CCD 15 in synchronism with the driving of the deflecting plate 11 by the deflecting plate driving circuit 36 such that information on one two-dimensional image can be acquired for each angle of incident light selected by the deflecting plate 11. Signals output by the CCD 15 are processed by the signal processing circuit 32 into image signals. The image signals are subjected to the display position converting process at the display position converting circuit 33 as necessary, and transmitted to the output circuit 35. Then, the output circuit 35 outputs video signals. The operation and configuration of the display position converting circuit 33 will be described in detail later.

Figure 6:
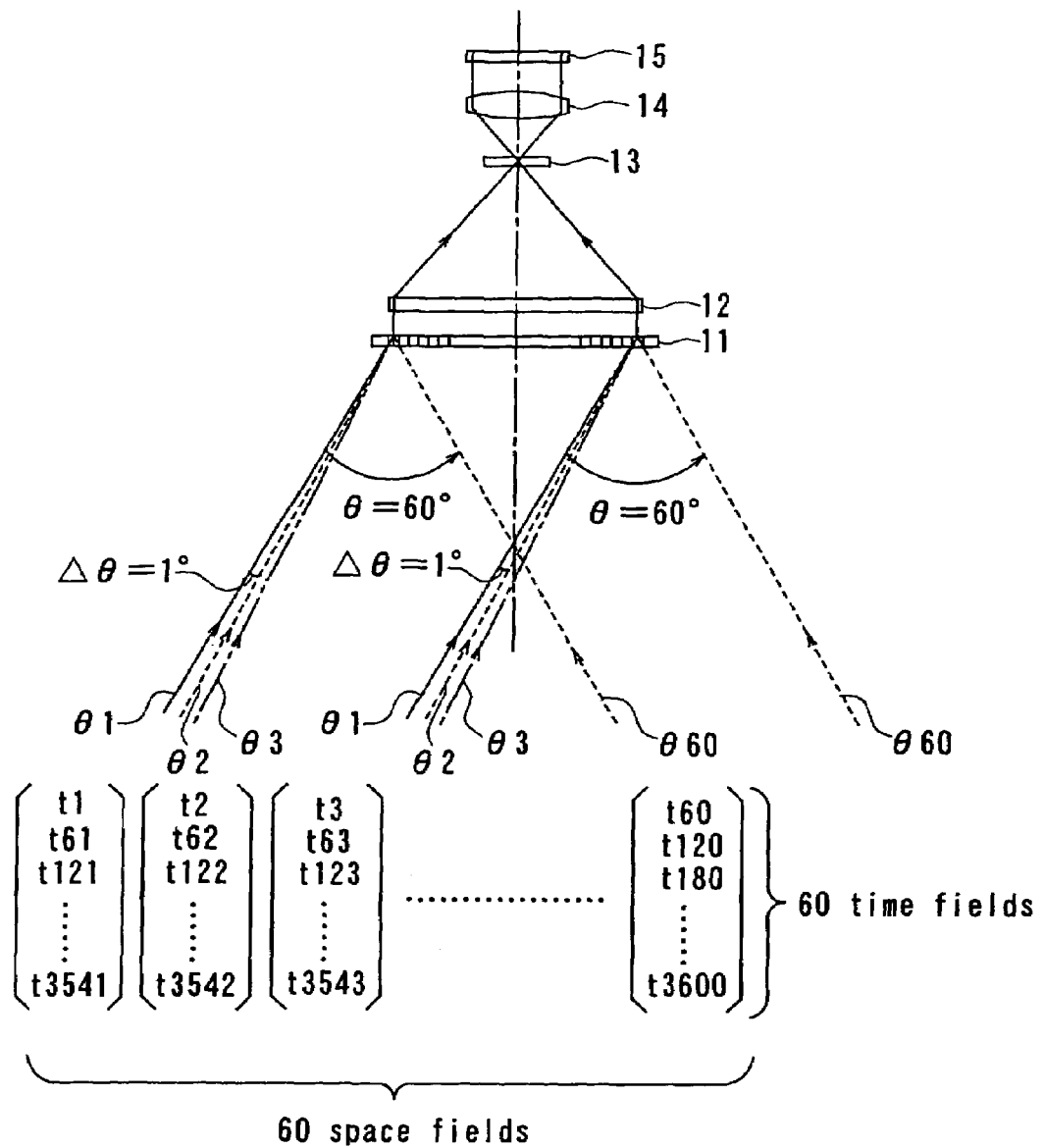
FIG. 6 is an illustration showing association and relationship between angles of incident light selected by the deflecting plate in FIG. 5 and images acquired by the CCD.

FIG. 6 is an illustration showing association and relationship between angles of incident light selected by the deflecting plate 11 and images acquired by the CCD 15. As shown in the figure, the angle of incident light selected by the deflecting plate 11 changes from θ1 to θ60 with angular increments of Δθ(=1 degree). The CCD 15 acquires a two-dimensional image of an object to be photographed at each of angles θi (i=1, 2, . . . , 60). In the present embodiment, one two-dimensional image acquired at each of the angles θi is referred to as "an image for one fields. Therefore, scan at the angles of incident light θ1 through θ60 provides two-dimensional images for 60 field". In the following description, a set of two-dimensional images obtained by the scan at the angles θ1 through θ60 is referred to as "images for 60 space fields". One three-dimensional still image is formed by images for 60 space fields. Therefore, the 60 space fields at the angles θ1 through θ60 are referred to as "one space frame". The image acquisition at the angles θ1 through θ60 is controlled such that it is performed at respective points in time t1 through t60.

When the acquisition of the images for the 60 space fields at the angles θ1 through θ60 is completed, further images for the 60 space fields at the angles θ1 through θ60 are acquired at subsequent points in time t61 through t120. Thereafter, the acquisition of images for 60 space fields each is similarly repeated. When this is repeated 60 times, images for 3600 fields are acquired in total. For a certain angle θi of interest, images for 60 fields are acquired at points in time ti through t(i+60×59). In the following description, two-dimensional images acquired at points in time ti through t(i+60×59) at each angle θi is referred to as "images for 60 time fields".

Let us assume here that it takes 1/60 sec. to change the angle of incident light from the angle θ1 to θ60 and to acquire images for the 60 space fields. Then, a period Δt for a change of the angle of incident light and image acquisition is 1/3600 sec., and images for 3600 fields are acquired in one sec.

Figure 7:
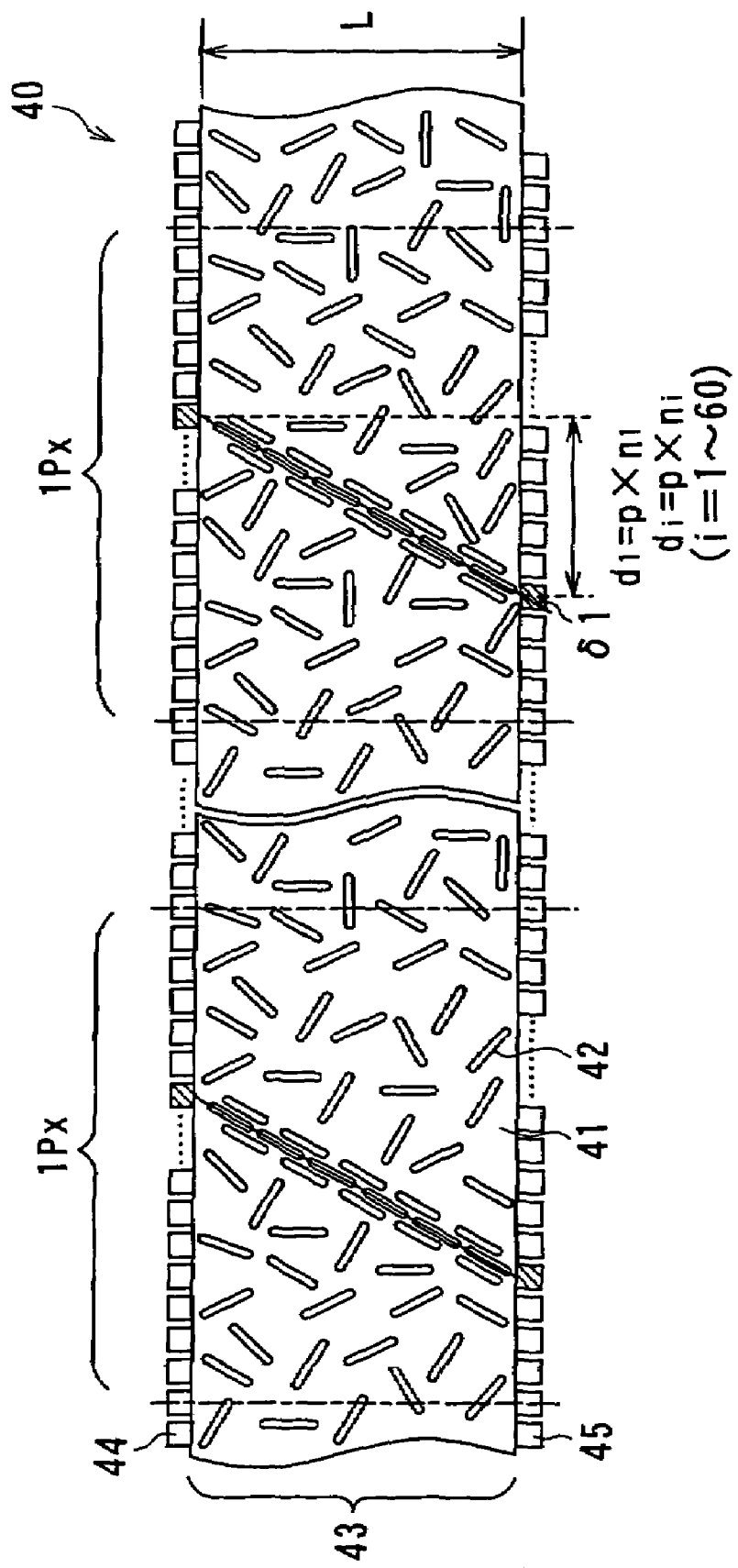
FIG. 7 is an illustration showing a configuration of a liquid crystal device used in the deflecting plate in FIG. 5.

An example of a configuration of the deflecting plate 11 of the three-dimensional image photographing apparatus will now be described. FIG. 7 shows a configuration of a liquid crystal device used for the reflecting plate 11. A liquid crystal device 40 is formed using an element referred to as "polymer dispersed liquid crystal (PDLC)" or "liquid crystal polymer composite". This polymer dispersed liquid crystal element has a function of allowing an opaque state and a transparent state to be switched depending on the viewing angle utilizing an effect of a match between the refractive indices of the polymer and liquid crystal which is achieved by applying a voltage to the composite of the polymer and liquid crystal to align the orientation of the liquid crystal molecules with the direction of the electric field.

The liquid crystal device 40 has: a polymer/liquid crystal composite layer 43 formed by dispersing needle-shaped liquid crystal molecules 42 of a few microns or less in a polymeric material 41; and stripe electrodes 44 and 45 with a microscopic width which are formed on an entrance surface and an exit surface of the polymer/liquid crystal composite layer 43 such that they face each other with the polymer/liquid crystal composite layer 43 interposed therebetween and such that they extend in the direction orthogonal to the plane of the figure. While the stripe electrodes 44 and 45 may be provided such that the directions of the stripes (the longitudinal directions of the electrodes) are in parallel with each other as described above, for example, the so-called simple matrix arrangement in which the directions of the stripes are orthogonal to each other may be employed. Alternatively, an active matrix arrangement configured using TFTs (thin film transistors) or the like may be employed. In those cases, the deflecting direction control can be performed in two directions.

The stripe electrodes 44 and 45 are formed of transparent conductive films such as ITOs (indium tin oxides) and extend in the direction orthogonal to the plane of the figure (longitudinal direction). A predetermined voltage is selectively applied between the stripe electrodes 44 and 45. 1Px in the figure represents a region corresponding to one pixel. The stripe electrodes 44 and 45 are arranged at a pitch which is kept as small as possible provided that the 60 angles θ1 through θ60 can be accommodated.

Liquid crystal optical axes (longitudinal axes) of the liquid crystal molecules 42 are oriented in random directions in the polymeric material 41 when no voltage is applied thereto. In this state, the effective refractive index of the liquid crystal molecules 42 and the refractive index of the polymeric material 41 do not match, and the polymer/liquid crystal composite layer 43 as a whole is in an opaque and white state as a result of a light scattering effect at interfaces between the liquid crystal molecules 42 and polymeric material 41. On the contrary, when a voltage is selectively applied between the stripe electrodes 44 and 45, the directions of the optical axes of the liquid crystal molecules 42 are aligned in coincidence with the direction of the electric field within a small range of expansion of the resultant electric field. As a result, the apparent refractive index of the liquid crystal molecules 42 will have a value n0 which is a value of the liquid crystal molecules 42 associated with normal beams of light. Therefore, use of a polymeric material 41 having a refractive index substantially equal to n0 eliminates the difference between the refractive indices of the liquid crystal molecules 42 and polymeric material 41 at interfaces between them, which reduces the light scattering effect in the direction of the electric field to make the polymer/liquid crystal composite layer 43 transparent. Specifically, light passes only in the direction of the electric field.

For example, let us assume here that L represents the thickness of the polymer/liquid crystal composite layer 43; and p represents the pitch at which the stripe electrodes 44 and 45 are arranged. In this case:

$$\tan \delta i = di/L = p \times ni/L$$

where δi represents the angle of the direction of light passing through the polymer/liquid crystal composite layer 43 to the normal of the surface of the polymer/liquid crystal layer 43; ni represents the quantity of an offset between the stripe electrodes 44 and 45 at that time in the horizontal direction represented in terms of the number of pitches; and di represents the quantity of the offset between the stripe electrodes 44 and 45, represented in terms of distance. Then, the number ni of horizontal offset pitches between the stripe electrodes 44 and 45 required for achieving a predetermined angle δi is expressed by the following Equation (1) where i=1, 2, . . . , 60.

$$ni = L \times \tan \delta i / p \qquad (1)$$

Figure 8:
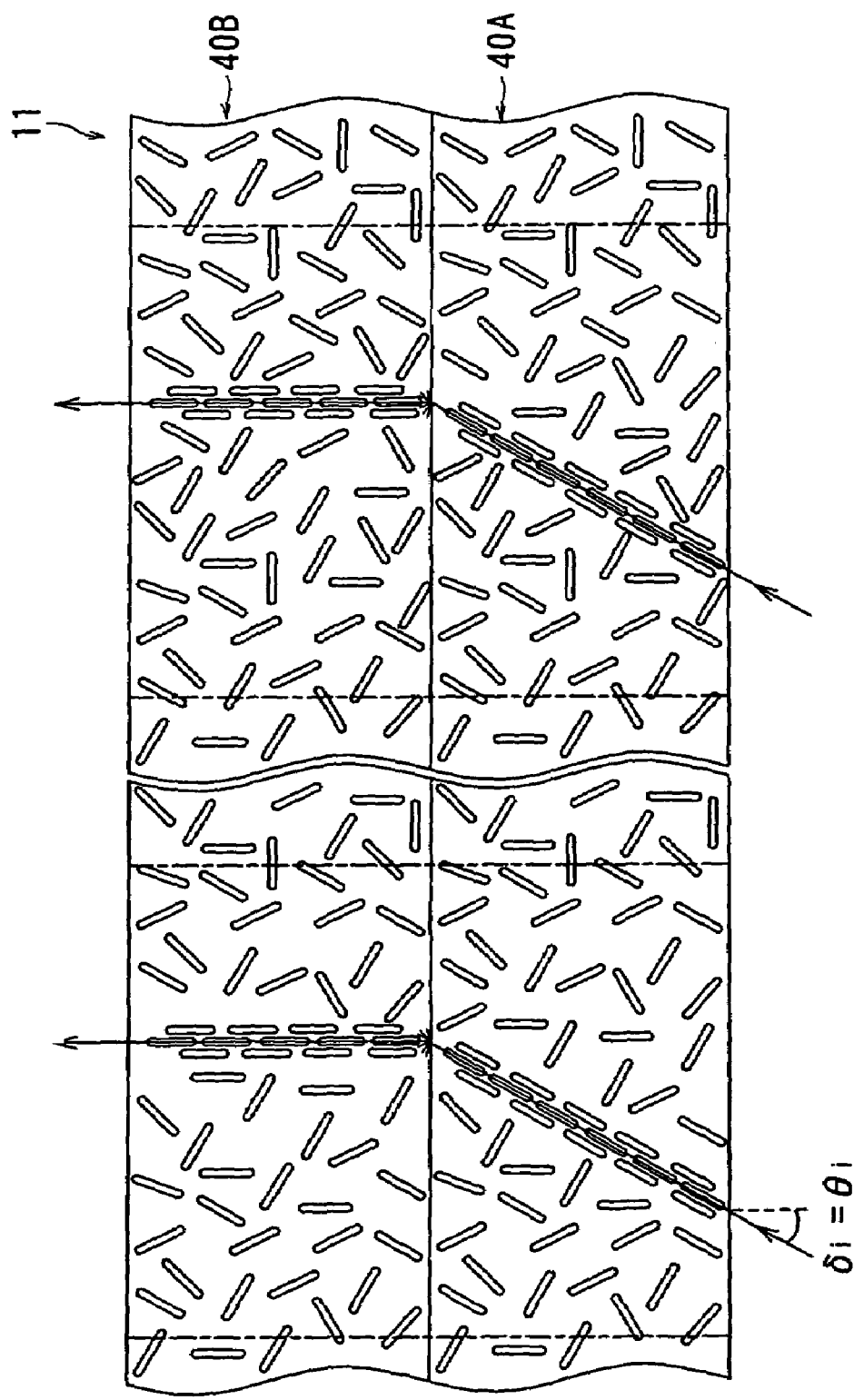
FIG. 8 is an illustration showing a configuration of the deflecting plate in FIG. 5.

FIG. 8 shows a configuration of the deflecting plate 11 utilizing the above-described liquid crystal device 40. As shown in the figure, the deflecting plate 11 used in the three-dimensional image photographing apparatus has a structure in which two liquid crystal devices 40 are overlapped with each other. Hereinafter, the liquid crystal device 40 on the entrance side of the deflecting plate 11 is represented by reference number 40A, and the liquid crystal device 40 on the exit side is represented by reference number 40B. The stripe electrodes 44 and 45 are omitted in the illustration of FIG. 8. The interface between the liquid crystal devices 40A and 40B is a light scattering surface.

The deflecting plate 11 is driven as follows. In the liquid crystal device 40A, the application of a voltage to the stripe electrodes 44 and 45 is controlled such that the angle δi of light passing through the device becomes selected angles θ1 through θ60 of incident light. Light that has passed through the liquid crystal device 40A is scattered at the light scattering surface between the liquid crystal devices 40A and 40B. In the liquid crystal device 40B, the application of a voltage to the stripe electrodes 44 and 45 is controlled such that only beams of light perpendicular to the plane of the liquid crystal device 40B pass through the liquid crystal device 40B among the beams of light that have passed through the liquid crystal device 40A and scattered at the light scattering surface. As a result, only beams of light that have entered at an angle θi pass through the deflecting plate 11 and exit the deflecting plate 11 perpendicularly to the plane thereof.

Figure 9:
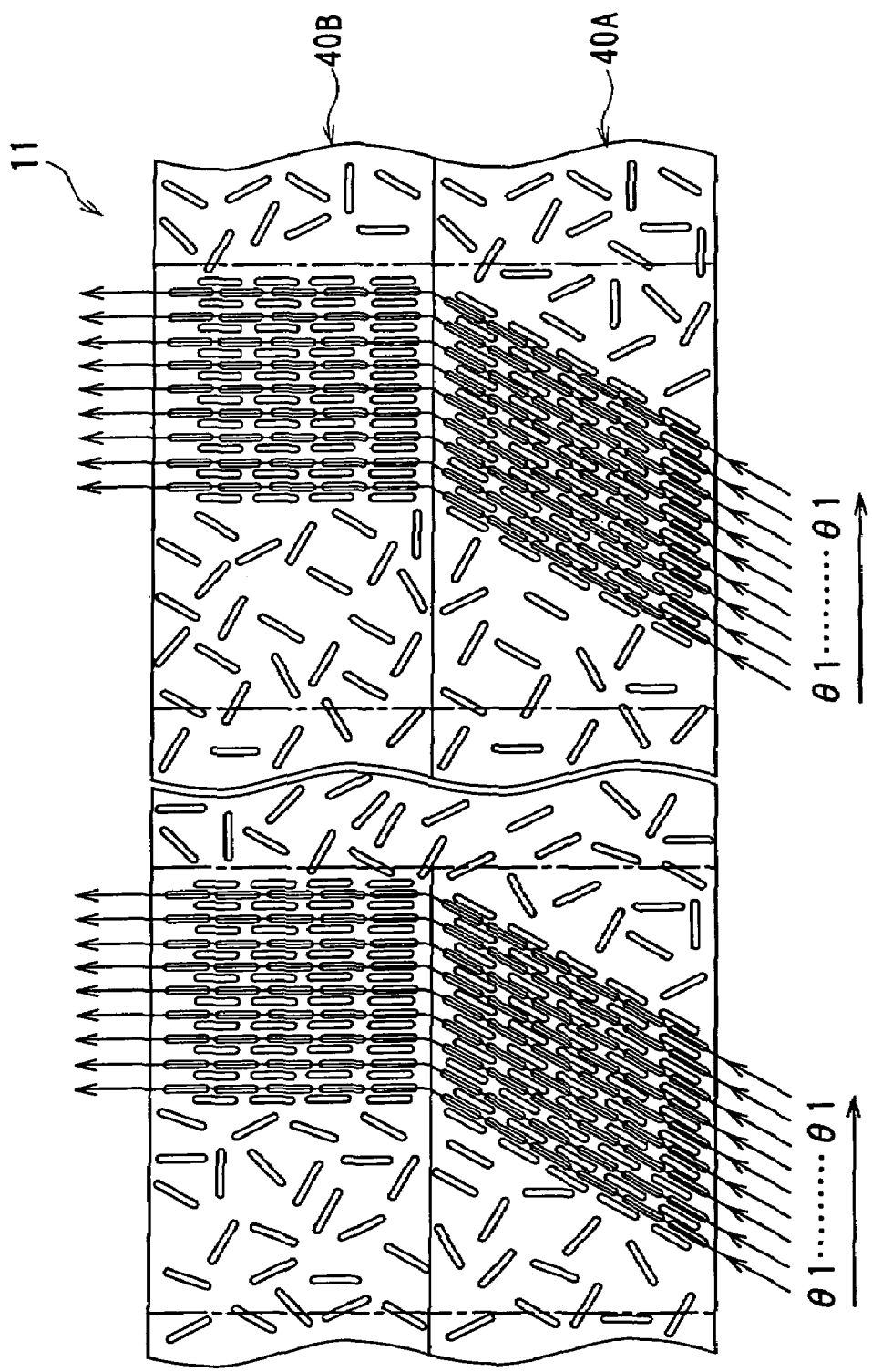
FIG. 9 is an illustration for explaining an operation of the deflecting plate shown in FIG. 8.
Figure 10:
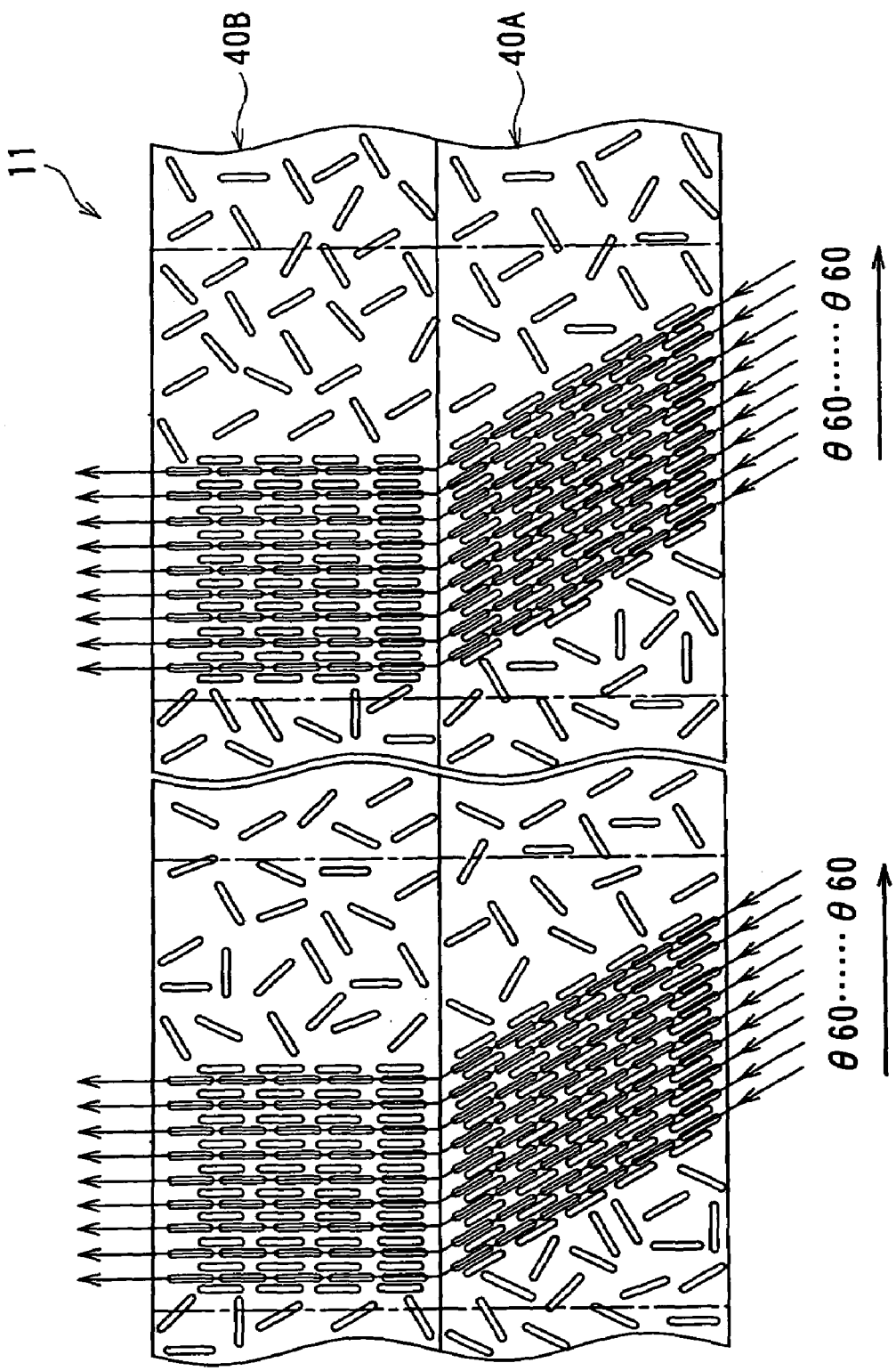
FIG. 10 is an illustration for explaining an operation of the deflecting plate shown in FIG. 8.

FIG. 9 shows an operation of the deflecting plate 11 when incident light is at the angle θ1, and FIG. 10 shows an operation of the deflecting plate 11 when incident light is at the angle θ60. As shown in those figures, the application of a voltage to the stripe electrodes 44 and 45 of the liquid crystal devices 40A and 40B is controlled such that the pair of electrodes to which the voltage is applied are sequentially shifted, for example, from the left side to the right side as indicated by the arrow in the figure while keeping the angle θi between a straight line connecting each pair of electrodes to which the voltage is applied and the plane of the deflecting plate 11. More specifically, scan for applying a pulse voltage to the stripe electrodes 44 arranged on the side of the exit surface sequentially (hereinafter referred to as "voltage application scan") is performed in synchronism with voltage applications can for applying a pulse voltage to the stripe electrodes 45 arranged on the side of the entrance surface sequentially at predetermined time intervals. At this time, control is performed to maintain a horizontal offset distance associated with the angle θi between a stripe electrode 45 on the side of the entrance surface to which the voltage is applied and a stripe electrode 44 on the side of the exit surface to which the voltage is applied. Such an operation is simultaneously performed in each region associated with each pixel.

Voltage application scan for one angle θi is performed in a time period of 1/3600 sec. Therefore, the time required for voltage application scan for all of the angles θ1 through θ60 is 1/60 sec.

For example, the polymer/liquid crystal composite layer 43 is formed using a method wherein a solution of a polymer and a liquid crystal is applied to a substrate and the solvent is evaporated thereafter, or a method utilizing an effect of formation of small liquid crystal droplets as a result of deposition of the liquid crystal that occurs when monomers of a polymeric material is polymerized and hardened. However, it may be formed using other methods. For example, it may have a structure in which a nematic liquid crystal is dispersed in an aqueous solution of polyvinyl alcohol (PVA) or the like to form microcapsules of liquid crystal droplets or a structure in which a small amount of a gelatine polymeric material is dispersed in a liquid crystal. While spherical liquid crystal molecules are used in a conventional polymer dispersed liquid crystal, it is desirable that liquid crystal molecules have a needle-like shape for applications like the present embodiment in which they must have directivity. For example, methods for forming such a needle-shaped liquid crystal includes a method in which a liquid crystal is deposited in a uniform magnetic field to form microcapsules. According to this method, needle-shaped liquid crystal molecules 42 are formed as a result of a tidal effect in the direction of a magnetic field.

Figure 11:
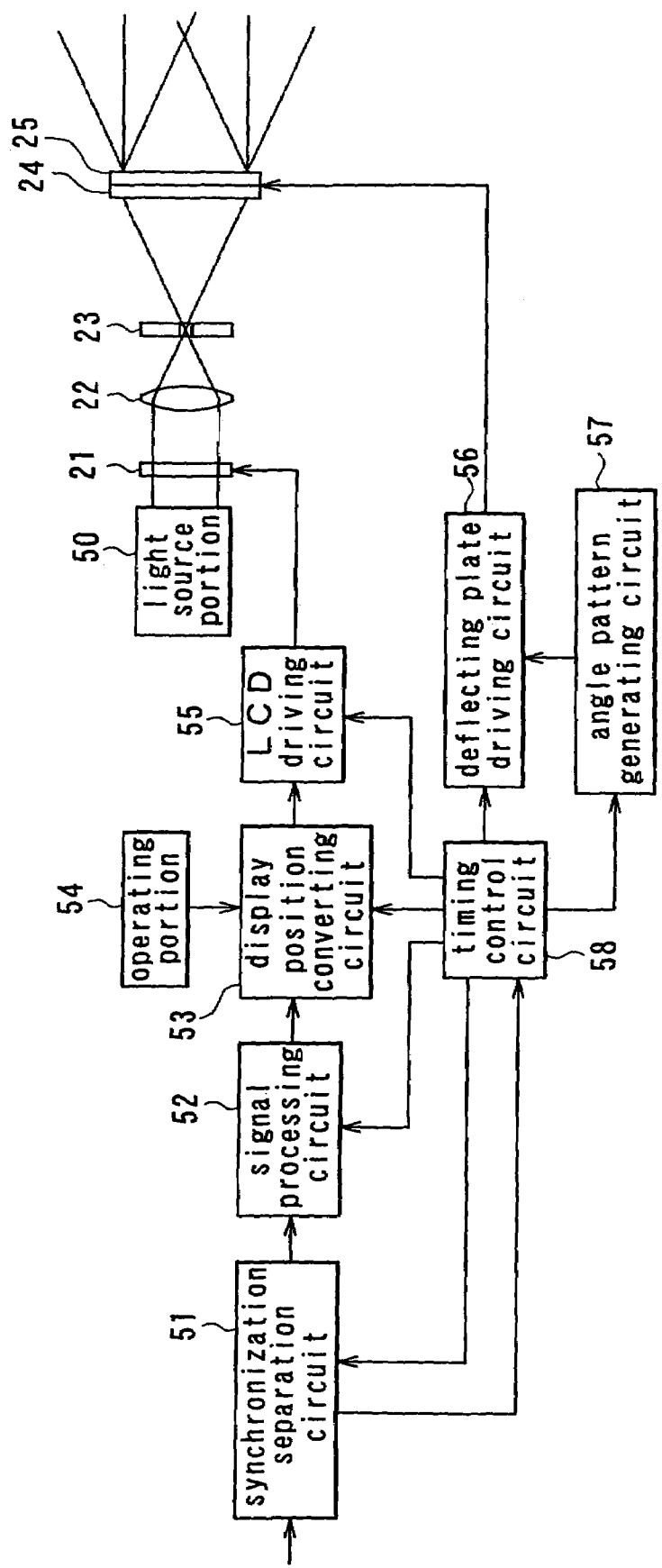
FIG. 11 is a block diagram of a three-dimensional image display apparatus of the first embodiment of the invention showing a configuration thereof.

A configuration of the three-dimensional image display apparatus in the present embodiment will now be described in detail with reference to FIG. 11. FIG. 11 is a block diagram of the three-dimensional image display apparatus in the present embodiment showing the configuration thereof. In addition to the configuration shown in FIG. 2, the three-dimensional image display apparatus has: a light source portion 50 for supplying parallel beams of illuminating light to the LCD 21; a synchronization separation circuit 51 to which video signals are input and which separates synchronization signals from the video signals and outputs the video signals and synchronization signals; a signal processing circuit 52 for performing signal processing on the video signals output by the synchronization separation circuit 51 to output image signals; a display position converting circuit 53 to which signals output by the signal processing circuit 52 are input and which performs a display position converting process to be described later as needed; an operating portion 54 for supplying information on the quantity of a movement of a display position to the display position converting circuit 53; and an LCD driving circuit 55 for driving the LCD 21 based on signals output by the display position converting circuit 53. Further, the three-dimensional image display apparatus has: a deflecting plate driving circuit 56 for driving the deflecting plate 25; an angle pattern generating circuit 57 for supplying the deflecting plate driving circuit 56 with information on spatial and temporal patterns of selected angles of incident light; and a timing control circuit 58 to which the synchronization signals output by the synchronization separation circuit 51 are input and which controls the timing of the operation of each of the above-described circuits in synchronism with the synchronization signals.

The LCD 21 may form either of monochrome and color images. For example, when color images are to be formed, a single plate/color filter type LCD having filters in the colors R, G, and B is used as the LCD 21. For example, a ferroelectric liquid crystal (FLC) capable of operating at a high speed is used in the liquid crystal portion of the LCD 21. Instead of the light source portion 50 and LCD 21, there may be provided a white light source, color separating means such as a dichroic mirror or dichroic prism for separating light emitted by the white light source into the colors R, G, and B, three monochrome LCDs for spatially modulating beams of light separated by the color separating means according to respective R, G, and B image signals, and synthesizing means for synthesizing and outputting the beams of light in R, G, and B modulated by the monochrome LCDs.

An operation of the three-dimensional image display apparatus shown in FIG. 11 will now be described. For example, video signals acquired by the three-dimensional image photographing apparatus shown in FIG. 5 are input to the three-dimensional image display apparatus. The synchronization separation circuit 51 separates synchronization signals from the input video signals and outputs the video signals and synchronization signals. The video signals are processed by the signal processing circuit 52 into image signals. The image signals are subjected to a display position converting process at the display position converting circuit 53 as needed and transmitted to the LCD driving circuit 55. The LCD 21 is driven by the LCD driving circuit 55 based on the image signals.

Parallel beams of illuminating light emitted by the light source portion 50 are spatially modulated by the LCD 21. A two-dimensional image is thus formed. Light which has exited the LCD 21 impinges upon the deflecting plate 25 as parallel beams of light through the converging lens 22, the pinhole of the pinhole member 23, and the converging lens 24.

The deflecting plate driving circuit 56 drives the deflecting plate 25 such that the angle of light exiting the deflecting plate 25 sequentially changes in a predetermined period. The angle of light exiting the deflecting plate 25 is controlled such that it coincides with the angle of incident light when each two-dimensional image formed by the LCD 21 is photographed by the three-dimensional image photographing apparatus. Such angle control is performed by the timing control circuit 58 based on the synchronization signals separated by the synchronization separation circuit 51.

Figure 12:
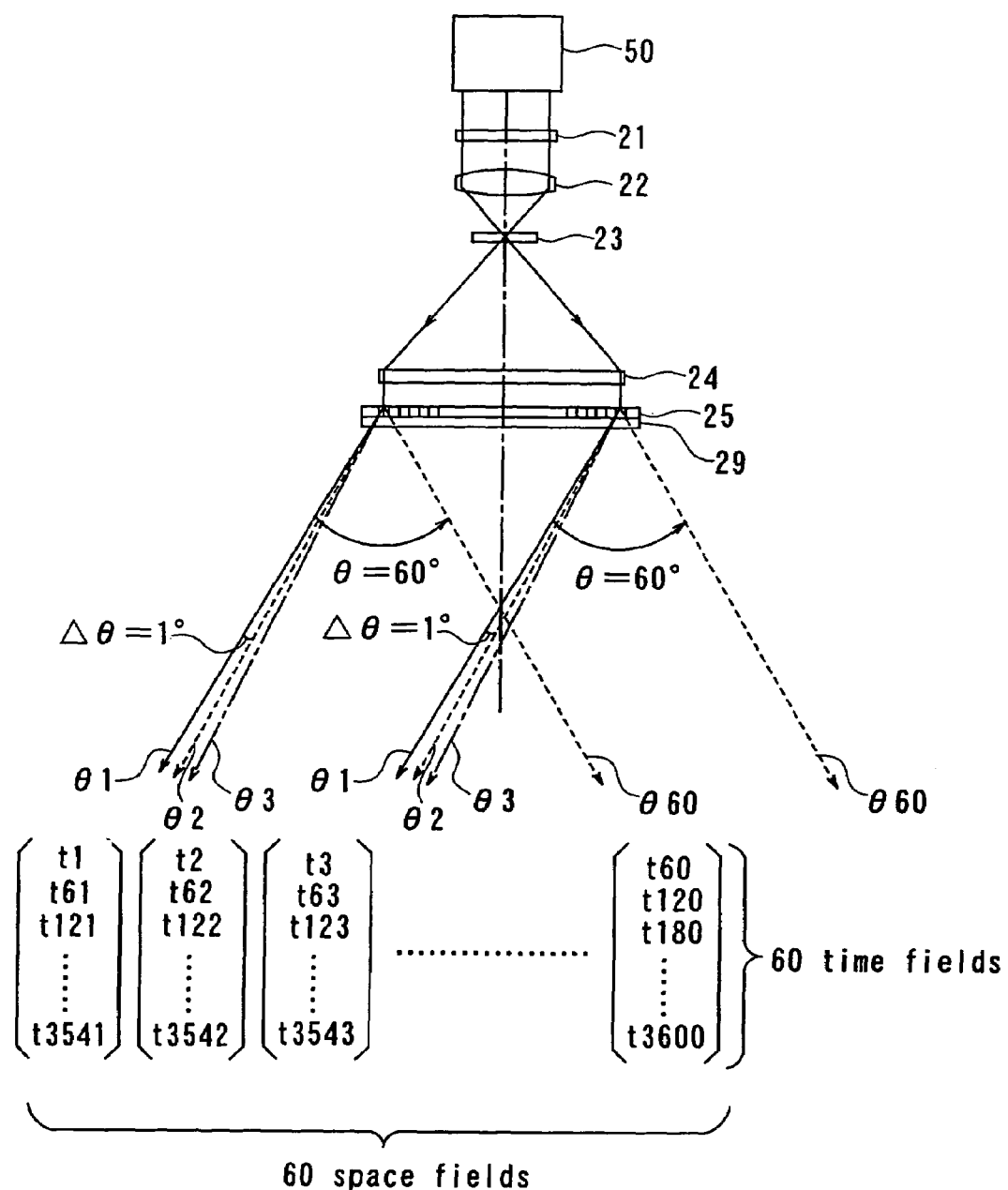
FIG. 12 is an illustration showing association and relationship between two-dimensional images formed by the LCD in FIG. 11 and angles of light exiting the deflecting plate.
Figure 13:
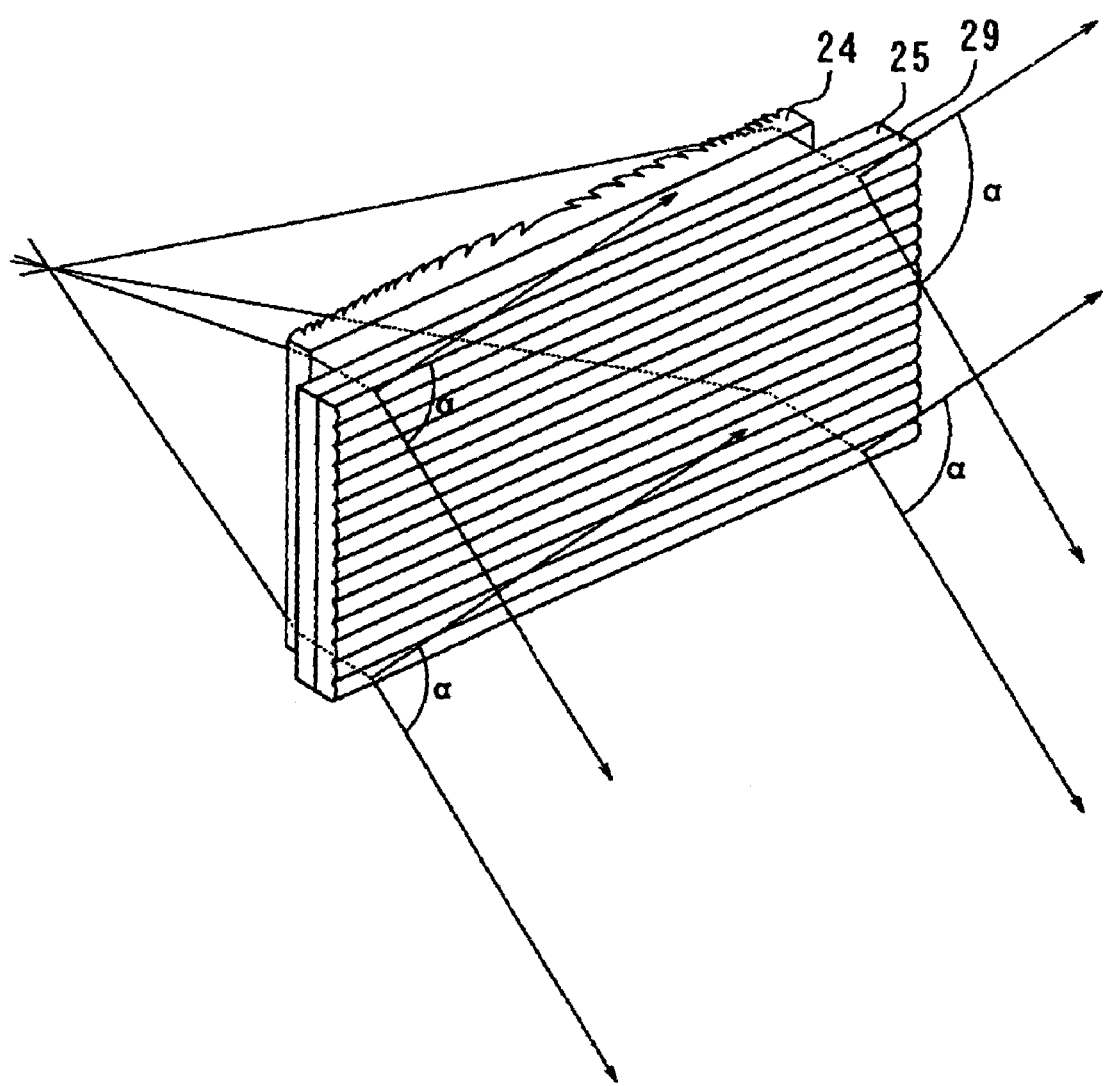
FIG. 13 is a perspective view showing the converging lens, deflecting plate, and diffusing plate in FIG. 12.

FIG. 12 is an illustration showing association and relationship between two-dimensional images formed by the LCD 21 and angles of light exiting the deflecting plate 25. It is assumed here that a stereoscopic three-dimensional image is displayed only in the horizontal direction. For this purpose, as shown in FIG. 12, a diffusing plate 29 for diffusing light in the vertical direction is provided on the light exit side of the deflecting plate 25. FIG. 13 is a perspective view of the converging lens 24, deflecting plate 25, and diffusing plate 29. As shown in the figure, the diffusing plate 29 diffuses light exiting the deflecting plate 25 at a predetermined angle α in the vertical direction.

As shown in FIG. 12, the angle of light exiting the deflecting plate 25 changes from θ1 to θ60 with angular increments of Δθ(=1 degree). The LCD 21 forms a two-dimensional image in association with each of angles θi (i=1, 2, . . . , 60). Therefore, scan at the angles of the exiting light θ1 through θ60 results in projection of two-dimensional images for 60 fields in respective different directions. The formation of the two-dimensional images at the angles θ1 through θ60 is performed at respective points in time t1 through t60.

When the formation of the images for the 60 space fields at the angles θ1 through θ60 is completed, further images for the 60 space fields at the angles θ1 through θ60 are formed at subsequent points in time t61 through t120. Thereafter, the formation of images for 60 space fields each is similarly repeated. When this is repeated 60 times, images for 3600 fields are projected in total.

Figure 14:
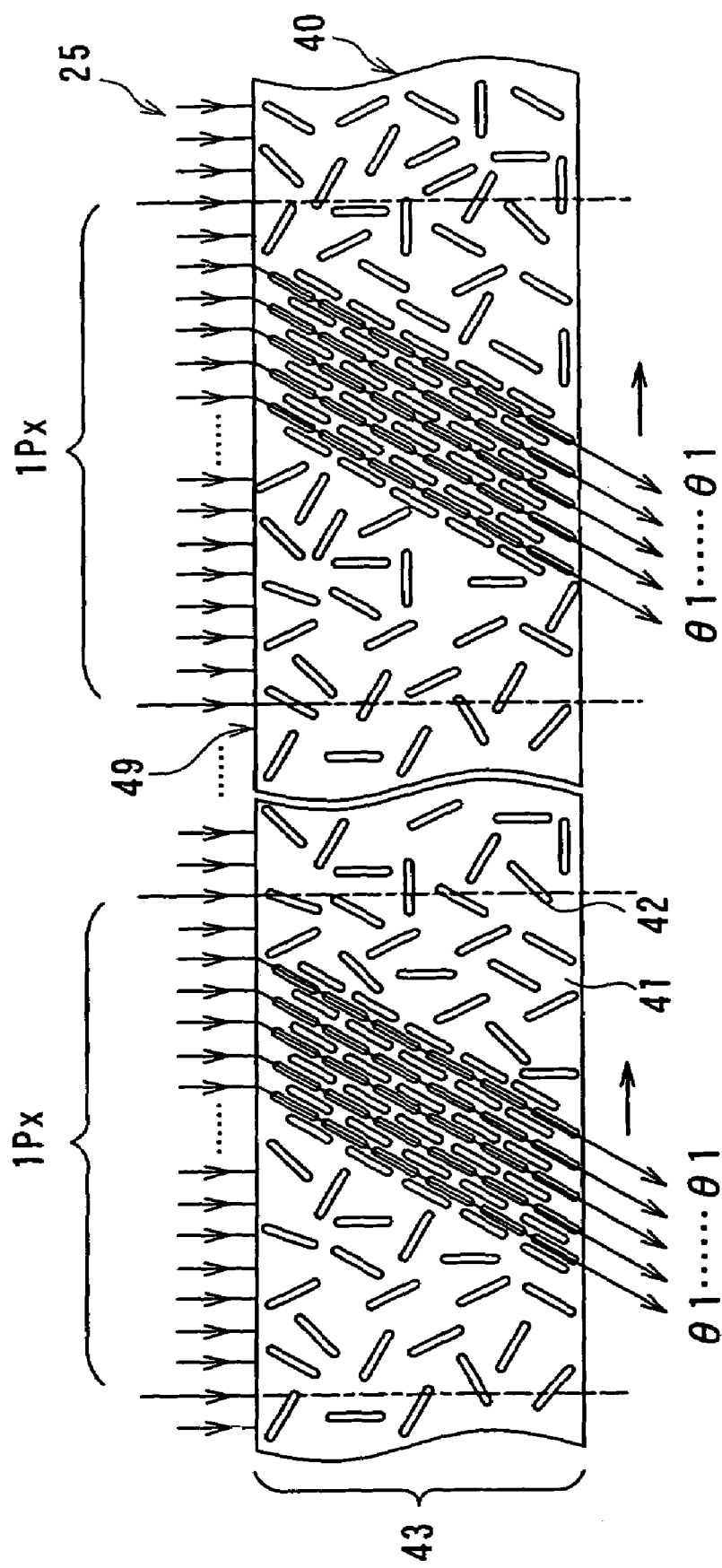
FIG. 14 is an illustration for explaining an operation of the deflecting plate in FIG. 11
Figure 15:
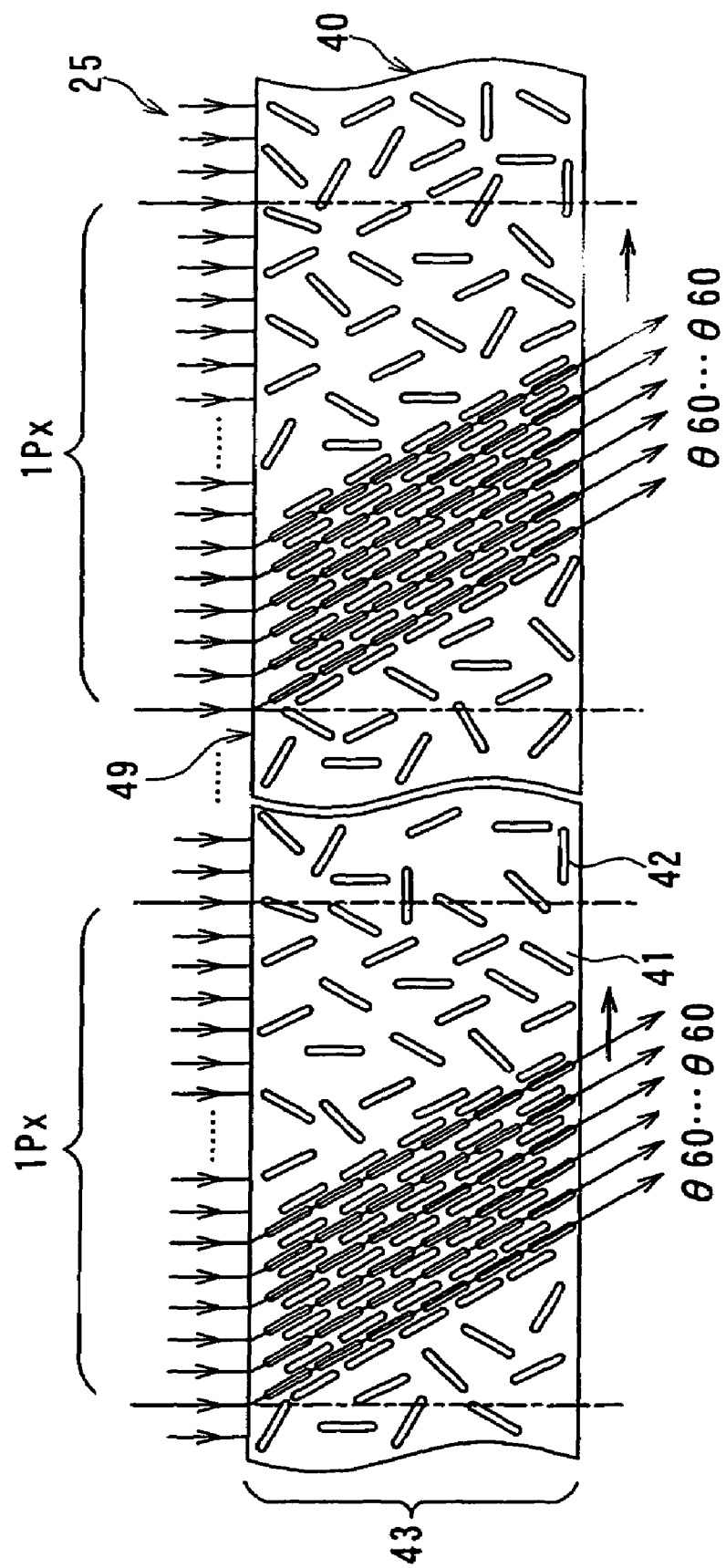
FIG. 15 is an illustration for explaining an operation of the deflecting plate in FIG. 11.

An example of a configuration of the deflecting plate 25 of the three-dimensional image display apparatus will now be described. FIG. 14 and FIG. 15 show a configuration of the deflecting plate 25. As shown in those figures, the deflecting plate 25 is constituted of a single liquid crystal device 40. The surface of the deflecting plate 25 on the entrance side thereof is a light scattering surface 49. Therefore, light which has entered the deflecting plate 25 is scattered at the light scattering surface 49, and only light in a selected direction passes through and exit the liquid crystal device 40.

In the deflecting plate 25, application of a voltage to stripe electrodes 44 and 45 of the liquid crystal device 40 is controlled such that the angle of the exiting light sequentially becomes θ1 through θ60. FIG. 14 shows an operation of the deflecting plate 25 when the angle of the exiting light is θ1, and FIG. 15 shows an operation of the deflecting plate 25 when the angle of the exiting light is θ60. As shown in those figures, application of a voltage to the stripe electrodes 44 and 45 of the liquid crystal device 40 is controlled such that the pair of electrodes to which the voltage is applied are sequentially shifted, for example, from the left side to the right side as indicated by the arrow in the figures while keeping the angle θi between a straight line connecting each pair of electrodes to which the voltage is applied and the plane of the deflecting plate 25. More specifically, voltage application scan for applying a pulse voltage to the stripe electrodes 45 arranged on the side of the exit surface sequentially is performed in synchronism with voltage application scan for applying a pulse voltage to the stripe electrodes 44 arranged on the side of the entrance surface sequentially at predetermined time intervals. At this time, control is performed to maintain a horizontal offset distance associated with the angle θi between a stripe electrode 44 on the side of the entrance surface to which the voltage is applied and a stripe electrode 45 on the side of the exit surface to which the voltage is applied. Such an operation is simultaneously performed in each region associated with each pixel.

Voltage application scan for one angle θi is performed in a time period of 1/3600 sec. Therefore, the time required for voltage application scan for all of the angles θ1 through θ60 is 1/60 sec.

Since the orientation of liquid crystal molecules 42 has hysteresis, the oriented state is maintained for a certain time even after the electric field moves away. Therefore, the LCD 21 may be caused to display an image in a period of 1/3600 sec. after such orientation is performed throughout the deflecting plate 25. More specifically, let us assume that a scan duty ratio defined as the ratio of actual time required for voltage application scan to the period of the same (=1/3600 sec.) is 50% or less, for example, and that a display duty ratio defined as the ratio of an actual display time to the display period of the LCD 21 (=1/3600 sec.) is also 50% or less. Then, one cycle of voltage application scan and display of one image on the LCD 21 is performed in a period of 1/3600 sec. When matrix electrodes are used instead of the stripe electrodes 44 and 45 as described above, halftones can be displayed by temporarily disturbing the direction of orientation of the liquid crystal molecules 42 at random and by orienting only a part of the liquid crystal molecules 42 in a region corresponding to one pixel at an angle θi.

Figure 16:
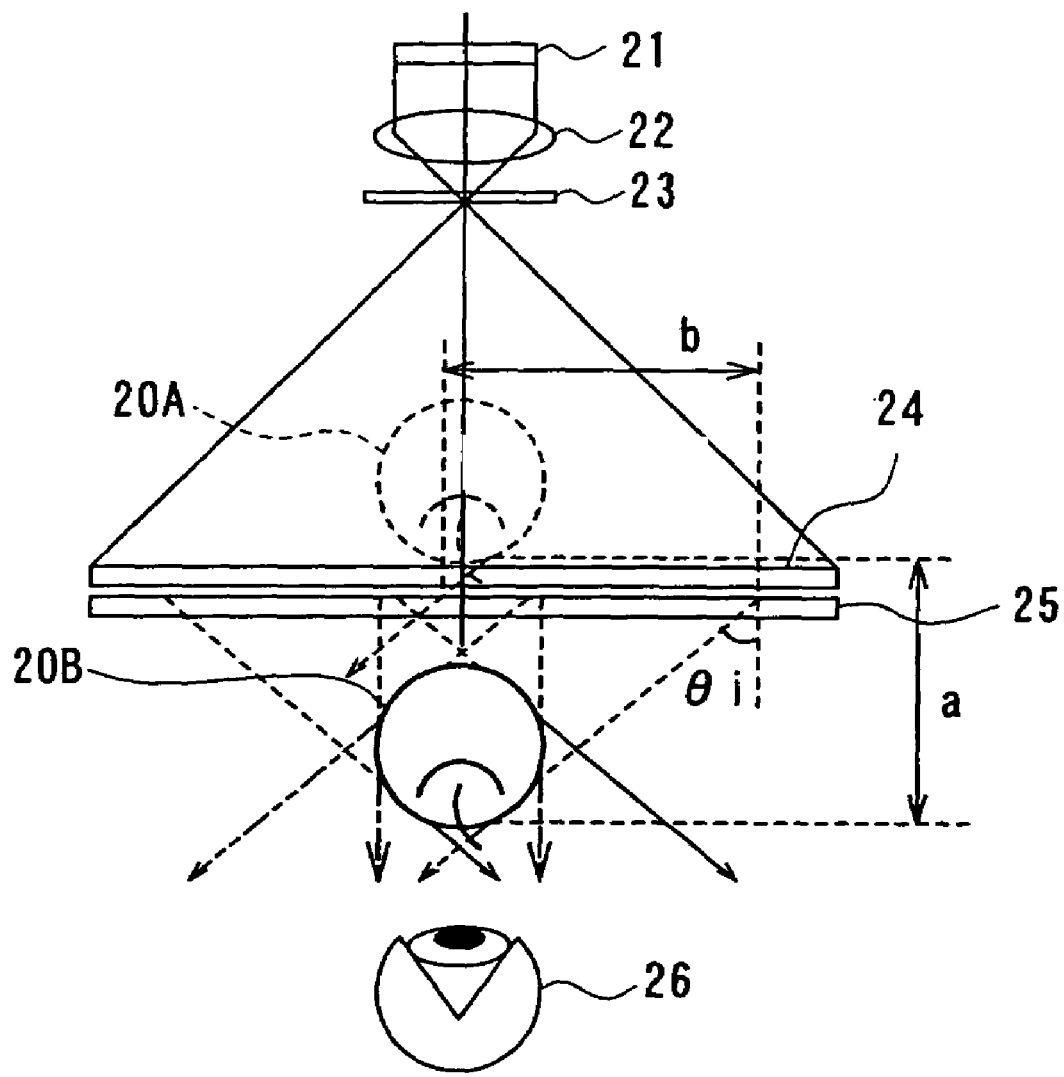
FIG. 16 is an illustration for explaining a principle behind a display position converting process in the first embodiment of the invention.

A description will now be made with reference to FIG. 16 on a principle behind the display position converting process in the present embodiment. FIG. 16 shows a schematic configuration of the three-dimensional image display apparatus of the present embodiment similarly to FIG. 2. In the figure, reference number 20A represents a three-dimensional image that is displayed when the display position converting process is not performed, and reference number 20B represents a three-dimensional image that is displayed when the display position converting process is performed to move the display position by a distance "a" toward or away from the three-dimensional image 20A. To perform such a position converting process, the positions of two-dimensional images for which light exits the deflecting plate 25 at an angle θi may be moved by a distance "b" on the deflecting plate 25 in a direction in the plane of the two-dimensional image information, that is, in the horizontal direction. "b" is a value expressed by Equation (2) shown below.

$$b = a \times \tan \theta i \quad (2)$$

where "a" is a negative value when the three-dimensional image is moved toward a viewer 26 and is a positive value when it is moved away from the viewer. θi is a negative value when light exiting the deflecting plate 25 is directed to the left in FIG. 16 and is a positive value when it is directed to the right. Further, "b" is a positive value when the positions of the two-dimensional images on the deflecting plate 25 are moved to the right in FIG. 16 and is a negative value when they are moved to the left.

Therefore, the display position of the three-dimensional image can be moved by shifting the positions of the two-dimensional images projected on the deflecting plate 25 by "b" in accordance with the quantity of movement "a" of the display position of the three-dimensional image and the angle θi of the light exiting the deflecting plate 25. The positions of the two-dimensional images projected on the deflecting plate 25 can be shifted by "b" by shifting the positions of the two-dimensional images on the LCD 21 in the horizontal direction by a value obtained by multiplying "b" by a predetermined ratio, that is, by a value that is proportionate to "b". Similar conversion is performed also in the vertical direction to obtain a stereoscopic image having a field angle also in the vertical direction (longitudinal direction).

The display position converting circuit 33 in FIG. 5 and the display position converting circuit 53 in FIG. 11 perform the process of shifting the positions of two-dimensional images to convert the display position of a three-dimensional image based on the above-described principle.

Figure 17:
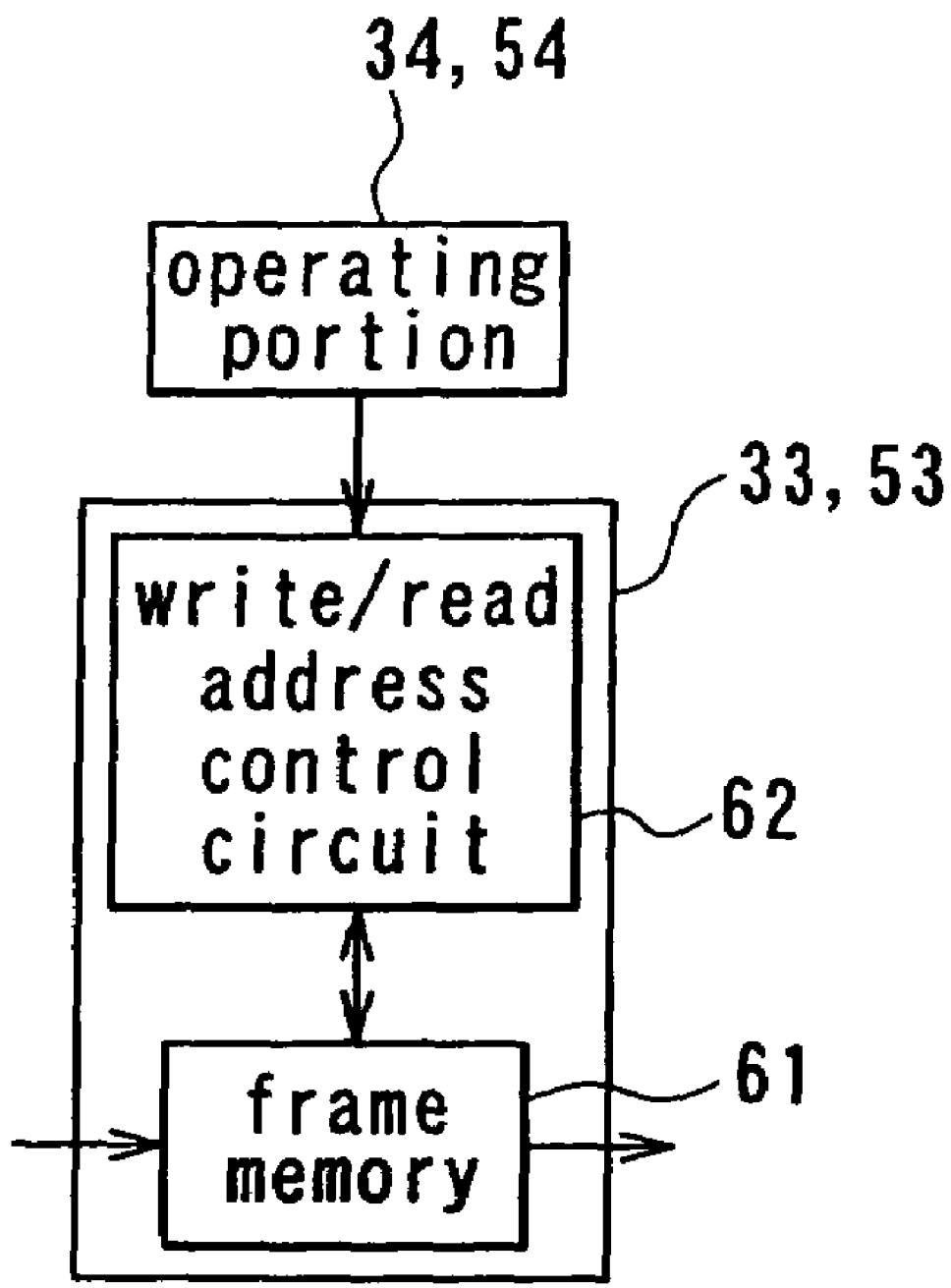
FIG. 17 is a block diagram of an example of a configuration of the display position converting circuits in FIGS. 5 and 11.

FIG. 17 is a block diagram of an example of a configuration of the display position converting circuits 33 and 53. It is assumed here that image signals input to the display position converting circuits 33 and 53 are digital signals. The display position converting circuits 33 and 53 have: a frame memory 61 for storing input image signals in association with each two-dimensional image; and a write/read address control circuit 62 for controlling write addresses and read addresses of the frame memory 61. The information of the quantity of a movement of a display position is supplied to the write/read address control circuit 62 from the operating portions 34 and 54. Further, timing signals are supplied to the write/read address control circuit 62 from the timing control circuits 38 and 58.

In the display position converting circuits 33 and 53, input image signals are written in the frame memory 61 under control of the write/read address control circuit 62 and are thereafter read and output to a subsequent stage. Then, the write/read address control circuit 62 finds the quantity of the positional shift of the two-dimensional images based on the information of the quantity of movement of the display position supplied by the operating portions 34 and 54 and the timing signals supplied by the timing control circuits 38 and 58. A value corresponding to the quantity of movement "a" in Equation (2) is supplied as information on the quantity of a movement of the display position. The information of the angle $\theta i$ in Equation (2) is supplied as the timing signals. The write/read address control circuit 62 controls write addresses and read addresses such that the positions of two-dimensional images represented by output image signals are shifted from the positions of two-dimensional images represented by the input image signals by the quantity thus found. The write/read address control circuit 62 corresponds to the quantity-of-movement calculating means of the invention, and the frame memory 61 and write/read address control circuit 62 correspond to the position change means of the invention.

When the input image signals are analog signals, they are stored in the frame memory 61 after being subjected to analog-to-digital conversion.

Such a display position converting process may be performed by the display position converting circuit 33 in the three-dimensional image photographing apparatus shown in FIG. 5 or the display position converting circuit 53 in the three-dimensional image display apparatus shown in FIG. 11. Therefore, either of the display position converting circuits 33 and 53 may be deleted.

Figure 18:
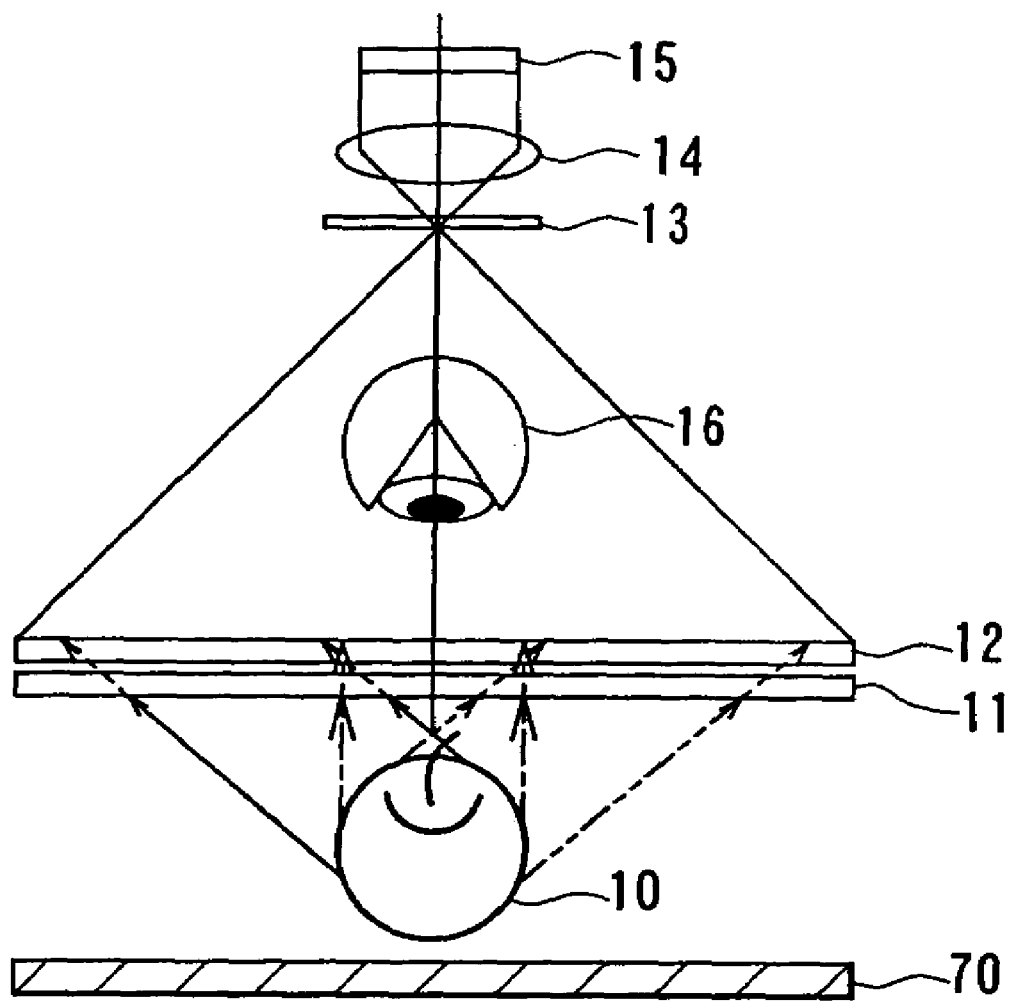
FIG. 18 is an illustration of an example of a method for photographing a three-dimensional image in the first embodiment of the invention.
Figure 19:
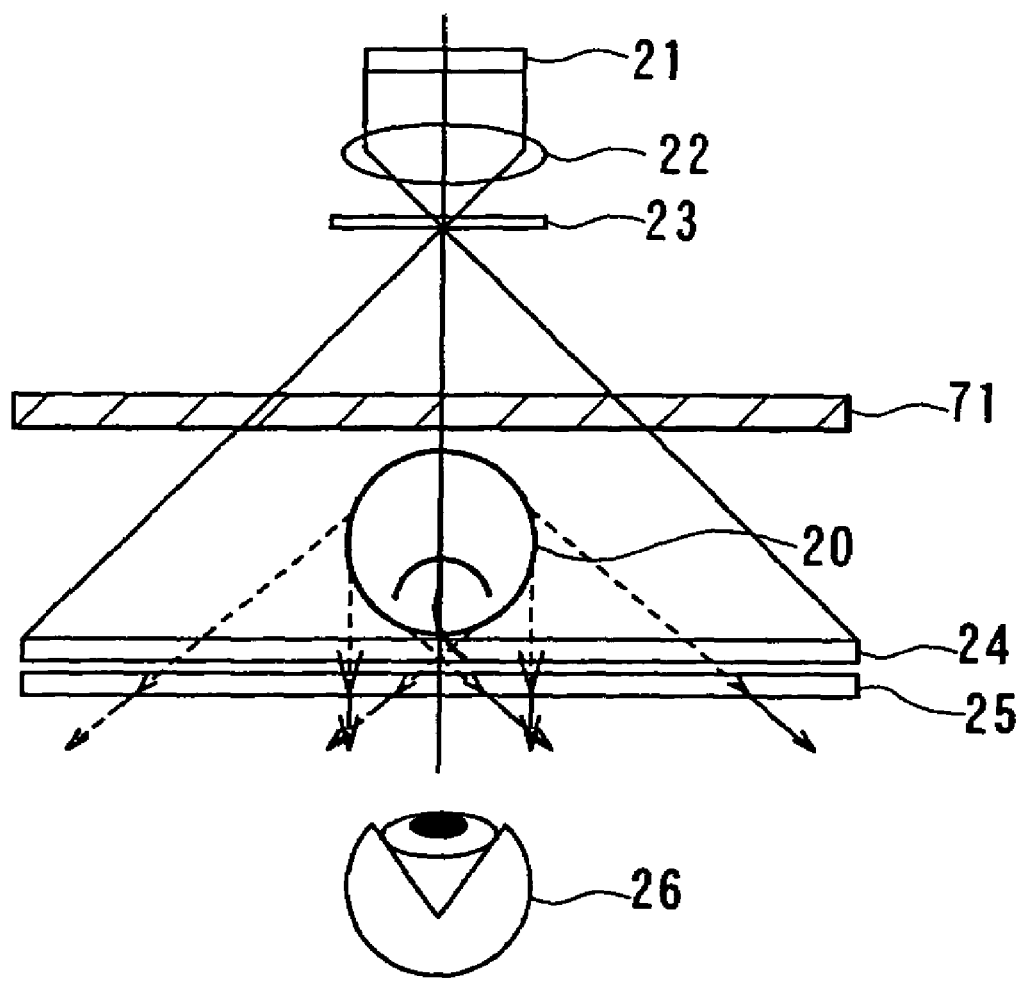
FIG. 19 is an illustration of an example of a method for displaying a three-dimensional image in the first embodiment of the invention.

A description will now be made with reference to FIG. 18 and FIG. 19 on an example of a method for photographing and displaying a three-dimensional image more effectively. FIG. 18 shows a schematic configuration of a three-dimensional image photographing apparatus similarly to FIG. 1, and FIG. 19 shows a schematic configuration of a three-dimensional image display apparatus similarly to FIG. 2. In FIG. 18, a mirror 70 is provided behind an object 10 to be photographed. In this case, the rear surface of the object 10 is projected on the mirror 70. When the object 10 and the mirror 70 are photographed by the three-dimensional image photographing apparatus and the resultant two-dimensional image information is supplied to the three-dimensional image display apparatus to display a three-dimensional image, as shown in FIG. 19, a three-dimensional image 71 of the mirror 70 is displayed behind a three-dimensional image 20 of the object 10 in the viewing direction of a viewer 26. An image of the rear surface of the object 10 is projected on the three-dimensional image 71 of the mirror 70. As the view of the three-dimensional image 20 of the object 10 changes depending on the viewing direction, the view of the image of the rear surface of the object 10 projected on the three-dimensional image 71 of the mirror 70 changes depending on the viewing direction. It is therefore possible to achieve display of three-dimensional images with an increased stereoscopic feel compared to those available without the mirror 70.

Further, it is more advantageous to render the surface of the deflecting plate 25 like a mirror surface by converting the display positions of the three-dimensional images such that the position of the mirror surface of the three-dimensional image 71 of the mirror 70 coincides with the position of the surface of the deflecting plate 25.

As described above, according to the three-dimensional image photographing apparatus and method of the present embodiment, the photographing direction is sequentially changed to photograph an object with the single photographing means, thereby acquiring a plurality of pieces of two-dimensional image information in different photographing directions. It is therefore possible to acquire image information required for displaying a three-dimensional image of an object in a space with a simple configuration.

According to the three-dimensional image photographing apparatus and method of the present embodiment, it is possible to photograph an object continuously with the single photographing means. It is therefore possible, even if the object moves, to acquire image information required for displaying a three-dimensional image of the object in a space such that it moves, with a simple configuration. Therefore, the three-dimensional image photographing apparatus and method of the present embodiment make it possible to achieve display of a stereoscopic dynamic image in a true sense with a simple configuration.

Further, the present embodiment makes it possible to convert a display position of a three-dimensional image with a simple configuration that is provided only by adding the display position converting circuits 33 and 53 and through a simple process that involves only shifting of the positions of two-dimensional images. It is therefore possible to display a three-dimensional image in a desired position in a space.

SECOND EMBODIMENT

A second embodiment of the invention will now be described. The present embodiment is an example in which an object is photographed with a single photographing means while the photographing direction is sequentially changed by moving the single photographing means, to acquire a plurality of pieces of two-dimensional image information in different photographing directions.

First, a description will be made with reference to FIGS. 20 and 21 on principles behind photographing and display of a three-dimensional image in the present embodiment.

Figure 20:
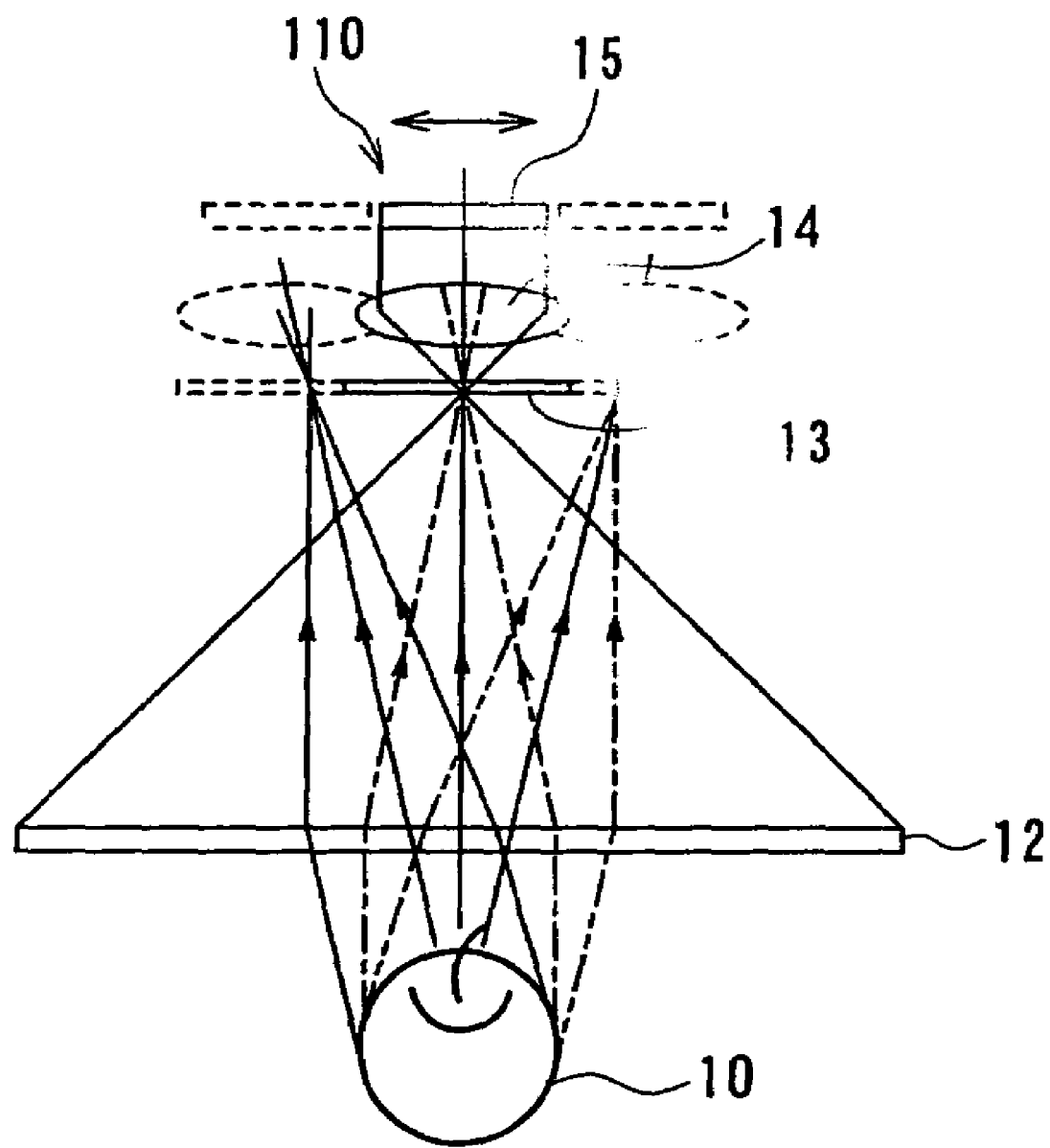
FIG. 20 is an illustration showing a schematic configuration of a three-dimensional image photographing apparatus of a second embodiment of the invention.

FIG. 20 is an illustration showing a schematic configuration of a three-dimensional image photographing apparatus in the present embodiment. The three-dimensional image photographing apparatus in the present embodiment has: a converging lens 12; and a pinhole member 13, a converging lens 14 and a CCD 15 provided in that order on the side of one surface of the converging lens 12. In the present embodiment, the pinhole member 13, converging lens 14, and CCD 15 are collectively referred to as "camera 110". The camera 110 is swung in the horizontal direction by a camera driving device to be described later. The center of the swing of the camera 110 is located on an extension of the optical axis of the converging lens 12.

In the three-dimensional image photographing apparatus, the surface of the converging lens 12 opposite to the pinhole member 13 is directed to an object 10 to be photographed. When parallel beams of light perpendicularly enter the converging lens 12 from the object 10, the converging lens 12 converges the light such that the exiting light will have a smallest diameter in the position of the pinhole of the pinhole member 13. The converging lens 14 forms an image of the object 10 on a photographic surface of the CCD 15 by converging light that has diffused after passing through the pinhole.

An operation of the three-dimensional image photographing apparatus shown in FIG. 20 will now be described. The camera 110 is swung in the horizontal direction. When the camera 110 is located at the center of the swing, only beams of light that perpendicularly enter the converging lens 12 form an image on CCD 15 among the beams of light from the object 10. When the camera 110 is not located at the center of the swing, only beams of light that diagonally enter the converging lens 12 at a predetermined angle form an image on the photographic surface of the CCD 15 among beams of light from the object 10. The predetermined angle changes depending on the position of the camera 110.

Thus, in the three-dimensional image photographing apparatus shown in FIG. 20, the object 10 is photographed with the single photographing means (camera 110) to generate two-dimensional image information of the object 10, and the photographing direction is sequentially changed. Therefore, image information output by the CCD 15 is two-dimensional image information for which the photographing direction changes as time passes and which serves as image information required for displaying a three-dimensional image of the object in a space.

Figure 21:
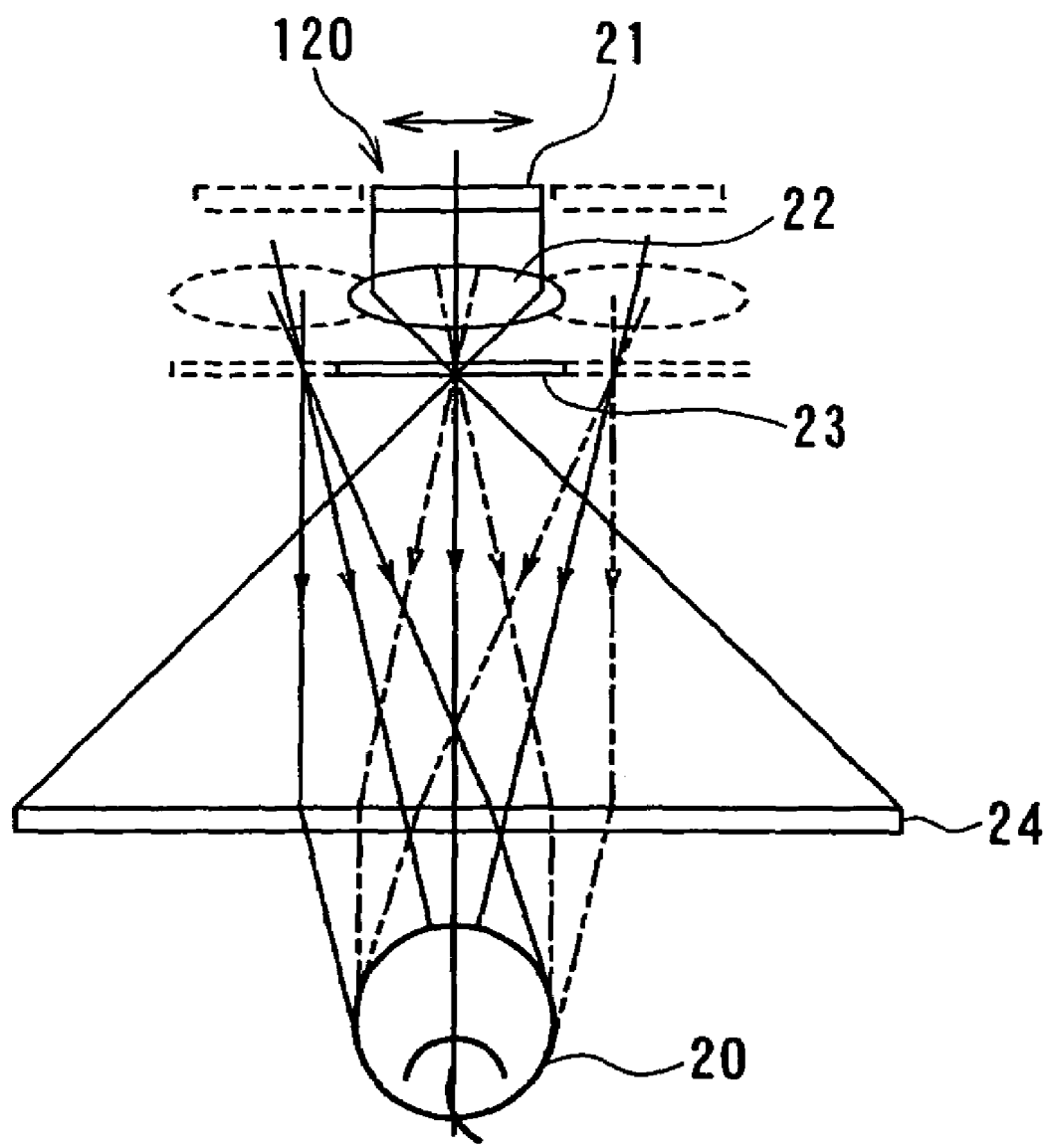
FIG. 21 is an illustration showing a schematic configuration of a three-dimensional image display apparatus of the second embodiment of the invention.

FIG. 21 is an illustration showing a schematic configuration of a three-dimensional image display apparatus of the present embodiment. The three-dimensional image display apparatus of the present embodiment has: a transmission type LCD 21 as a spatial light modulator that spatially modulates light passing therethrough based on two-dimensional image information; and a converging lens 22, a pinhole member 23 and a converging lens 24 provided in that order on the light exit side of the LCD 21. In the present embodiment, a light source portion to be described later for supplying illuminating light to the LCD 21, the LCD 21, the converging lens 22 and the pinhole member 23 are collectively referred to as "projector 120". The projector 120 is swung in the horizontal direction by a projector driving device to be described later. The center of the swing of the projector 120 is located on an extension of the optical axis of the converging lens 24.

The converging lens 22 converges light exiting the LCD 21 to a minimum diameter in the position of the pinhole of the pinhole member 23. The converging lens 24 collimates light that has passed through the pinhole.

An operation of the three-dimensional image display apparatus shown in FIG. 21 will now be described. The LCD 21 spatially modulates light based on two-dimensional image information acquired by the three-dimensional image photographing apparatus shown in FIG. 20. The light modulated by the LCD 21 is converged by the converging lens 22, passes through the pinhole of the pinhole member 23, and exits the converging lens 24 after being collimated thereby. Since the projector 120 is swung in the horizontal direction, the direction of the light exiting the converging lens 24 sequentially changes. The projector 120 is swung such that the angle of the light exiting the converging lens 24 coincides with the angle of incident light at the time of photographing.

Thus, in the three-dimensional image display apparatus shown in FIG. 21, light is modulated by the LCD 21 to reproduce two-dimensional images based on the two-dimensional image information acquired by the three-dimensional image photographing apparatus shown in FIG. 20 for which the photographing direction is changed. The two-dimensional images are projected from the converging lens 24 at an angle that coincides with the angle of incident light at the time of photographing. As a result, a three-dimensional image 20 of the object 10 is formed in a space.

Figure 22:
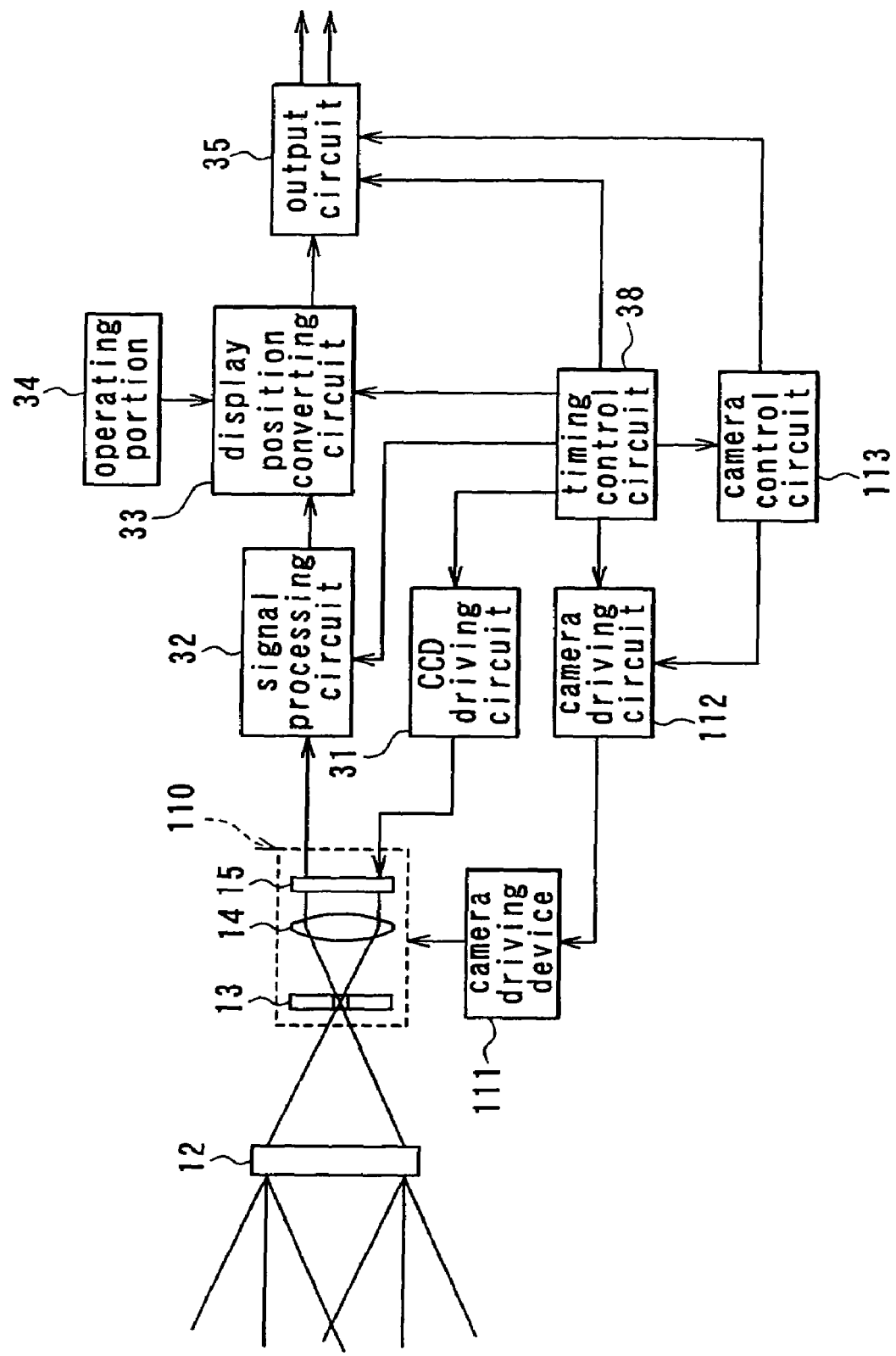
FIG. 22 is a block diagram of the three-dimensional image photographing apparatus of the second embodiment of the invention showing a configuration thereof.

The configuration of the three-dimensional image photographing apparatus of the present embodiment will now be described in detail with reference to FIG. 22. FIG. 22 is a block diagram of the three-dimensional image photographing apparatus of the present embodiment showing the configuration thereof. In addition to the configuration shown in FIG. 20, the three-dimensional image photographing apparatus has: a CCD driving circuit 31 for driving the CCD 15; a signal processing circuit 32 for processing signals output by the CCD 15 to output image signals; a display position converting circuit 33 to which the signals output by the signal processing circuit 32 are input and which performs a display position converting process as needed; an operating portion 34 for supplying information on the quantity of a movement of a display position to the display position converting circuit 33; and an output circuit 35 for superimposing synchronization signals to the output of the display position converting circuit 33 to output video signals. Further, the three-dimensional image photographing apparatus has: a camera driving device 111 for swinging the camera 110; a camera driving circuit 112 for controlling the camera driving device 111; a camera control circuit 113 for controlling the camera driving circuit 112; and a timing control circuit 38 for controlling the timing of the operation of each of the above-described circuits.

An operation of the three-dimensional image photographing apparatus shown in FIG. 22 will now be described. The camera driving circuit 112 and camera driving device 111 swing the camera 110 such that the photographing direction of the camera 110 sequentially changes. The CCD driving circuit 31 drives the CCD 15 in synchronism with the swing of the camera 110 such that information on one two-dimensional image is acquired in each of a plurality of predetermined photographing directions. Signals output by the CCD 15 are processed by the signal processing circuit 32 into image signals. The image signals are subjected to the display position converting process at the display position converting circuit 33 as needed and are transmitted to the output circuit 35. The camera driving device 111 has a function of driving the optical system of the camera 110 and so on to perform focus adjustment, zooming, lens stop adjustment, shutter speed adjustment, and so on. Those functions are controlled by the camera control circuit 113 through the camera driving circuit 112. The camera control circuit 113 transmits information on focus adjustment, zooming, lens stop adjustment, shutter speed adjustment, and so on to the output circuit 35 as control signals. The output circuit 35 associates the control signals with time and outputs the same along with video signals to the outside.

Figure 23:
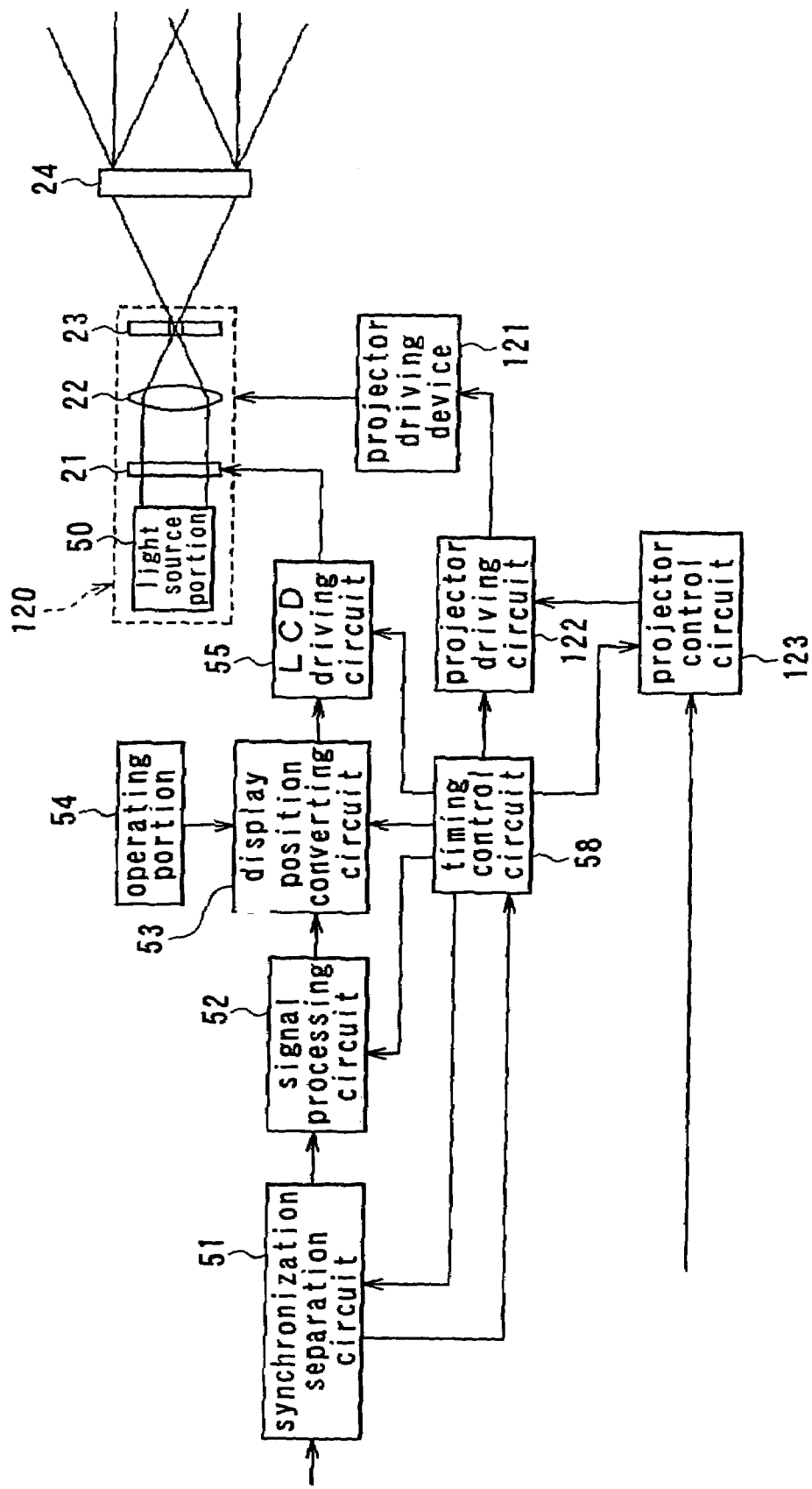
FIG. 23 is a block diagram of the three-dimensional image display apparatus of the second embodiment of the invention showing a configuration thereof.

The configuration of the three-dimensional image display apparatus in the present embodiment will now be described in detail with reference to FIG. 23. FIG. 23 is a block diagram of the three-dimensional image display apparatus of the present embodiment showing the configuration thereof. In addition to the configuration shown in FIG. 21, the three-dimensional image display apparatus has: a light source portion 50 for supplying parallel beams of illuminating light to the LCD 21; a synchronization separation circuit 51 to which video signals are input and which separates synchronization signals from the video signals and outputs the video signals and synchronization signals; a signal processing circuit 52 for performing signal processing on the video signals output by the synchronization separation circuit 51 to output image signals; a display position converting circuit 53 to which the signals output by the signal processing circuit 52 are input and which performs a display position converting process as needed; an operating portion 54 for supplying information on the quantity of a movement of a display position to the display position converting circuit 53, and an LCD driving circuit 55 for driving the LCD 21 based on signals output by the display position converting circuit 53. Further, the three-dimensional image display apparatus has: a projector driving device 121 for driving the projector 120; a projector driving circuit 122 for controlling the projector driving device 121; a projector control circuit 123 for controlling the projector driving circuit 122 based on control signal input from the outside; and a timing control circuit 58 to which the synchronization signals output by the synchronization separation circuit 51 are input and which controls the timing of the operation of each of the above-described circuits in synchronism with the synchronization signals.

An operation of the three-dimensional image display apparatus shown in FIG. 23 will now be described. For example, video signals acquired by the three-dimensional image photographing apparatus shown in FIG. 22 are input to the three-dimensional image display apparatus. The synchronization separation circuit 51 separates synchronization signals from the input video signals and outputs the video signals and synchronization signals. The video signals are processed by the signal processing circuit 52 into image signals. The image signals are subjected to the display position converting process at the display position converting circuit 53 as needed and transmitted to the LCD driving circuit 55. The LCD 21 is driven by the LCD driving circuit 55 based on the image signals.

Parallel beams of illuminating light emitted by the light source portion 50 are spatially modulated by the LCD 21. As a result, two-dimensional images are formed. Light which has exited the LCD 21 passes through the converging lens 22, the pinhole of the pinhole member 23, and the converging lens 24 to exit.

The projector driving circuit 122 and the projector driving device 121 swing the projector 120 such that the direction of the light exiting the converging lens 24 sequentially changes. The angle of the light exiting the converging lens 24 is controlled such that it coincides with the angle of incident light at the time of photographing with the three-dimensional image photographing apparatus shown in FIG. 22 for each of the two-dimensional images formed by the LCD 21. Such angle control is performed by the timing control circuit 58 based on the synchronization signals separated by the synchronization separation circuit 51. The projector driving device 121 also has a function of driving the optical system of the projector 120 and so on to perform focus adjustment, zooming, lens stop adjustment, and so on. Those functions are controlled by the projector control circuit 123 through the projector driving circuit 122. The projector control circuit 123 receives information on focus adjustment, zooming, lens stop adjustment, shutter speed adjustment, and so on as control signals from the outside, and performs the focus adjustment, zooming, lens stop adjustment, and so on of the projector 120, based on the control signals. This makes it possible to display a three-dimensional image of an object with the focus located in a position in accordance with the distance between the camera 110 and the object at the time of photographing, to zoom the image in accordance with conditions for zooming at the time of photographing, and to set the depth of field in accordance with conditions for lens stop adjustment, shutter speed adjustment, and so on at the time of photographing. As a result, it is possible to display a more realistic three-dimensional image. When the display position converting process is performed, the focus information is also changed in accordance with the position after the conversion.

While the camera 110 and the projector 120 are swung in the horizontal direction in the present embodiment, they may be swung in the horizontal and vertical directions (e.g., moved two-dimensionally) to obtain a stereoscopic image having a field angle also in the longitudinal direction (vertical direction).

The configuration, operation, and effects of the present embodiment are otherwise the same as those of the first embodiment.

THIRD EMBODIMENT

A third embodiment of the invention will now be described. The present embodiment is an example in which an object is photographed with a single photographing means while the photographing direction is sequentially changed by moving a part of an optical system, to acquire a plurality of pieces of two-dimensional image information in different photographing directions.

First, a description will be made with reference to FIGS. 24 and 25 on principles behind photographing and display of a three-dimensional image in the present embodiment.

Figure 24:
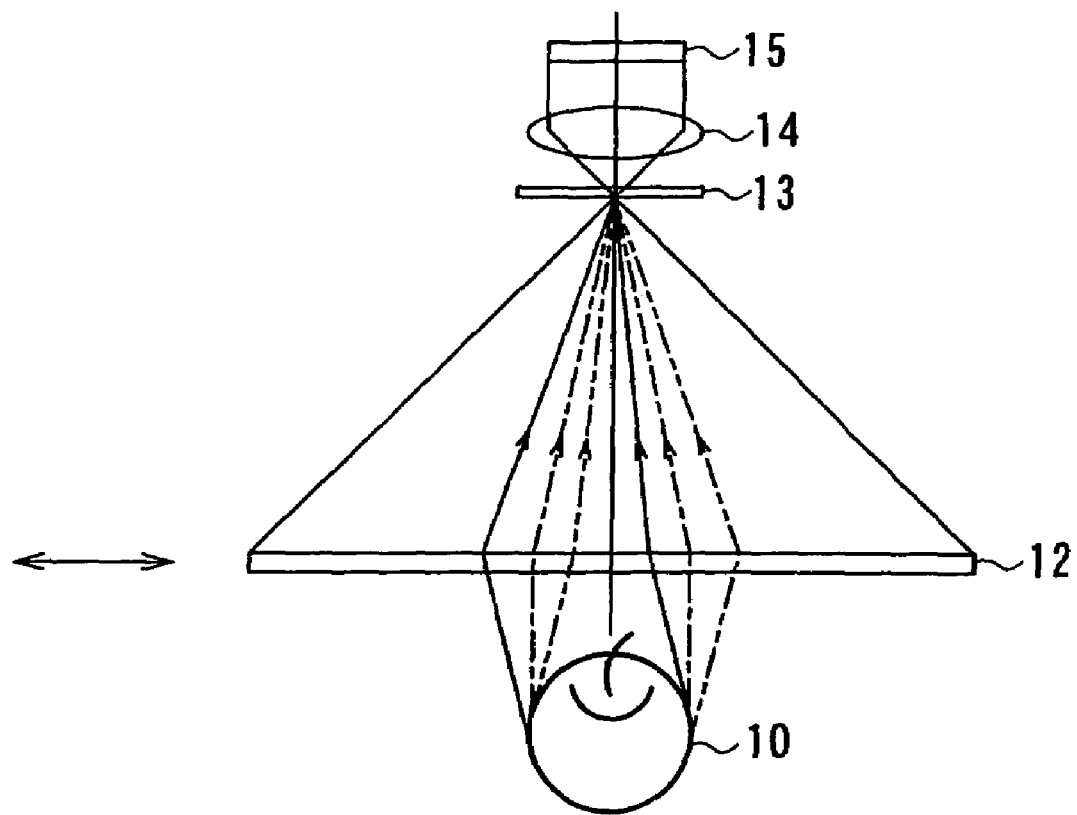
FIG. 24 is an illustration showing a schematic configuration of a three-dimensional image photographing apparatus of a third embodiment of the invention.

FIG. 24 is an illustration showing a schematic configuration of a three-dimensional image photographing apparatus of the present embodiment. The three-dimensional image photographing apparatus of the present embodiment has: a converging lens 12; and a pinhole member 13, a converging lens 14 and a CCD 15 provided in that order on the side of one surface of the converging lens 12. In the present embodiment, the converging lens 12 is swung in the horizontal direction by a lens driving device to be described later. The center of the swing of the converging lens 12 is located on an extension of the optical axis of the converging lens 14.

According to the three-dimensional image photographing apparatus, an object 10 is photographed with a single photographing means to generate two-dimensional image information of the object 10, and the converging lens 12 is swung in the horizontal direction to change the photographing direction sequentially. Therefore, image information output by the CCD 15 is two-dimensional image information for which the photographing direction changes as time passes and which serves as image information required for displaying a three-dimensional image of the object in a space.

Figure 25:
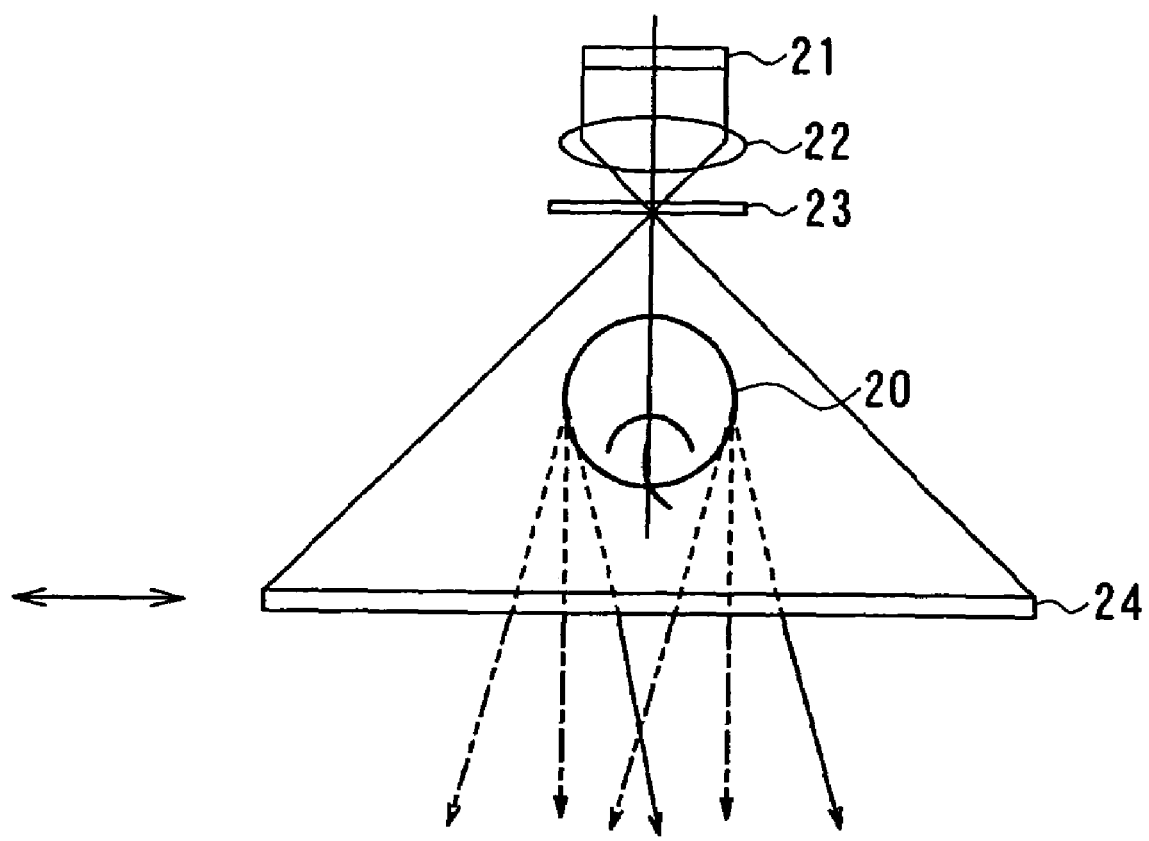
FIG. 25 is an illustration showing a schematic configuration of a three-dimensional image display apparatus of the third embodiment of the invention.

FIG. 25 is an illustration showing a schematic configuration of a three-dimensional image display apparatus of the present embodiment. The three-dimensional image display apparatus of the present embodiment has: a transmission type LCD 21 as a spatial light modulator that spatially modulates light passing therethrough based on two-dimensional image information; and a converging lens 22, a pinhole member 23 and a converging lens 24 provided in that order on the light exit side of the LCD 21. In the present embodiment, the converging lens 24 is swung in the horizontal direction by a lens driving device to be described later. The center of the swing of the converging lens 24 is located on an extension of the optical axis of the converging lens 22.

According to the three-dimensional image display apparatus, the LCD 21 spatially modulates light based on the two-dimensional image information acquired by the three-dimensional image photographing apparatus shown in FIG. 24. The light modulated by the LCD 21 is converged by the converging lens 22, passes through the pinhole of the pinhole member 23, and exits the converging lens 24 after being collimated thereby. Since the converging lens 24 is swung in the horizontal direction, the direction of the light exiting the converging lens 24 sequentially changes. The converging lens 24 is swung such that the angle of the light exiting the converging lens 24 coincides with the angle of incident light at the time of photographing.

Thus, according to the three-dimensional image display apparatus shown in FIG. 25, light is modulated by the LCD 21 to reproduce two-dimensional images based on two-dimensional image information acquired by the three-dimensional image photographing apparatus shown in FIG. 24 for which the photographing direction is changed. The two-dimensional images are projected from the converging lens 24 at an angle that coincides with the angle of incident light at the time of photographing. As a result, a three-dimensional image 20 of the object 10 is formed in a space.

Figure 26:
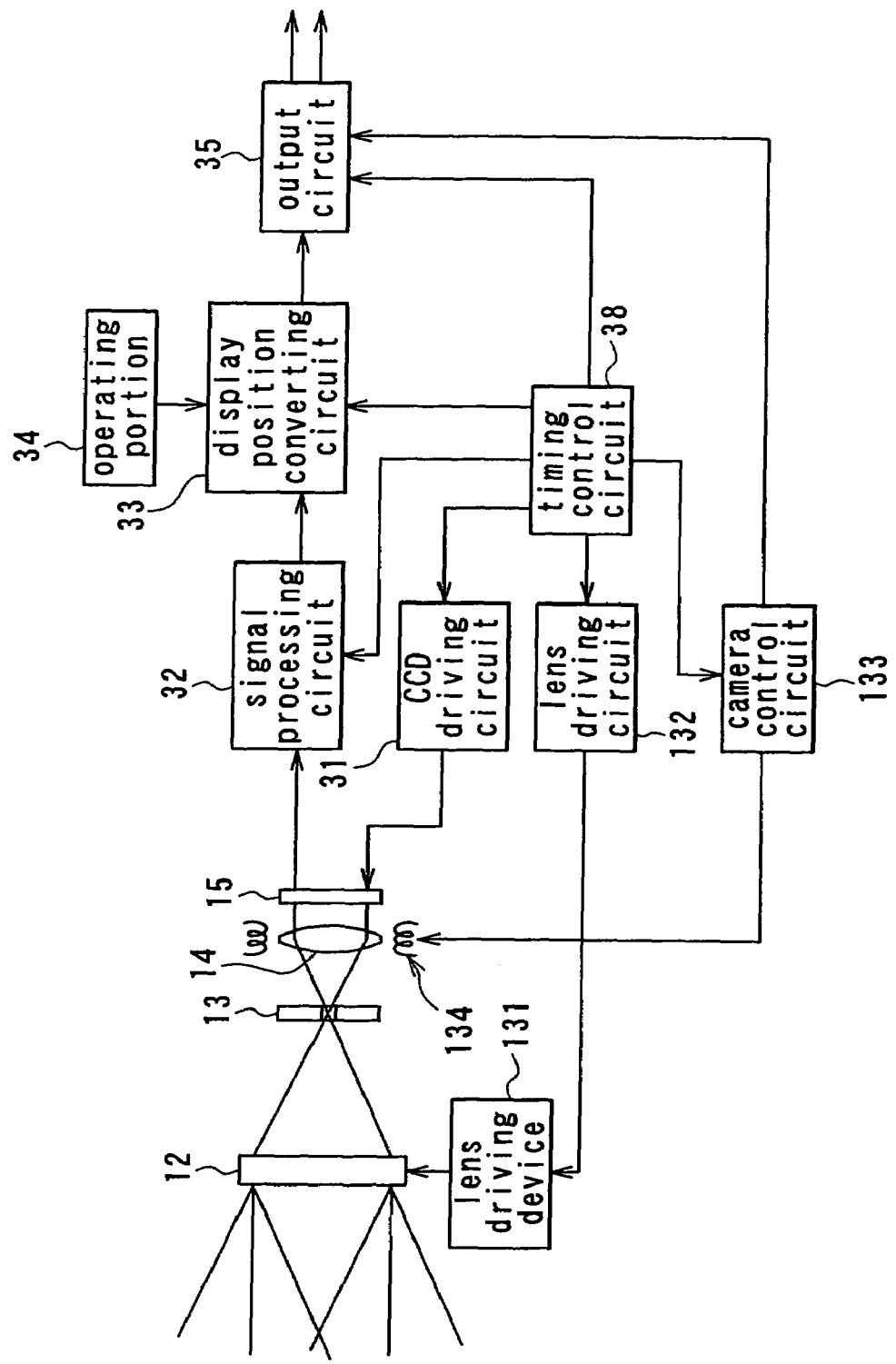
FIG. 26 is a block diagram of the three-dimensional image photographing apparatus of the third embodiment of the invention showing a configuration thereof.

FIG. 26 is a block diagram of the three-dimensional image photographing apparatus of the present embodiment showing the configuration thereof. The three-dimensional image photographing apparatus has a lens driving device 131 for swinging the converging lens 12 and a lens driving circuit 132 for controlling the lens driving device 131, instead of the camera driving device 111 and the camera driving circuit 112 of the three-dimensional image photographing apparatus shown in FIG. 22. Further, the three-dimensional image photographing apparatus has: an adjusting portion 134 for driving the optical system and so on of the three-dimensional image photographing apparatus to perform focus adjustment, zooming, lens stop adjustment, shutter speed adjustment and so on; and a camera control circuit 133 for controlling the adjusting portion 134. The camera control circuit 113 transmits information on focus adjustment, zooming, lens stop adjustment, shutter speed adjustment and so on to the output circuit 35 as control signals. The output circuit 35 associates the control signals with time and outputs the same along with video signals to the outside.

Figure 27:
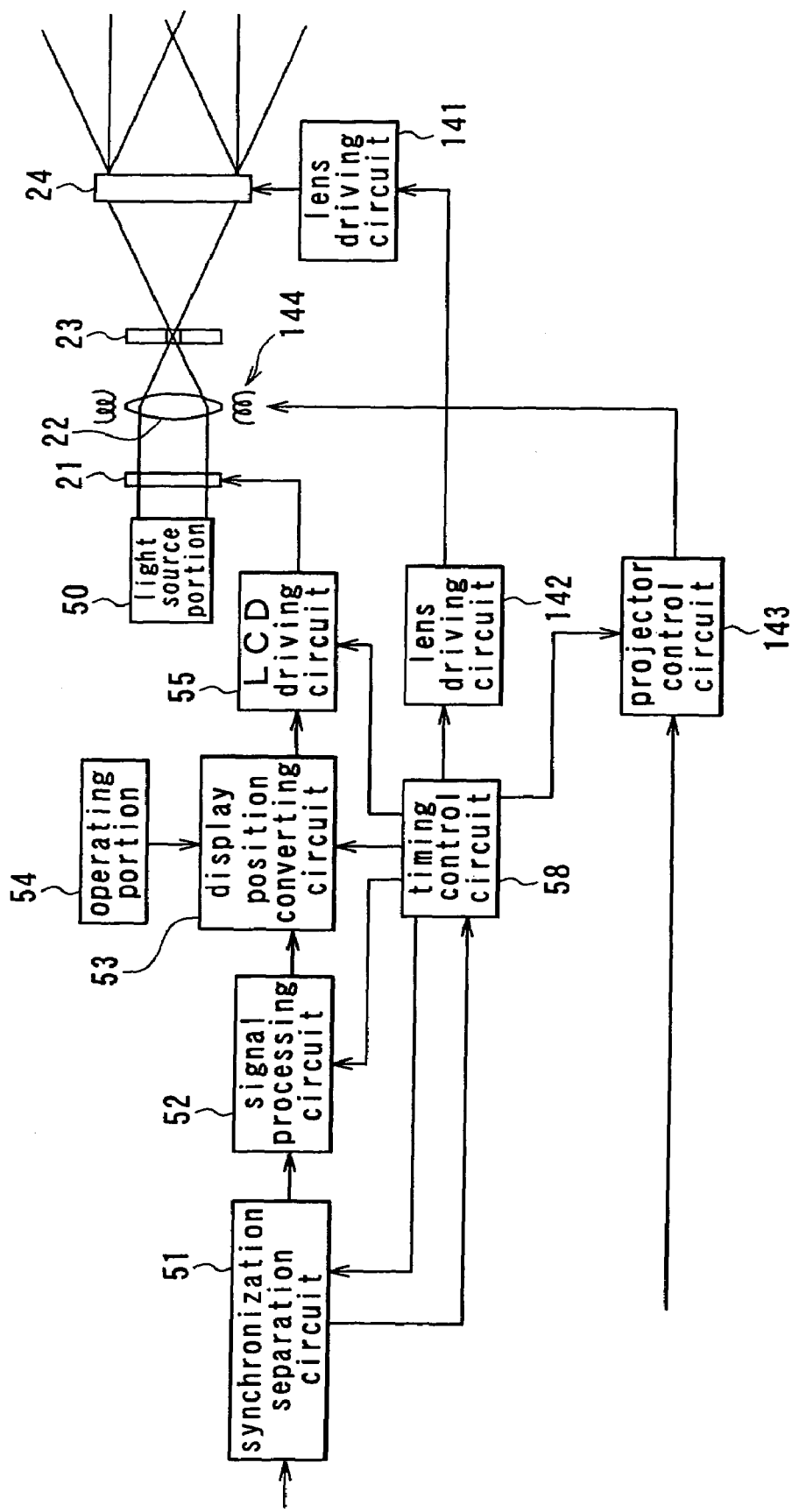
FIG. 27 is a block diagram of the three-dimensional image display apparatus of the third embodiment of the invention showing a configuration thereof.

FIG. 27 is a block diagram of the three-dimensional image display apparatus of the present embodiment showing the configuration thereof. The three-dimensional image display apparatus has a lens driving device 141 for swinging the converging lens 24 and a lens driving circuit 142 for controlling the lens driving device 141, instead of the projector driving device 121 and projector driving circuit 122 of the three-dimensional image display apparatus shown in FIG. 23. Further, the three-dimensional image display apparatus has: an adjusting portion 144 for driving the optical system and so on of the three-dimensional image display apparatus to perform focus adjustment, zooming, lens stop adjustment, shutter speed adjustment and so on; and a projector control circuit 143 for controlling the adjusting portion 144. The projector control circuit 123 receives input of information on focus adjustment, zooming, lens stop adjustment, shutter speed adjustment and so on as control signals from the outside and performs focus adjustment, zooming, lens stop adjustment and so on based on the control signals.

While the converging lenses 12 and 24 are swung in the horizontal direction in the present embodiment, they may be swung in the horizontal and vertical directions (e.g., moved two-dimensionally) to obtain a stereoscopic image having a field angle also in the longitudinal direction (vertical direction).

Further, while the converging lenses 12 and 24 are swung in the horizontal direction as a part of the optical system, the photographing direction and the projecting direction of a two-dimensional image may be changed by moving other optical members.

Figure 28:
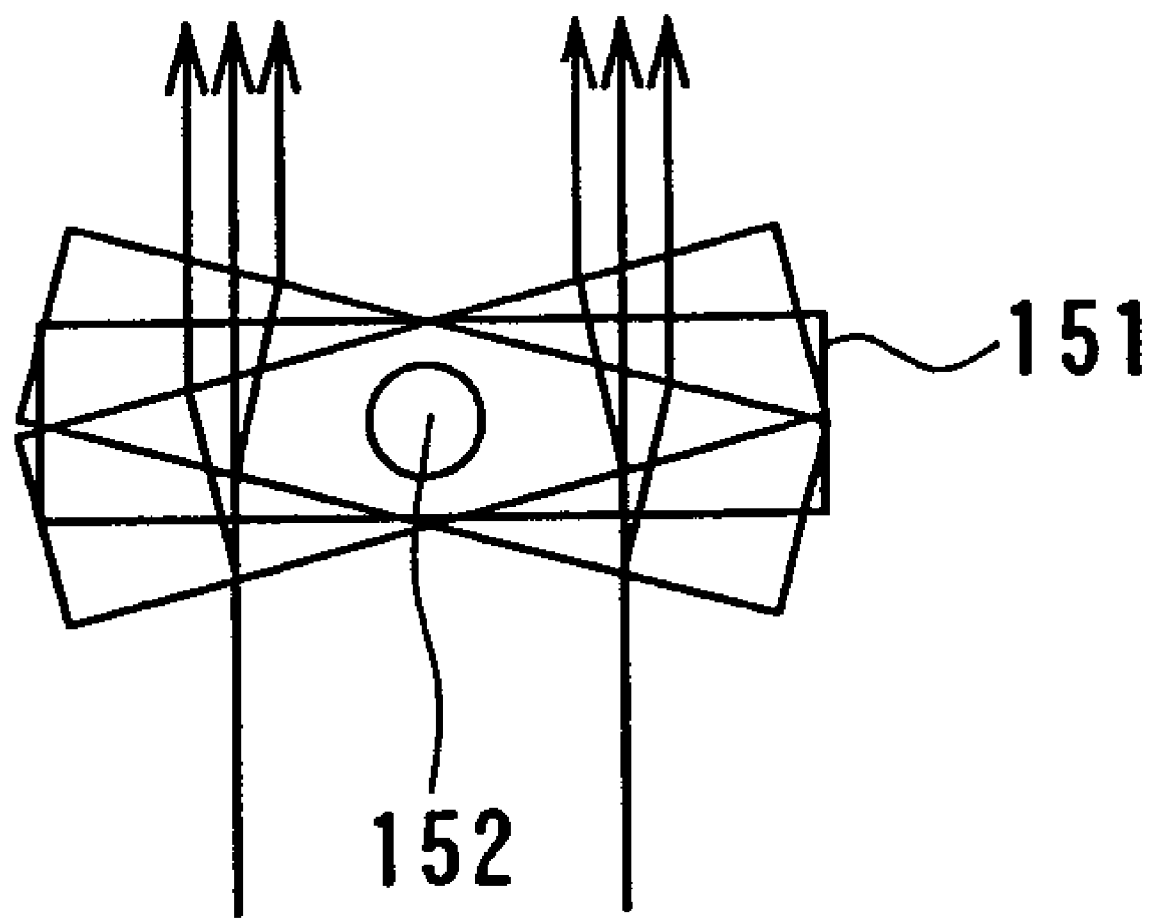
FIG. 28 is an illustration of an example of an optical member for changing a photographing direction and a projecting direction of a two-dimensional image in a modification of the third embodiment of the invention.

FIG. 28 is an illustration of an example of an optical member for changing the photographing direction and the projecting direction of a two-dimensional image. An optical member 151 is constituted of a transparent flat plate of glass or the like and is swung about an axis 152 that is orthogonal to the traveling direction of light. Light passing through the optical member 151 is swung in the horizontal direction depending on the position of the optical member 151. Therefore, the photographing direction and the projecting direction of a two-dimensional image can be changed by inserting the optical member 151 in the optical systems of the three-dimensional image photographing apparatus and the three-dimensional image display apparatus.

Figure 29:
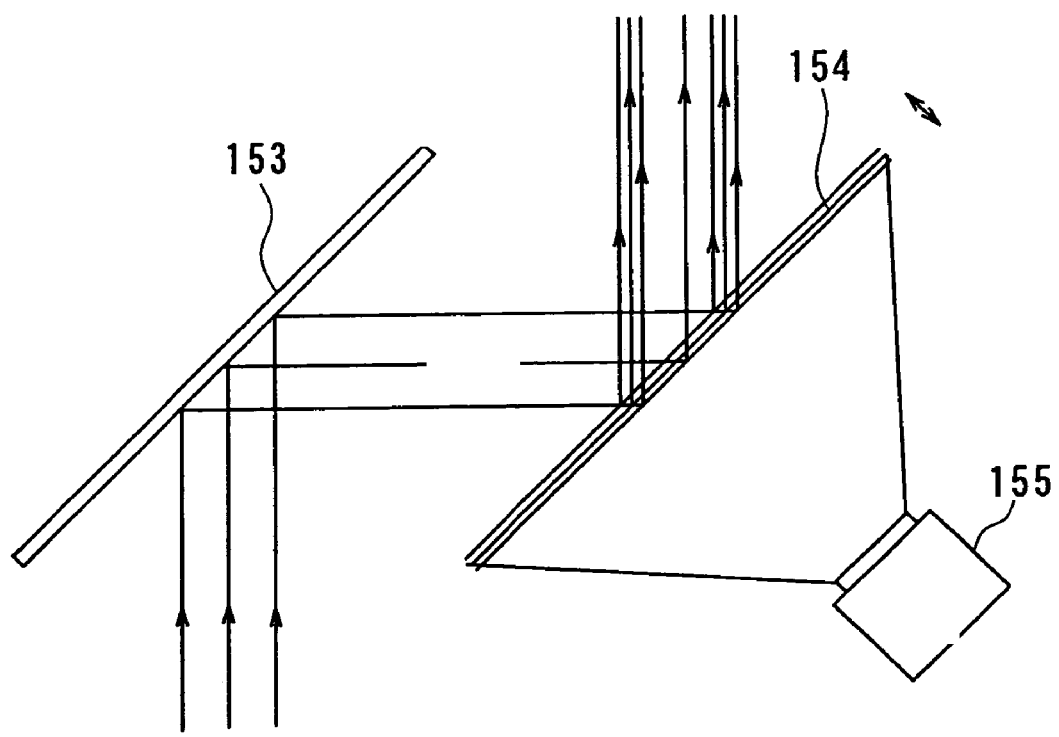
FIG. 29 is an illustration of another example of the optical member for changing a photographing direction and a projecting direction of a two-dimensional image in a modification of the third embodiment of the invention.

FIG. 29 is an illustration of another example of the optical member for changing the photographing direction and the projecting direction of a two-dimensional image. The optical member has: a mirror 153 for reflecting incident light by changing the traveling direction thereof by 90 deg.; a mirror 154 that is provided in the direction in which the light incident upon the mirror 153 travels after being reflected and that reflects incident light by changing the traveling direction thereof by 90 deg.; and a voice coil motor 155 for reciprocating the mirror 154 in a direction perpendicular to the reflecting surface thereof. The reflecting surface of the mirror 153 and the reflecting surface of the mirror 154 are in parallel with each other. Light passing through the optical member is swung in the horizontal direction depending on the position of the mirror 154 driven by the voice coil motor 155. Therefore, the photographing direction and the projecting direction of a two-dimensional image can be changed by inserting the optical member in the optical systems of three-dimensional image photographing apparatus and the three-dimensional image display apparatus.

The configuration, operation and effects of the present embodiment are otherwise the same as those of the second embodiment.

FOURTH EMBODIMENT

A fourth embodiment of the invention will now be described. In the present embodiment, to photograph a three-dimensional image, a different photographing direction is set for each pixel to generate information of one two-dimensional image, and the photographing direction for each pixel is sequentially changed to generate two-dimensional image information continuously. In the present embodiment, to display a three-dimensional image, the two-dimensional image information acquired continuously as described above is projected for each pixel in a direction associated with the photographing direction at the time of photographing to form the three-dimensional image.

First, a description will be made with reference to FIGS. 30 through 35 on a format representing the photographing direction and the projecting direction of each pixel in the present embodiment. In the following description, a two-dimensional image having N pixels in the horizontal direction and M pixels in the vertical direction is referred to as "a two-dimensional image with N×M pixels". In the present embodiment, it is assumed that two-dimensional image information photographing means of a three-dimensional image photographing apparatus and two-dimensional image information projecting means of a three-dimensional image display apparatus have a resolution of 640×480 pixels. That is, a two-dimensional image is formed by 640×480 pixels. There are 60 photographing and projecting directions, i.e., $\theta 1$ through $\theta 60$. Numerals 1 through 60 in FIGS. 30 through 35 represent the directions $\theta 1$ through $\theta 60$, respectively. In the present embodiment, one space frame is made up of five space fields. One space frame forms one three-dimensional still image. Twelve space frames form a three-dimensional image for one sec.

In the present embodiment, a two-dimensional image region with 640×480 pixels is divided into 160 sub-regions in the horizontal and vertical directions. Each sub-region is formed by 4×3 pixels.

Figure 30:
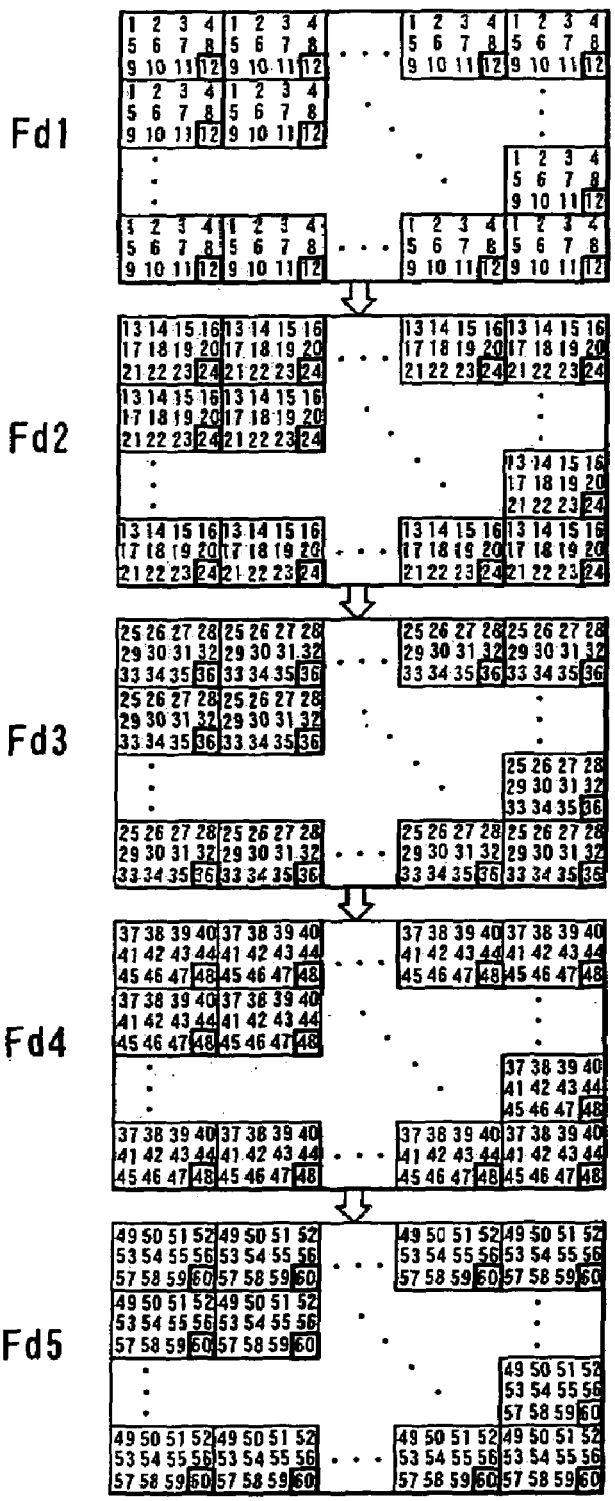
FIG. 30 is an illustration showing a format representing a photographing direction and a projecting direction for each pixel in a fourth embodiment of the invention.

FIG. 30 shows a first space field Fd1 through a fifth space field Fd5 which form a first space frame Fm1. Regions with 4×3 pixels in the figure represent the sub-regions. When the directions of the pixels in each sub-region are checked in their order in the scanning direction, in the first space field Fd1 of the first space frame Fm1, the directions of the pixels in each sub-region are respectively set at θ1 through θ12. In the second space field Fd2, the directions of the pixels in each sub-region are respectively set at θ13 through θ24. In the third space field Fd3, the directions of the pixels in each sub-region are respectively set at θ25 through θ36. In the fourth space field Fd4, the directions of the pixels in each sub-region are respectively set at θ37 through θ48. In the fifth space field Fd5, the directions of the pixels in each sub-region are respectively set at θ49 through θ60.

Figure 31:
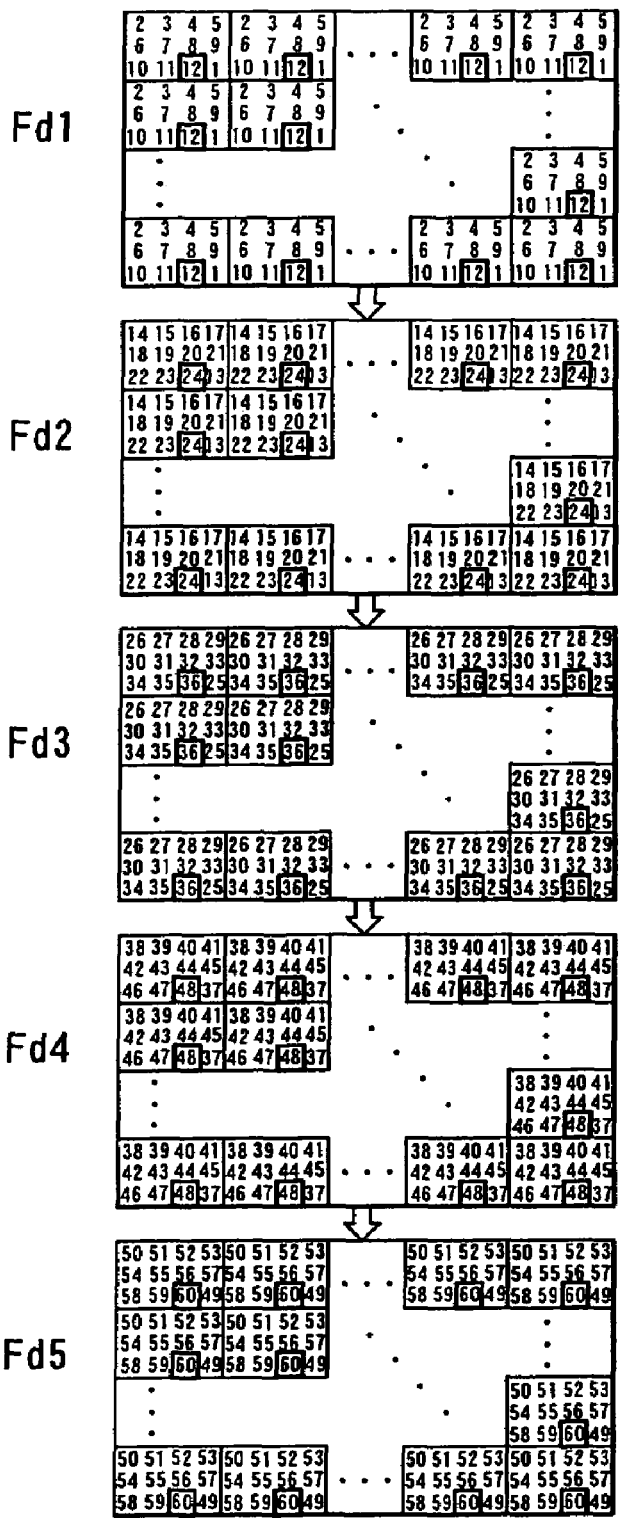
FIG. 31 is an illustration showing the format representing a photographing direction and a projecting direction for each pixel in the fourth embodiment of the invention.

FIG. 31 shows a first space field Fd1 through a fifth space field Fd5 which form a second space frame Fm2. Regions with 4×3 pixels in the figure represent the sub-regions. When the directions of the pixels in each sub-region are checked in their order in the scanning direction, in the first space field Fd1 of the second space frame Fm2, the directions of the pixels in each sub-region are respectively set at θ2 through θ12 and θ1. In the second space field Fd2, the directions of the pixels in each sub-region are respectively set at θ14 through θ24 and θ13. In the third space field Fd3, the directions of the pixels in each sub-region are respectively set at θ26 through θ36 and θ25. In the fourth space field Fd4, the directions of the pixels in each sub-region are respectively set at θ38 through θ48 and θ37. In the fifth space field Fd5, the directions of the pixels in each sub-region are respectively set at θ50 through θ60 and θ49.

Figure 32:
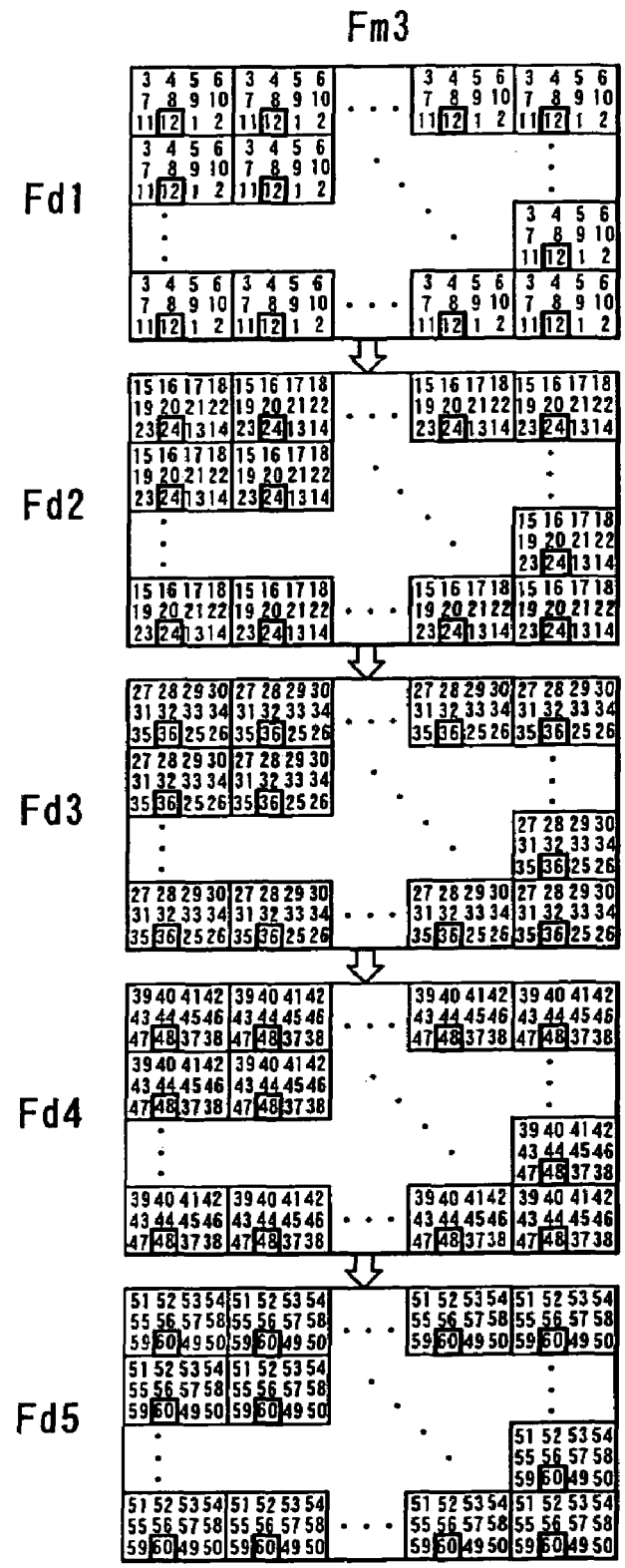
FIG. 32 is an illustration showing the format representing a photographing direction and a projecting direction for each pixel in the fourth embodiment of the invention.

FIG. 32 shows a first space field Fd1 through a fifth space field Fd5 which form a third space frame Fm3. Regions with 4×3 pixels in the figure represent the sub-regions. When the directions of the pixels in each sub-region are checked in their order in the scanning direction, in the first space field Fd1 of the third space frame Fm3, the directions of the pixels in each sub-region are respectively set at θ3 through θ12, θ1 and θ2. In the second space field Fd2, the directions of the pixels in each sub-region are respectively-set at θ15 through θ24, θ13 and θ14. In the third space field Fd3, the directions of the pixels in each sub-region are respectively set at θ27 through θ36, θ25 and θ26. In the fourth space field Fd4, the directions of the pixels in each sub-region are respectively set at θ39 through θ48, θ37 and θ38. In the fifth space field Fd5, the directions of the pixels in each sub-region are respectively set at θ51 through θ60, θ49 and θ50.

Similarly, in each later space frame, the assignment of directions to pixels is shifted by one pixel in the scanning direction in each sub-region from that in the preceding frame, although the combination of directions assigned to each sub-region in the space fields Fd1 through Fd5 remains unchanged.

Figure 33:
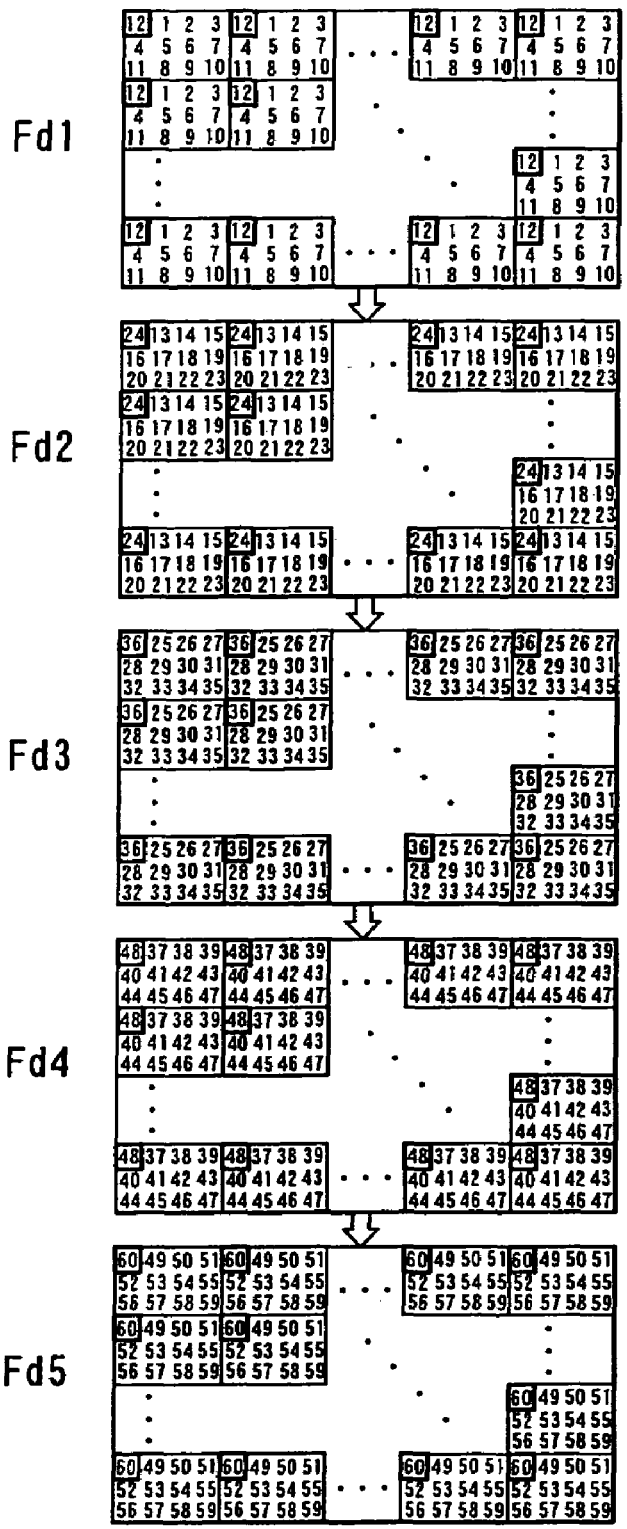
FIG. 33 is an illustration showing the format representing a photographing direction and a projecting direction for each pixel in the fourth embodiment of the invention.

FIG. 33 shows a first space field Fd1 through a fifth space field Fd5 which form a twelfth space frame Fm12. Regions with 4×3 pixels in the figure represent the sub-regions. When the directions of the pixels in each sub-region are checked in their order in the scanning direction, in the first space field Fd1 of the twelfth space frame Fm12, the directions of the pixels in each sub-region are respectively set at θ12 and θ1 through θ11. In the second space field Fd2, the directions of the pixels in each sub-region are respectively set at θ24 and θ13 through θ23. In the third space field Fd3, the directions of the pixels in each sub-region are respectively set at θ36 and θ25 through θ35. In the fourth space field Fd4, the directions of the pixels in each sub-region are respectively set at θ48 and θ37 through θ47. In the fifth space field Fd5, the directions of the pixels in each sub-region are respectively set at θ60 and θ49 through θ59.

In FIGS. 30 through 33, in order to clearly show changes in the pixel to which a certain direction is assigned, the pixels assigned to the directions θ12, θ24, θ36, θ48, and θ60 are indicated by enclosing them in squares.

Figure 34:
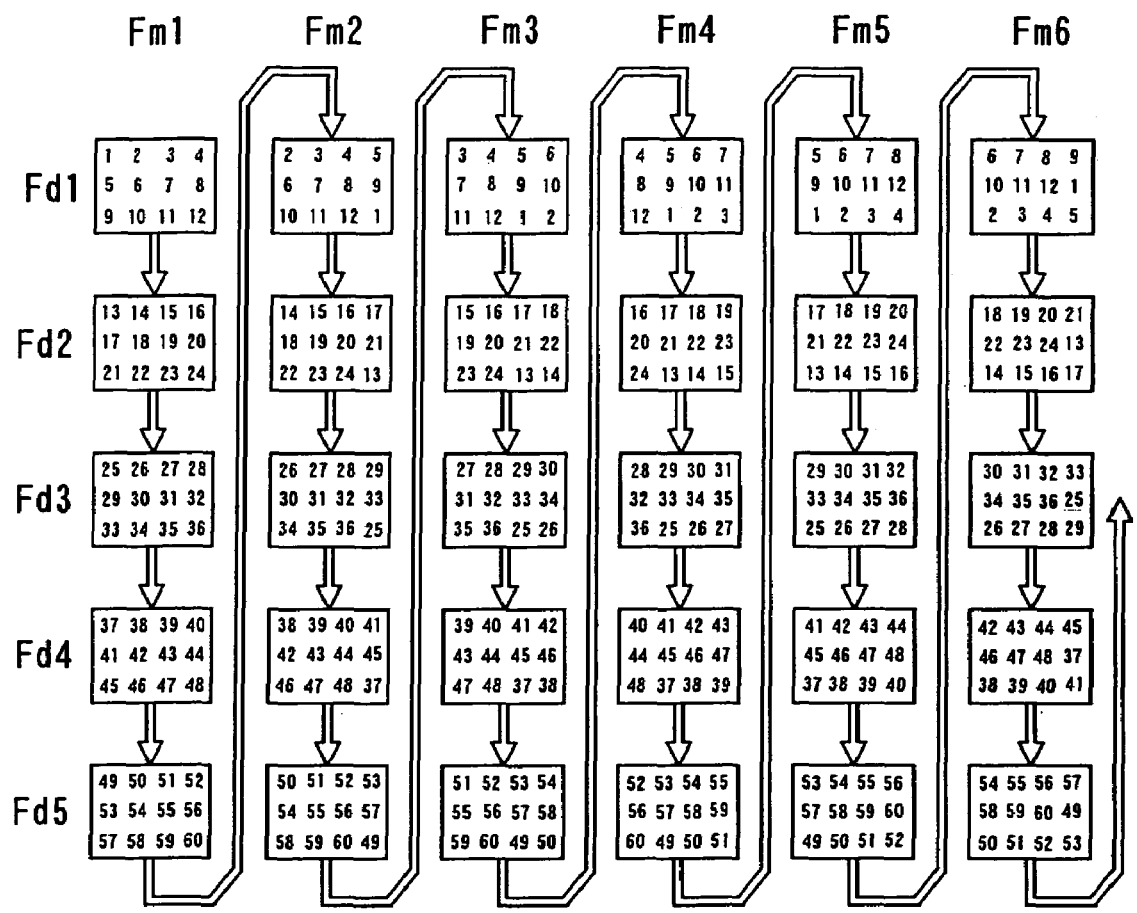
FIG. 34 is an illustration showing the format representing a photographing direction and a projecting direction for each pixel in the fourth embodiment of the invention.
Figure 35:
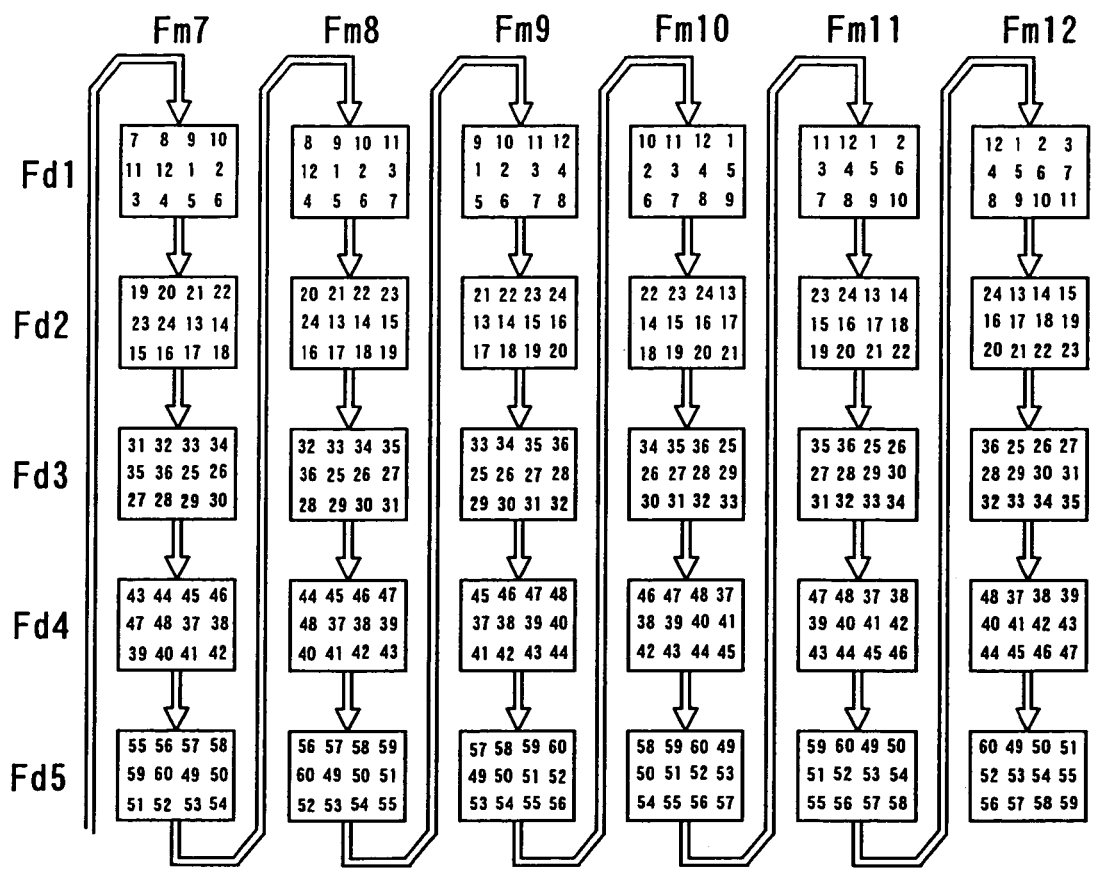
FIG. 35 is an illustration showing the format representing a photographing direction and a projecting direction for each pixel in the fourth embodiment of the invention.

FIGS. 34 and 35 show directions assigned to pixels in one sub-region. FIG. 34 shows the first space frame Fm1 through sixth space frame Fm6, and FIG. 35 shows the seventh space frame Fm7 through twelfth space frame Fm12.

The three-dimensional image photographing apparatus of the present embodiment has the same configuration as that in FIG. 5. In the present embodiment, the angle pattern generating circuit 37 generates an angle pattern representing the direction of each pixel according to the above-described format and supplies it to the deflecting plate driving circuit 36. The deflecting plate driving circuit 36 sets an angle for incident light for each pixel of the deflecting plate 11. The CCD driving circuit 31, the deflecting plate driving circuit 36, the angle pattern generating circuit 37, and the timing control circuit 38 in FIG. 5 correspond to the photographing control means of the invention.

The three-dimensional image display apparatus of the present embodiment has the same configuration as that in FIG. 11. In the present embodiment, the angle pattern generating circuit 57 generates an angle pattern representing the direction of each pixel according to the above-described format and supplies it to the deflecting plate driving circuit 56. The deflecting plate driving circuit 56 sets an angle for exiting light for each pixel of the deflecting plate 25 according to the supplied angle pattern. The LCD driving circuit 55, the deflecting plate driving circuit 56, the angle pattern generating circuit 57, and the timing control circuit 58 in FIG. 11 correspond to the display control means of the invention.

The angle pattern at the time of display of each two-dimensional image must coincide with the angle pattern at the time of photographing. It can be achieved by synchronizing changes in the space frames and space fields of the two-dimensional image with changes in the angle pattern, based on the synchronization signals included in the video signals.

As described above, in the present embodiment, a three-dimensional still image is formed by one space frame made up of five space fields. In one space field, still images with a resolution of 160×160 pixels are simultaneously formed in twelve directions. Still images with a resolution of 160×160 pixels are formed in all of the 60 directions with five space fields, that is, one space frame. Therefore, a three-dimensional image with a resolution of 160×160 pixels can be displayed with one space frame. Further, a three-dimensional image with a resolution of 640×480 pixels, the maximum resolution, can be displayed in all of the 60 directions with 12 space frames. In addition, a substantially perfect three-dimensional dynamic image of 60 fields/sec. can be viewed in a certain direction.

In the present embodiment, each space field forms images in 12 directions among the 60 total directions, and five space fields (one space frame) form images in all of the 60 directions. While each space frame forms a three-dimensional image with a resolution of 160×160 pixels, pixels to which a specific direction is assigned are different from frame to frame. As a result, a three-dimensional image with a resolution of 640×480 pixels is formed with 12 space frames. Therefore, it may be put that information required for displaying a three-dimensional image is configured using a temporal and spatial interlacing method in the present embodiment.

According to the present embodiment, it is possible to display a three-dimensional dynamic image that is worth viewing in terms of the cycle of image updates and resolution with the number of fields per second kept small.

Although five space fields make up one space frame and 12 space frames (60 space fields) form a three-dimensional image for one second in the present embodiment, various modifications are possible as shown below.

For example, four space fields may form one space frame, and 15 space frames (60 space fields) may form a three-dimensional image for one second. In this case, for example, a sub-region has 5×3 pixels, and a two-dimensional still image with a resolution of 128×160 pixels is projected in one direction in one space field.

Three space fields may form one space frame, and 20 space frames (60 space fields) may form a three-dimensional image for one second. In this case, for example, a sub-region has 5×4 pixels, and a two-dimensional still image with a resolution of 128×120 pixels is projected in one direction in one space field.

Two space fields may form one space frame, and 30 space frames (60 space fields) may form a three-dimensional image for one second. In this case, for example, a sub-region has 5×6 pixels, and a two-dimensional still image with a resolution of 128×80 pixels is projected in one direction in one space field.

One space field may form one space frame, and 60 space frames (60 space fields) may form a three-dimensional image for one second. In this case, for example, a sub-region has 10×6 pixels, and a two-dimensional still image with a resolution of 64×80 pixels is projected in one direction in one space field.

While the number of space fields per second is 60 in the present embodiment, a three-dimensional dynamic image with smoother movements can be displayed by increasing the number. For example, if the number of space fields per second is 120, the changing of angle patterns for 60 fields as described in the present embodiment can be repeated twice in one second, which makes it possible to render movements more smoothly.

While a two-dimensional image is formed with 640×480 pixels in the present embodiment, an increase in the number of pixels will make it possible to display a more precise (finer) three-dimensional image. For example, let us assume that a two-dimensional image is formed with 1024×768 pixels. In this case, if the space is to be divided at each predetermined angle into 60 parts to form a three-dimensional image with the 60 fields, a sub-region is formed with 4×3 pixels to divide the image region of 1024×768 pixels into 256×256 sub-regions. For example, one space frame is formed by five space fields and a three-dimensional image is formed for one second by 12 space frames (60 space fields). The size of the sub-region may be changed. The number of divisions of the space at predetermined angles may be increased to improve the spatial resolution and the field angle. The number of fields per second may also be increased.

It is possible to display a precise three-dimensional dynamic image with smooth movements if the two-dimensional images are formed by 1024×768 pixels and the number of fields per second is 120. In order to achieve this, the CCD and LCD must have 1024×768 pixels and must be at a rate as high as 120 fields/sec. Those requirements can be sufficiently met in view of the increasing number of pixels in recent CCDs and LCDs and CCD techniques adapted to the non-interlace method.

Referring to the execution of a display position converting process in the present embodiment, after converting two-dimensional image information for 60 space fields having different photographing and projecting directions for each pixel into two-dimensional image information in each of the 60 photographing and projecting directions, a display position converting process may be performed on the converted two-dimensional image information, and the resultant information may be converted into two-dimensional image information for 60 space fields having different photographing and projecting directions for each pixel.

The configuration, operation, and effects of the present embodiment are otherwise the same as those of the first embodiment.

FIFTH EMBODIMENT

Figure 36:
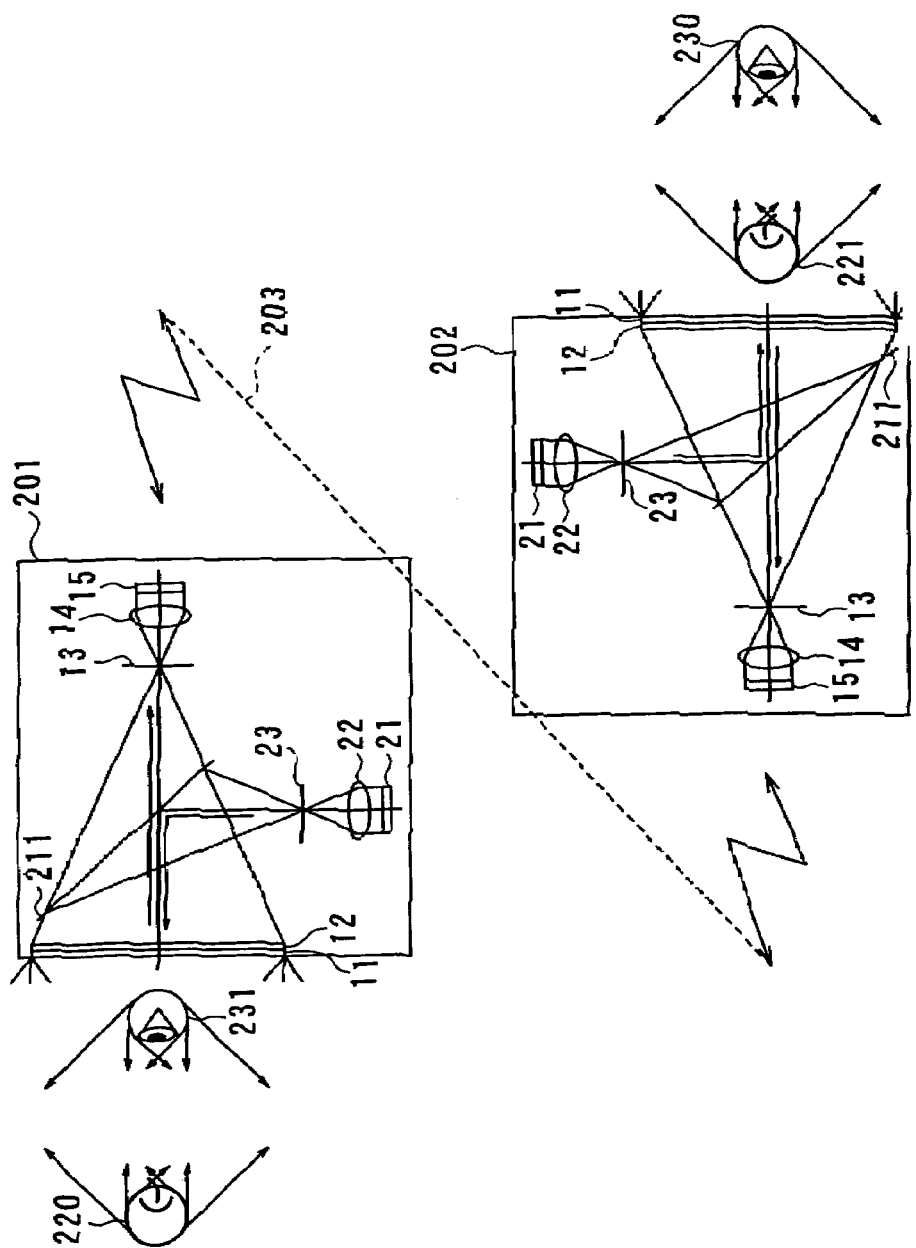
FIG. 36 is an illustration of a configuration of a television conference system in a fifth embodiment of the invention.

A fifth embodiment of the invention will now be described with reference to FIG. 36. The present embodiment is an example of an application of the invention to a television conference system. FIG. 36 is an illustration of a configuration of a television conference system of the present embodiment. The television conference system has two three-dimensional image photographing and display apparatuses 201 and 202. The two three-dimensional image photographing and display apparatuses 201 and 202 are connected to each other through a signal transmission channel 203 for transmitting signals on a bi-directional basis.

The three-dimensional image photographing and display apparatuses 201 and 202 are provided by integrating a three-dimensional image photographing apparatus and a three-dimensional image display apparatus. In each of the three-dimensional image photographing and display apparatuses 201 and 202, a half-mirror 211 is provided between the converging lens 12 and the pinhole member 13 of the three-dimensional image photographing apparatus shown in FIG. 1. The half-mirror 211 is provided such that the normal of a reflecting surface thereof is at 45 degrees to the optical axis of the optical system of the three-dimensional image photographing apparatus. The pinhole member 23, the converging lens 22 and the LCD 21 of the three-dimensional image display apparatus are provided in the direction in which light from the converging lens 12 travels after being reflected by the half-mirror 211. Although not shown, the circuit configuration of the three-dimensional image photographing and display apparatuses 201 and 202 includes circuits of both of a three-dimensional image photographing apparatus and a three-dimensional image display apparatus. The three-dimensional image photographing apparatus and the three-dimensional image display apparatus included in the three-dimensional image photographing and display apparatuses 201 and 202 may have configurations according to any of the first through fourth embodiments.

An operation of the television conference system of the present embodiment will now be described. The three-dimensional image photographing and display apparatuses 201 and 202 photograph and display three-dimensional images simultaneously. Specifically, photographing directions and projecting directions for two-dimensional image information are simultaneously selected at the deflecting plate 11. Light which has entered the deflecting plate 11 passes through the converging lens 12, the half-mirror 211, the pinhole member 13 and the converging lens 14 to enter the CCD 15. Light from the LCD 21 passes through the converging lens 22, the pinhole member 23, the half-mirror 211 and the converging lens 12 to be projected by the deflecting plate 11.

For example, let us assume that the three-dimensional image photographing and display apparatus 201 photographs an object 220 and that the three-dimensional image photographing and display apparatus 202 photographs an object 230. The three-dimensional image photographing and display apparatus 201 performs signal processing on signals output by the CCD 15 to generate video signals. The video signals are transmitted to the three-dimensional image photographing and display apparatus 202 through the signal transmission channel 203. In the three-dimensional image photographing and display apparatus 202, two-dimensional image information is formed by the LCD 21 based on the transmitted video signals, and the two-dimensional image information is projected in directions selected by the deflecting plate 11. Thus, a three-dimensional image 221 of the object 220 is displayed by the three-dimensional image photographing and display apparatus 202.

Similarly, the three-dimensional image photographing and display apparatus 202 performs signal processing on signals output by the CCD 15 to generate video signals. The video signals are transmitted to the three-dimensional image photographing and display apparatus 201 through the signal transmission channel 203. In the three-dimensional image photographing and display apparatus 201, two-dimensional image information is formed by the LCD 21 based on the transmitted video signals, and the two-dimensional image information is projected in directions selected by the deflecting plate 11. Thus, a three-dimensional image 231 of the object 230 is displayed by the three-dimensional image photographing and display apparatus 201.

When the objects 220 and 230 are both human-beings, the person at the three-dimensional image photographing and display apparatus 201 can view a three-dimensional image of the person at the three-dimensional image photographing and display apparatus 202; and the person at the three-dimensional image photographing and display apparatus 202 can view a three-dimensional image of the person at the three-dimensional image photographing and display apparatus 201.

Therefore, the television conference system of the present embodiment enables to hold a television conference with a close view of a three-dimensional image of each other's face. It is therefore possible to hold a television conference with presence. Since the light entrance section of the system for photographing a three-dimensional image also serves as the light exit section for displaying a three-dimensional image, a three-dimensional image of each other's face is displayed in front of the viewer. Therefore, the attendants can talk while looking in the eyes of each other, which makes it possible to hold a television conference with increased presence.

A television conference can be held between three or more locations by installing the three-dimensional image photographing and display apparatus of the present embodiment in the three or more locations, interconnecting them through a signal transmission channel, and displaying video signals coming from other three-dimensional image photographing and display apparatuses by switching or synthesizing them at each three-dimensional image photographing and display apparatus.

The configuration, operation, and effects of the present embodiment are otherwise the same as those of the first through fourth embodiments.

The present invention is not limited to the above-described embodiments, and various modifications may be made. For example, image pickup devices other than CCDs may be used as the means for photographing two-dimensional images in the three-dimensional image photographing apparatuses. Display devices other than LCDs may be used as the means for displaying two-dimensional images in the three-dimensional image display apparatuses.

The means for changing the direction of incident light in the three-dimensional image photographing apparatuses and changing the direction of light exiting the three-dimensional image display apparatus is not limited to the means used in the above-described embodiments and, for example, rotary prisms, rotary mirrors and the like may be used.

As described above, according to the first three-dimensional image photographing apparatus or the first three-dimensional image photographing method of the invention, an object is photographed with the single photographing means to generate two-dimensional image information of the object, and the photographing direction is sequentially changed. This is advantageous in that image information required for displaying a three-dimensional image of the object in a space can be acquired with a simple configuration and in that display of a stereoscopic dynamic image in a true sense can be achieved with a simple configuration.

According to the second three-dimensional image photographing apparatus or the second three-dimensional image photographing method of the invention, the photographing direction setting means is controlled so as to acquire two-dimensional image information with a low resolution that is lower than the resolution of the photographing means in every photographing direction that can be set, and the process of acquiring the two-dimensional image information is repeatedly performed while changing pixels to which a specific photographing direction is assigned, to acquire two-dimensional image information with a resolution that is the same as the resolution of the photographing means in every photographing directions that can be set. This is advantageous in that a three-dimensional dynamic image can be displayed which is worth viewing in terms of the cycle of image updates and resolution and in that display of a stereoscopic dynamic image in a true sense can be achieved with a simple configuration.

According to the three-dimensional image display apparatus or the three-dimensional image display method of the invention, the projecting direction setting means is controlled to project two-dimensional image information with a low resolution that is lower than the resolution of the projecting means in every projecting direction that can be set, and the process of projecting the two-dimensional image information is repeatedly performed while changing pixels to which a specific projecting direction is assigned, to display two-dimensional image information with a resolution that is the same as the resolution of the projecting means in every projecting directions that can be set. This is advantageous in that a three-dimensional dynamic image can be displayed which is worth viewing in terms of the cycle of image updates and resolution and in that display of a stereoscopic dynamic image in a true sense can be achieved with a simple configuration.

The three-dimensional image display position converting apparatus or the three-dimensional image display position converting method of the invention is used in a system in which a plurality of pieces of two-dimensional image information of an object obtained in different viewing directions are projected in directions associated with the respective viewing directions to display a three-dimensional image of the object in a space. A quantity of a movement of a position of the two-dimensional image information in an in-plane direction required for moving a position of the three-dimensional image by a specific quantity of movement is identified based on information on the quantity of movement of the position of the three-dimensional image, the viewing directions or the projecting directions and the position of the two-dimensional image information is changed by the quantity of movement thus identified. As a result, it is easy to convert a position of the three-dimensional image of the object displayed in the space.

It is apparent from the above description that the present invention can be carried out in various modes and modifications. The present invention can be carried out in modes other than the above-described best modes for carrying out the invention within the scope of equivalence of the appended claims.

What is claimed is:

1. A three-dimensional image display apparatus for displaying a three-dimensional image of an object in a space by projecting a plurality of pieces of two-dimensional image information of the object obtained by viewing the object in different viewing directions, in projecting directions that are associated with the respective viewing directions, comprising:
   projecting means for projecting the two-dimensional image information of the object;
   projecting direction setting means for setting a projecting direction for the projecting means, capable of setting a different projecting direction for each pixel of the two-dimensional image information; and
   display control means for displaying a three-dimensional image with a low resolution by controlling the projecting direction setting means to project two-dimensional image information with a low resolution that is lower than the resolution of the projecting means simultaneously in every projecting direction that can be set, and for repeatedly performing a process of projecting the two-dimensional image information with the low resolution while changing pixels to which a specific projecting direction is assigned, to display a three-dimensional image with the same resolution as the resolution of the projecting means.

2. A three-dimensional image display apparatus according to claim 1, wherein the display control means divides a two-dimensional image region into a plurality of sub-regions each having A pixels (A is an integer equal to or greater than 2) and sets each of all the projecting directions that can be set for one pixel in each of the sub-regions to project the two-dimensional image information with the low resolution, the low resolution being 1/A of the resolution of the projecting means, thereby displaying a three-dimensional image with a low resolution, and repeatedly performs a process of projecting the two-dimensional image information with the low resolution A times while changing pixels to which a specific projecting direction is assigned in the sub-regions, to display the three-dimensional image with the same resolution as the resolution of the projecting means.

3. A three-dimensional image display apparatus according to claim 2, wherein the display control means divides all of the projecting directions that can be set into groups each consisting of A projecting directions, and repeatedly performs a process of projecting the two-dimensional image information with the low resolution in the A projecting directions to project the two-dimensional image information with the low resolution in all of the projecting directions that can be set.

4. A three-dimensional image display apparatus according to claim 1, wherein the projecting direction setting means has deflecting means for deflecting light by selecting a direction for exiting light.

5. A method for displaying a three-dimensional image for displaying a three-dimensional image of an object in a space by projecting a plurality of pieces of two-dimensional image information of the object obtained by viewing the object in different viewing directions, in projecting directions that are associated with the respective viewing directions, using projecting means for projecting the two-dimensional image information of the object and projecting direction setting means for setting a projecting direction for the projecting means, capable of setting a different photographing direction for each pixel of the two-dimensional image information, the method including:
   a first step for controlling the projecting direction setting means to acquire two-dimensional image information with a low resolution that is lower than the resolution of the projecting means, and simultaneously projecting the acquired two-dimensional image information in every projecting direction that can be set, thereby displaying a three-dimensional image with a low resolution; and
   a second step for repeatedly performing the first step while changing pixels to which a specific projecting direction is assigned, to display a three-dimensional image with the same resolution as the resolution of the projecting means.

6. A method for displaying a three-dimensional image according to claim 5, wherein the first step divides a two-dimensional image region into a plurality of sub-regions each having A pixels (A is an integer equal to or greater than 2) and sets each of all the projecting directions that can be set for one pixel in each of the sub-regions to project the two-dimensional image information with the low resolution, the low resolution being 1/A of the resolution of the projecting means, thereby displaying the three-dimensional image with the low resolution, and the second step repeatedly performs the first step A times while changing pixels to which a specific projecting direction is assigned in the sub-regions to display a three-dimensional image with the same resolution as the resolution of the projecting means.

7. A method for displaying a three-dimensional image according to claim 6, wherein the first step divides all of the projecting directions that can be set into groups each consisting of A photographing directions, and repeatedly performs a process of projecting the two-dimensional image information with the low resolution in the A projecting directions to project the two-dimensional image information with the low resolution in all of the projecting directions that can be set.

* * * * *